US012582051B2

(12) United States Patent　　(10) Patent No.:　US 12,582,051 B2
Howe　　(45) Date of Patent:　Mar. 24, 2026

(54) PLANT GROWING APPARATUS

(71) Applicant: BG Technologies Inc., Green Cove Springs, FL (US)

(72) Inventor: Leslie David Howe, Ottawa (CA)

(73) Assignee: BG Technologies Inc, Green Cove Springs, FL (US)

( * ) Notice: Subject to any disclaimer, the term of this patent is extended or adjusted under 35 U.S.C. 154(b) by 0 days.

(21) Appl. No.: 19/321,426

(22) Filed: Sep. 8, 2025

(65) Prior Publication Data

US 2026/0000033 A1　　Jan. 1, 2026

Related U.S. Application Data

(63) Continuation of application No. 19/256,347, filed on Jul. 1, 2025, which is a continuation of application No. PCT/CA2024/050091, filed on Jan. 26, 2024.

(60) Provisional application No. 63/543,789, filed on Oct. 12, 2023, provisional application No. 63/538,816, filed on Sep. 16, 2023, provisional application No. 63/535,801, filed on Aug. 31, 2023, provisional application No. 63/528,359, filed on Jul. 22, 2023, provisional application No. 63/471,793, filed on Jun. 8, 2023, provisional application No. 63/461,792, filed on Apr. 25, 2023, provisional application No. 63/443,416, filed on Feb. 5, 2023, provisional application No. 63/442,039, filed on Jan. 30, 2023.

(51) Int. Cl.
　A01G 9/24　　　(2006.01)
　A01G 9/20　　　(2006.01)

(52) U.S. Cl.
　CPC ............... A01G 9/249 (2019.05); A01G 9/20 (2013.01)

(58) Field of Classification Search
　CPC ............. A01G 9/249; A01G 9/20; A01G 9/24
　See application file for complete search history.

(56) References Cited

U.S. PATENT DOCUMENTS

| | | | |
|---|---|---|---|
| 2012/0281413 A1* | 11/2012 | Lewis .................... | A01G 7/045 |
| | | | 362/249.11 |
| 2013/0170211 A1* | 7/2013 | Lin ........................ | A01G 9/249 |
| | | | 362/249.02 |
| 2017/0030537 A1* | 2/2017 | Powell ...................... | F21S 2/00 |
| 2018/0242531 A1* | 8/2018 | Berry, III ................. | A01G 9/02 |
| 2020/0100433 A1* | 4/2020 | Iamundi .................. | F21V 21/30 |
| 2020/0146219 A1* | 5/2020 | Lefsrud .................. | A01G 9/246 |
| 2020/0260673 A1 | 8/2020 | Travaglini | |
| 2020/0288646 A1 | 9/2020 | Howe | |
| 2020/0390039 A1* | 12/2020 | Sulejmani ................ | A01H 6/28 |
| 2021/0137027 A1* | 5/2021 | Howe ....................... | A01G 9/16 |
| 2021/0212265 A1* | 7/2021 | Chang .................... | A01G 9/143 |

(Continued)

FOREIGN PATENT DOCUMENTS

KR　　2023120432 A　*　8/2023

*Primary Examiner* — Kristen C Hayes

(74) *Attorney, Agent, or Firm* — TROUTMAN PEPPER LOCKE LLP; James E. Schutz; Mark Lehi Jones

(57) ABSTRACT

A plant growing apparatus is provided that comprises a transport and positioning system, the transport and positioning system comprising a mobile plant container with a first set of wheels configured to allow selective movement of the mobile plant container to engage with or disengage from the growing chamber; and a track assembly configured to guide movement of the mobile plant container along a pathway from outside the growing chamber to inside the growing chamber.

26 Claims, 40 Drawing Sheets

(56) References Cited

U.S. PATENT DOCUMENTS

| | | | |
|---|---|---|---|
| 2022/0287246 A1* | 9/2022 | Westlind | A01G 7/045 |
| 2022/0346327 A1* | 11/2022 | Montagano | A01G 9/243 |

* cited by examiner

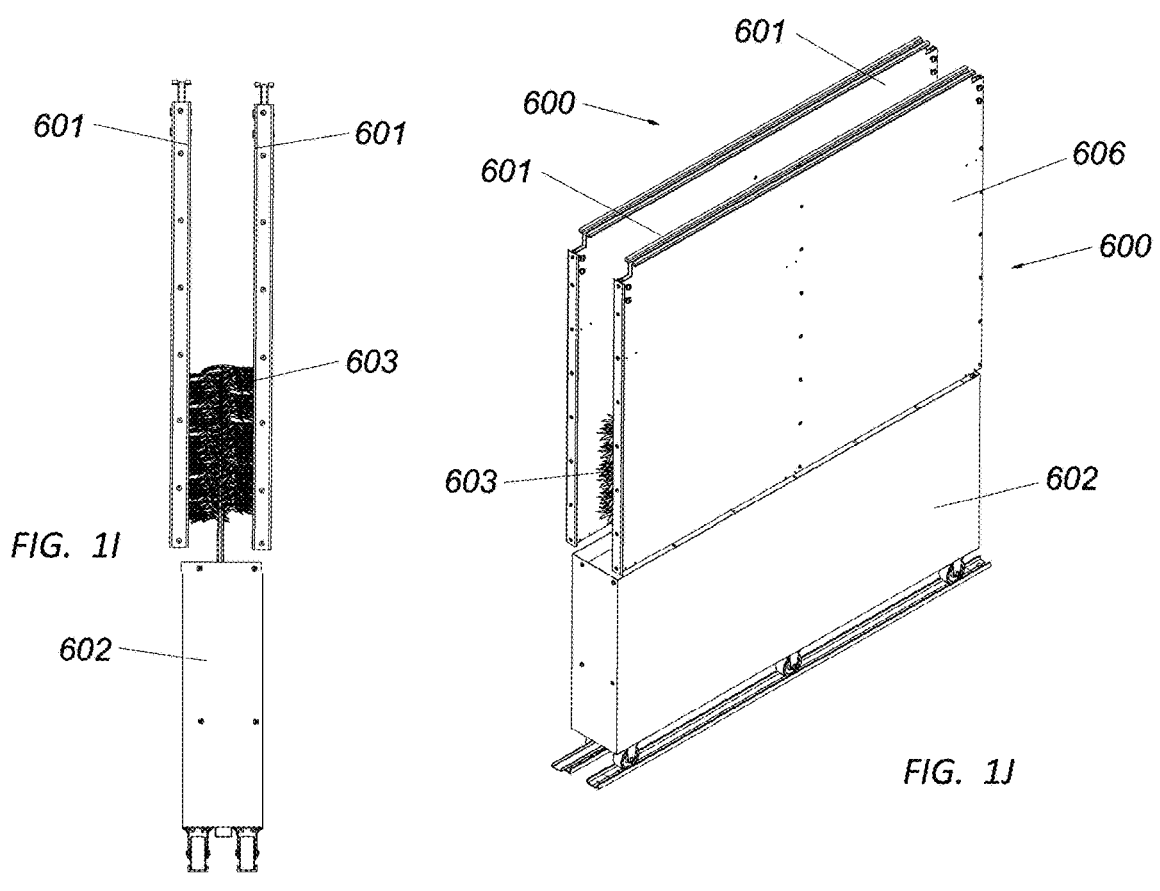
FIG. 1I
FIG. 1J
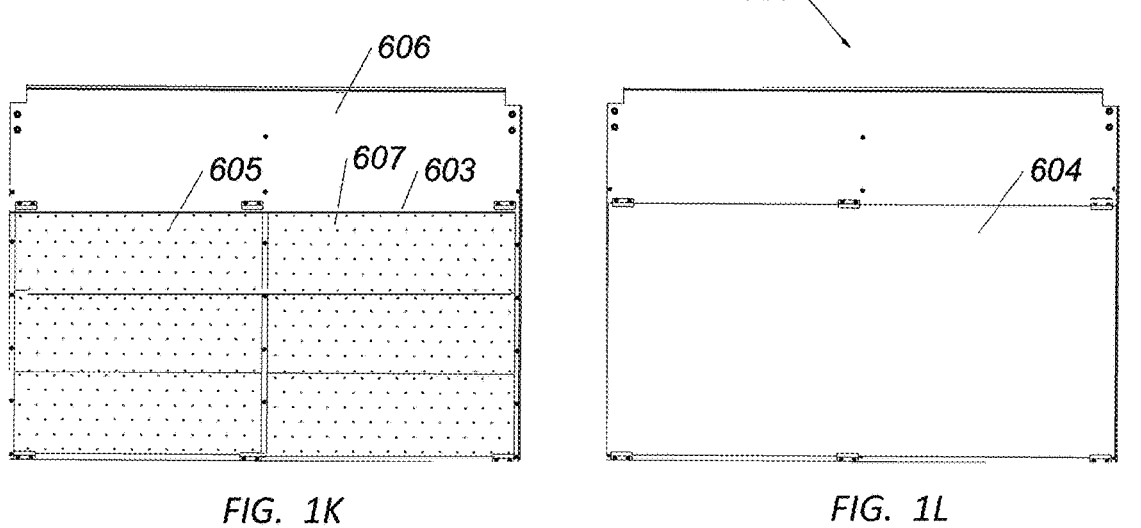
FIG. 1K
FIG. 1L 210  212  211  201  202

320

321

323

323

322

330

330

501

500

501

501

514

503

513

504

515

511

506

550-1

552-1

553-1

PLANT GROWING APPARATUS

CROSS REFERENCE TO RELATED APPLICATIONS

This application is a continuation application of U.S. Non-Provisional patent application Ser. No. 19/256,347, filed Jul. 1, 2025, which is a continuation application under 35 USC § 111 (a) claiming the benefit of International Application No. PCT/CA2024/050091, filed on 26 Jan. 2024, which claims the benefit of the following United States Provisional Patent Applications, the contents of which are incorporated by reference in their entirety as if set forth in full: U.S. Provisional Patent Application No. 63/442,039 entitled "Plant Growing Apparatus" filed Jan. 30, 2023; U.S. Provisional Patent Application No. 63/443,416 entitled "Plant Growing Apparatus" filed Feb. 5, 2023; U.S. Provisional Patent Application No. 63/461,792 entitled "Plant Growing Apparatus" filed Apr. 25, 2023; U.S. Provisional Patent Application No. 63/471,793 entitled "Plant Growing Apparatus" filed Jun. 8, 2023; U.S. Provisional Patent Application No. 63/528,359 entitled "Plant Growing Apparatus" filed Jul. 22, 2023; U.S. Provisional Patent Application No. 63/535,801 entitled "Plant Growing Apparatus" filed Aug. 31, 2023; U.S. Provisional Patent Application No. 63/538,816 entitled "Plant Growing Apparatus" filed Sep. 16, 2023; and U.S. Provisional Patent Application No. 63/543,789 entitled "Plant Growing Apparatus" filed Oct. 12, 2023.

TECHNICAL FIELD

This disclosure generally relates methods and apparatuses for growing plants and for systems and methods that can increase yield, productivity and decrease plant diseases in agriculture.

BACKGROUND OF INVENTION

The ability to increase yield through indoor farming practices, whether greenhouse or vertical farming is relevant in a number of industries, such as the *cannabis* industry. In particular, increasing desirable cannabinoid properties and yields of the plants may be an obvious goal for all *cannabis* cultivators "Producers". Due to the increasingly large *cannabis* market as more jurisdictions have legalized *cannabis*, competition has become more extensive, evident by oversupply and falling prices of retail *cannabis* products. This may be a driving force for Producers to search for all means by which they can lower production costs, increase yields and product quality, and lower the capital investment costs in their facility.

In determining the factors that impact production efficiency in the *cannabis* cultivation industry, the yield per square foot (sq. ft.) is critical. More plants per sq. ft and increased yields per plant, may function to increase the overall efficiency of various resources such as cultivation lighting and HVAC electricity, labor, cloning costs, grow media costs, HVAC and other equipment costs, infrastructure overhead etc. Typically, Producers may get yields of about 50 grams of dried flower per sq. ft. based on overhead lighting and other *cannabis* cultivation methods discussed below. If a novel plant growing method or apparatus could be devised that could significantly increase plant density and could produce yields up to about 1200 grams per sq. ft. (utilizing an illuminated height of about 22"), by example only, while supplying sufficient light, ventilation and volume of grow medium required for each plant, that may be very economically advantageous to Producers.

Due to the historic illegality of *cannabis*, much of the accumulated knowledge on commercial *cannabis* cultivation best practices has not been based on rigorous scientific study, especially with regards to the impact of lighting on yield and product quality. The majority of indoor (non-greenhouse) commercial *cannabis* production in the world utilizes overhead lighting. Most growing strategies may be based on maximizing contact of the upper flowering portions of the plants to the overhead light and diverting the plant's resources towards those upper flowering portions. For example, trellis netting may be used to train the growth characteristics of the plants to provide even separation between branches/colas to allow better light contact. Various pruning techniques may be employed to defoliate areas of the plant to provide better light penetration and said plant resource diversion.

Another long held belief is that *cannabis* plants always exhibit a large degree of apical dominance (that may vary between *cannabis* strains), wherein the top cola(s) will always be dominant to a significant degree in terms of yield and cannabinoid content, while buds from lower portions of the plant may exhibit a significantly lower biomass and cannabinoid content. These lower buds may be of such lower quality that they may be unmarketable as a dried flower product. Additionally, these lower buds may not even be allowed to develop due to defoliation of the lower portions of the plant, or may predominately used for extracts or edibles etc. However, this widely accepted belief may be more influenced by the dominance of overhead lighting with its inherent disadvantages as discussed below.

Studies may have shown that the dried flower yield of *cannabis* plants may be relatively linearly proportional with flowering phase light levels between about 600 up to about 1500-1800 mmol/sec/m2 of light, after which point light saturation and potential damage or heat stress to the plant and to the affected foliage may occur. This, along with the increased electricity cost and the relative diminishing yield returns may create an upper limit to the light levels applied to *cannabis* plants.

Furthermore studies may also show that significantly increased light levels during the vegetative stage of *cannabis* growth cycles, such as from 400-600 mmol/sec/m2 which may be a typical light level used by Producers, increased to 1300 mmol/sec/m2 or more, may significantly increase plant biomass, growth rate, stem diameters, leaf thickness, overall plant photosynthesis etc., and at the same time significantly decrease plant height and leaf size. Accordingly, these increased attributes may be shown to produce corresponding increases in inflorescence yield. However, as previously discussed, *cannabis* plants under overhead lighting may have a light intensity limit, after which plant or leaf damage may occur, especially in the vegetative phase. During the vegetative phase, immature *cannabis* plants may exhibit a lower tolerance for high light levels compared to mature plants.

Throughout the *cannabis* cultivation industry, through scientific studies, and especially to those skilled in the art, it may be widely accepted that light photodamage to *cannabis* plants grown indoors may occur at levels above 1800-2000 μmol/m2/sec. It may also be widely adopted that 1500 mmol/m2/sec may be the practical maximum light levels when considering cost and other factors. Although each cultivar may have different thresholds, these may be considered general guidelines. This also may coincide with nature, wherein maximum direct full sunlight on Earth is approximately 1800-2000 μmol/m2/sec. Accordingly, for those skilled in the art, it would indeed be new and unexpected results to see *cannabis* plants thrive with maximum light levels as high as 3000+ umol/m2/sec as tested in example embodiments of light and recycling diffusion chamber for growing plants. The upper limit value of 3000+ was specified as such due to the fact that commercially available quantum PAR meters may have a range limit of 3000 μmol/m2/sec. In fact, the applicant of this invention would assert that this information would be met with a very high degree of skepticism by anyone involved with *cannabis* cultivation worldwide.

It also may be widely accepted by those skilled in the art that high intensity lighting fixtures create significant heat, both through convection and radiant heat, and require their placement at a significant distance from the plants to avoid heat stress and heat damage to the plants. Although LED light fixtures may create less heat due to their decreased wattage utilization as compared to high pressure sodium or metal halide fixtures, they may nonetheless require a significant separation distance from the plants. A light diffusion chamber for plants, where the plants may touch, be constricted by, and form a vertical canopy against or be disposed in close proximity to the light source would typically cause the plants to fail due to the intense heat. Accordingly, for those skilled in the art, it would indeed be new and unexpected results to see *cannabis* plants thrive under these circumstances and would be met with a very high degree of skepticism by anyone involved with *cannabis* cultivation worldwide.

Some of the current methods of indoor *cannabis* cultivation along with their inherent disadvantages which have been discussed may be rendered obsolete if the physical scale of the *cannabis* growing environment along with its associated infrastructure can be compressed into exponentially smaller novel plant growing apparatuses. For example, as may be shown in example embodiments of the instant invention, sixty-four *cannabis* plants may be disposed in a 20 sq. ft. growing area, or one-quarter sq. ft. per plant. A typical Producer may utilize plant spacings of one plant per two sq. ft. To those skilled in the art, using an example embodiment of plant growing apparatus utilizing LED lighting in a growing space of one-quarter sq. ft. per plant with sixty-four plants may create a seemingly impossible scenario of how to fit the required lighting fixtures into such a restricted space, and how to distribute high intensity light evenly to all the plants, and how to mitigate the large quantity of thermal energy dissipated by the lights.

An inherent reality of growing a large quantity of plants in a highly compressed space as discussed above, may be the difficulty of integrating high intensity lighting into the space, both from a lack of required space, but also from a heat generation perspective. Current high intensity horticultural lighting may consist of high-pressure sodium, metal halide, or LED light fixtures for example. HPS lamps may have a surface temperature of 750° F., while horticulture LEDs such as a Samsung 301H may have a junction temperature of 230° F.

Due to the smaller physical size and lower operating temperatures, an LED light source may be the only practical option for highly compressed grow spaces. However, putting this into perspective, the LED lighting panels in example embodiments of plant growing apparatuses may consume a total of about 19,000 watts of electrical power and radiate about 65,000 BTU of heat within approximately 60 cubic feet. In open air at an ambient temperature of 70° F., the heat sinks from these LED panel fixtures may reach a temperature of 170° F. at full power. The ideal temperature range for *cannabis* may be in the range of 72-85° F. This objective of putting a lighting system as described into 60 cubic feet may be a seemingly impossible. If a novel solution could be found to enable this, and simultaneously enable the desired plant growing temperature range inside example embodiments of plant growing apparatuses, this may represent a substantial innovation in indoor horticulture.

If the noted lighting limitations are overcome by the example embodiments of plant growing apparatus, indoor horticulture may change forever. Also, if such an apparatus could be used for food production plants, it may have a positive impact on world hunger.

If a novel plant growing method or apparatus could be devised that could overcome the issues discussed with respect to *cannabis* cultivation and apply a significantly higher light levels to the plants throughout all phases of plant growth, the size, quantity and quality of all flowering sites, especially on the lower portions of the plants may be significantly increased.

Due to the compressed growing space in example embodiments of the invention as discussed, novel climate control techniques and systems must also be devised in order to ensure proper air flow/ventilation around the plants, prevent plant death or damage, and to maximize plant respiration and photosynthesis. Plant pathogens and insects may be a major issue for *cannabis* growers which may cause North American *cannabis* growers a 10-20 percent loss due to plant diseases. Pathogens and insects may reduce or eliminate crop yields which can be costly for growers.

Additionally, it can be costly for growers to apply various mitigation techniques to control pathogens. One of the mitigation techniques may be the use of various pesticides. However, health concerns and governmental regulations may limit or curtail the use of many different pesticides. The negative impact from the use of chemicals, in addition to extra costs, can include plant stress, pathogen resistance to chemical treatments and interference with biocontrol of diseases that may be kept in check by naturally occurring microflora. More importantly, they may not be eco-friendly. Increasingly, *cannabis* product customers are willing to pay a premium for organically grown *cannabis*.

There may be a movement within the *cannabis* growing industry to develop more sustainable and eco-friendly agricultural practices, with the intention of becoming chemical-free. Airborne pathogens such as fungi, bacteria, viruses etc. may comprise a substantial proportion of *cannabis* diseases, such as powdery mildew and grey mold for example. A majority of different types of airborne pathogens that affect most plants may be removed from air by 99.9% or more with a HEPA filter. However, in indoor cultivation applications it may not be possible or practical to disinfect the entire facility with HEPA filters. If a novel plant growing method or apparatus could be created that could surround plants with disinfected air and an insect barrier, disease and insect damage to the plants may be nearly or completely eliminated.

As such, another cultivation criteria for the optimal growth of plants, is vapor pressure deficit "VPD" (calculated as the difference between the amount of moisture that's actually in the air and the amount of moisture that air could hold at saturation). For example, in a grow trial conducted using example embodiment prototypes of plant growing apparatuses "PGA"s, plants that underwent a less than optimal VPD may have exhibited growth that was subjectively near one-half that of the plants that received optimal VPD environments. In a large typical *cannabis* cultivation facility where each cultivation room may contain hundreds or thousands of plants, it may be impossible using current HVAC methods to maintain a consistent VPD in all parts of the room and around all parts of each plant. If a novel plant growing method or apparatus could be created that could automatically maintain an optimal and consistent climate surrounding small sets of plants, increased plant health, yields and cannabinoid potency may be increased. Again, these plant ventilation strategies may be intertwined with the strategies and techniques discussed above and may be based on the same overlying premise of overhead lighting.

Indoor *cannabis* production, typically initiates with seedling developed from cloned "mother" plants that may be produced in a separate area in a facility and may require about two weeks to develop an adequate root system. After this, the seedlings may be transplanted into larger pots and may be moved to another area of the facility for the vegetation phase which may last about 2-8 weeks. After the vegetation phase, the plants may be again transplanted into larger pots and moved to another area for flowering for about 8-10 weeks. Each area as described may have its own lighting system, HVAC and associated growing infrastructure such as irrigation, etc. The above processes may require intensive labor, equipment, floor space, management, utilities etc. that may represent a substantial expense towards bottom line revenues.

SUMMARY OF INVENTION

In an example embodiment of the disclosed technology, a light diffusion and recycling chamber for growing plants may have one or more adjacent sets of two vertical opposing walls, each with an interior side that faces the other interior side, and wherein the space between the interior sides may define a plant growing space. A plurality of light emitting diodes may be mounted directly or indirectly on each interior side, wherein the light emitting diodes may be configured to emit light into the plant growing space such that each side of a plant disposed in the growing space would receive substantially similar light levels from the bottom to the top of the plant. One or more of a reflective and diffusive material covering a substantial portion of the interior sides may be provided wherein light emitted from the light emitting diodes from each interior side may have reflective, refractive, and light scattering interactions with the one or more of reflective and diffusive material from the opposing interior side. A portion of that light may subsequently be reflected back towards its originating side, therein creating a light recycling loop that may create an increased degree of diffusion and light scattering.

In an example embodiment, the light diffusion and recycling chamber for growing plants may have a width between interior sides that is less than the typical maximum width of plants intended to be grown therein, such that portions of the plants may contact or be in close proximity to the interior sides during their growth phases.

In an example embodiment, the light diffusion and recycling chamber for growing plants may further include light emitting diodes that may be covered with a light diffusing material.

In an example embodiment of light diffusion and recycling chamber for growing plants, the plurality of light emitting diodes and the distance between opposing interior sides may be configured to provide a maximum average light level in excess of 1800 μmol/m2/see in the plant growing spaces.

In an example embodiment, the plant growing apparatus may further include a top cover or enclosure that may enclose the top horizontal space between the one or more adjacent sets of two vertical opposing walls, a back end cover or enclosing means that may encloses the back vertical space between the back ends of the one or more adjacent sets of two vertical opposing walls, and a front end cover that may encloses the front vertical space between the front ends of the one or more adjacent sets of two vertical opposing walls. The front or back cover may be moved to allow access to the plants. An air supply system is provided that may force air into the top areas of the one or more plant growing spaces and subsequently out one or more openings or one contiguous opening at the bottom of each plant growing space, and subsequently venting the air outside the plant growing apparatus, and thereby may provide the one or more plants with ventilation.

In an example embodiment, the plant growing apparatus may further include a top cover or enclosure that may enclose the top horizontal space between the one or more adjacent sets of two vertical opposing walls, a back end cover that may enclose the back vertical space between the back ends of the one or more adjacent sets of two vertical opposing walls, and a front end cover that may encloses the front vertical space between the front ends of the one or more adjacent sets of two vertical opposing walls. The front or back cover may be moved to allow access to the plants. An air supply system is provided that may force air into the bottom areas of the one or more plant growing spaces and subsequently out one or more openings or one contiguous opening at the top of each plant growing space and subsequently venting the air outside the plant growing apparatus, and thereby may provide the one or more plants with ventilation.

In an example embodiment, the plant growing apparatus may further include an air supply system that forces air into the top areas of the one or more plant growing spaces and out one or more openings or one contiguous opening at the bottom of each plant growing space, and then vented to the air outside the plant growing apparatus. The outgoing air stream may form an air pressure barrier around said bottom openings to decrease pathogen and insect ingress into the plant growing apparatus.

In an example embodiment, the plant growing apparatus may be configured to be suspended from a ceiling.

In an example embodiment, the plant growing apparatus may be configured to be supported on a floor surface.

In an example embodiment, the plant growing apparatus may further include insect screens covering any air vents.

In an example embodiment of the disclosed technology, a plant growing apparatus configured to modify the lateral growth of plants may include one or more sets of two vertical adjacent opposing walls. Each wall may comprise an interior surface, wherein the space between each opposing interior surface may define a plant growing space of width X, wherein the plant growing space may be configured to grow one or more plants. A light source is provided that may be integral with the interior surface, and wherein one or more plants disposed in the plant growing space may have their lateral growth restricted to a maximum width of X.

In an example embodiment, the light source may include one or more LED panel arrays.

In an example embodiment, the light source may include one or more LED panel arrays covered by one or more light diffusers.

In an example embodiment of the disclosed technology, a plant growing apparatus may include one or more adjacent sets of two vertical opposing walls, each with an interior side that faces the other interior side, wherein the space between the interior sides may define a plant growing space. A light source is provided that may be integral with each interior side. The one or more adjacent sets of two vertical opposing walls may be configured to be mobile relative to any plants disposed in the plant growing space to allow physical access to the plants.

In an example embodiment, the plant growing apparatus may be configured to partially or fully enclose and engage with one or more mobile plant containers such that the one or more mobile plant containers may enter and exit the one or more plant growing spaces.

In an example embodiment, the one or more adjacent sets of two vertical opposing walls may be configured to be raised and lowered to enable physical access to the plants.

In an example embodiment, the plant growing apparatus may be configured to partially or fully enclose and engage one or more mobile plant containers that are configured to be disposed in the proximity of corresponding one or more adjacent plant growing spaces. The one or more mobile plant containers may further be configured to contain plants and a grow medium, and wherein the one or more mobile plant containers may comprise two or more adjacent sets of wheels and a platform disposed underneath the one or more plant containers. The platform may comprise one or more adjacent sets of tracks configured to engage corresponding adjacent sets of wheels from the one or more mobile plant containers such that the tracks may guide the one or more mobile plant container's movement in and out of the plant growing apparatus.

In an example embodiment, the plant growing apparatus may be configured to partially or fully enclose and engage one or more mobile plant containers that may be configured to be disposed in the proximity of corresponding one or more adjacent plant growing spaces, wherein the one or more mobile plant containers may be further configured to contain plants and a grow medium. The one or more mobile plant containers may include two or more adjacent sets of wheels, and the one or more adjacent tracks may be configured to mate with corresponding one or more sets of adjacent tracks on another platform that is mobile, thereby enabling the one or more mobile plant containers to be moved to the other platform, such that all of the one or more mobile plant growing containers may be moved as an ensemble.

In an example embodiment of the disclosed technology, a plant growing apparatus with externally vented convection heat may comprise at least one set of two opposing panels of thermally conductive material separated by an air space, at least one set of two opposing vertically elongated front and back filler plates attached to the at least one set of two opposing panels, whereby a narrow rectangular air duct may be formed that may comprise a top and a bottom. It may further include a plurality of LEDs mounted on the at least two opposing panels whereby heat generated from the plurality of LEDs may be transferred to the air duct. An air plenum that contains LED drivers may be disposed on the top of the at least one set of two opposing panels, wherein the top of the at least one rectangular duct may be connected to the air plenum, whereby air may be pulled through the bottom opening of the at least one rectangular air duct and into the air plenum by a fan, and heat generated by the plurality of LEDs and the LED drivers may be directed to a remote location.

In an example embodiment of the disclosed technology, a ventilation duct for growing plants therein may include an enclosure comprising four perimeter walls, an enclosure top comprising one or more openings or one contiguous opening that may be configured to enable air to enter or exit the enclosure, along with an enclosure bottom comprising one or more openings or one contiguous opening that may be configured to enable air to exit or enter the enclosure. One or more light sources are provided inside the enclosure that may be configured to emit light towards the inside of the enclosure, and one or more fans may be configured to force air through the enclosure. The ventilation duct may be configured to grow one or more plants inside the enclosure.

In an example embodiment, one or more of the four perimeter walls may be configured to be movable such that any plants disposed inside the enclosure may enter or exit the enclosure through the one or more movable perimeter walls that has been moved.

In an example embodiment, the ventilation duct may be configured to be vertically raised or lowered, thereby enabling access to any plants disposed inside the ventilation duct.

In an example embodiment of the disclosed technology, a plant drawer may include an elongated container configured to contain one or more plants and plant growing medium. The elongated plant container may comprise two elongated perimeter walls each with a height of X and two shorter perimeter walls each with a height of X and a width of Z and wherein X is greater than two times Z. A container bottom may comprise a bottom surface with two or more opposing pairs of rolling devices attached to the bottom surface that may be configured to enable the plant drawer to be conveyed along corresponding two or more tracks, wherein each plant drawer may be configured to contain a single row of one or more plants.

In an example embodiment, the plant drawers may further include one or more removable plant dividers with a height equal to, or similar to X, and a width equal to or similar to Z, wherein each plant divider may be configured to substantially separate the root systems of each plant disposed inside the plant drawers.

In an example embodiment, the plant drawer may further comprise drainage holes on the container bottom, and one or more channels attached underneath the container bottom, wherein the one or more channels may be configured to funnel and contain liquids that drain out the drainage holes and convey the liquids to a location that is remote from the plant drawer.

In an example embodiment, the plant drawer may further include four or more removable vertical rods attached to the container wherein the four or more rods protrude above the top of the plant containers, and may be configured to secure trellis netting.

In an example embodiment, the plant drawer may be configured to be moved in and out of a plant growing apparatus, the plant growing apparatus comprising an enclosure configured to grow plants therein.

In an example embodiment of the disclosed technology, a *cannabis* plant morphology modifying apparatus may include one or more sets of two vertical opposing walls. Each wall may include an interior surface wherein the space between each opposing interior surface may define a plant growing space. A plurality of a light emitting diodes may be disposed on a majority of the interior surfaces, wherein the plurality of light emitting diodes and the distance between each opposing interior surface may be configured to provide a maximum light level in excess of 1500 umol/m2/sec when measured at any point in the plant growing space when plants are not present in the plant growing space. During certain times during the growth phases of one or more *cannabis* plants disposed in the *cannabis* plant morphology modifying apparatus, said apparatus may be intended to operate at a sufficiently high light level to cause the *cannabis* plants to mature with one or more of shorter internode distances, smaller foliage, larger diameter trunks, larger inflorescence numbers and larger inflorescence weights as compared to the same one or more *cannabis* plants grown utilizing direct overhead lighting at any light quantity or light intensity.

In an example embodiment, the interior surfaces may further include light reflecting material on a majority of their surfaces.

In an example embodiment of the disclosed technology, a plant growing chamber may comprise multiple elongated adjacent rows of plant growing space. Vertical walls may separate each row, wherein each wall may comprise a light source that faces a corresponding plant growing space. One or more vertical end walls may enclose each end of each plant growing space. There may be provided a separate air supply duct and inline duct fan for each row, a separate humidifier for each row and a separate control device and sensor probe for each row, wherein the control device may control a corresponding fan and a humidifier in each row such that the controller can adjust the humidity level and air flow in each row.

In an example embodiment, the plant growing chamber may further include an inline duct heater for each row.

In an example embodiment, the humidifiers and fans may be attached to a frame that forms a separate apparatus that is attachable and detachable from the plant growing apparatus.

In an example embodiment of the disclosed technology, a plant growing apparatus with separate air modification system may include multiple elongated adjacent rows of plant growing space. Vertical walls may separate each row wherein each wall comprises a light source that faces a corresponding plant growing space. One or more vertical end walls may enclose each end of each plant growing space. A separate air modification system may comprise a frame, a separate air supply duct and inline duct fan for each plant row, a separate air humidifier for each plant row, a water drainage system for the humidifiers, and a water input device for the humidifiers. The separate air modification system may be configured to be movable relative to the plant growing apparatus.

In an example embodiment, the plant growing apparatus with separate air modification system may further include inline duct heaters for each plant row.

In an example embodiment of the enclosed technology, a hollow bottomless plant container may comprise a four-sided profile with four perimeter walls defining a hollow enclosure comprising a semi-rigid material, an open top and an open bottom. One of the walls may have a slit from top to bottom that may enable the hollow enclosure to be separated outwards away from the slit.

10

Figure 1A:
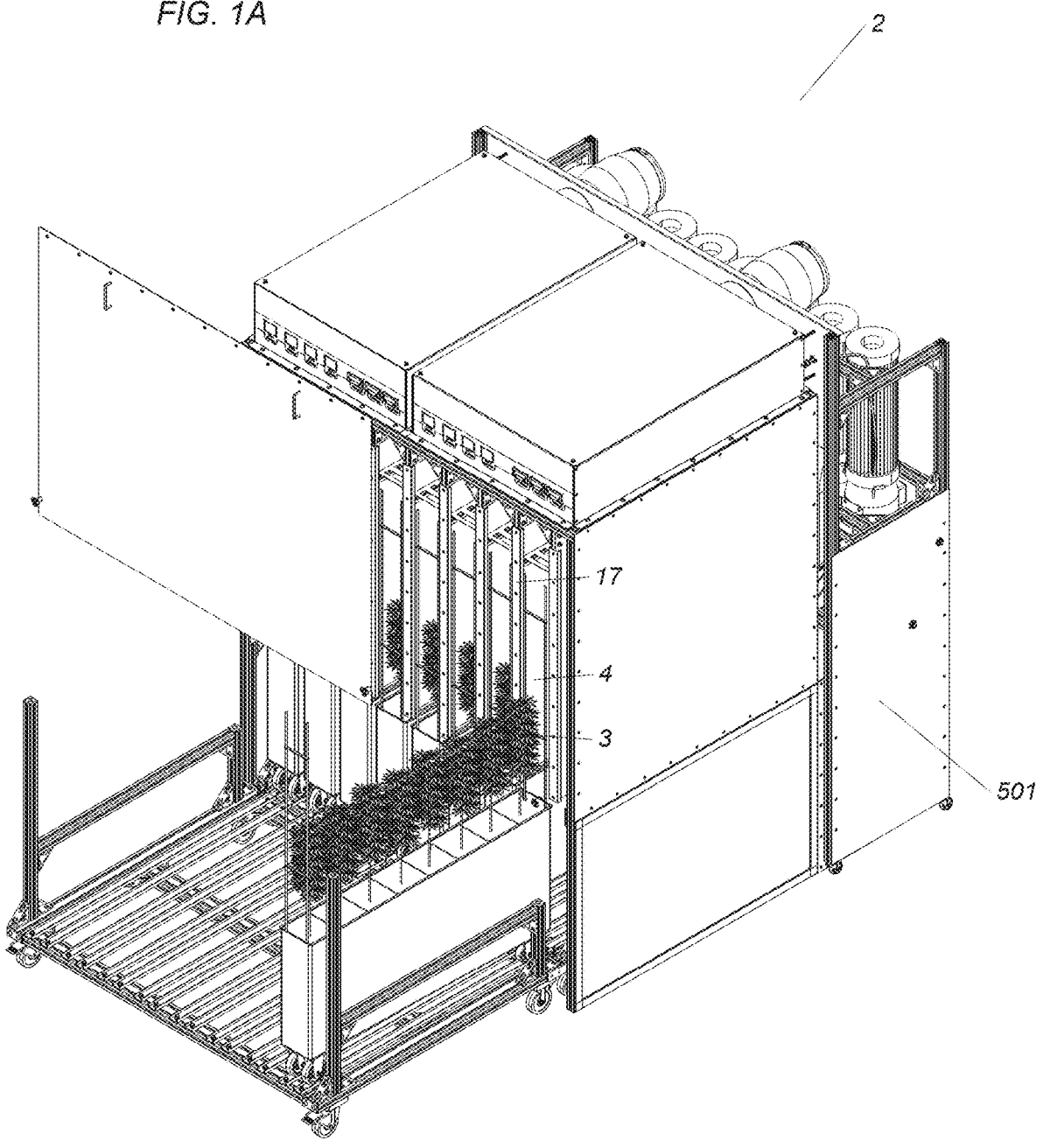
FIG. 1A shows a top perspective view of an example embodiment of plant growing apparatus.
Figure 1B:
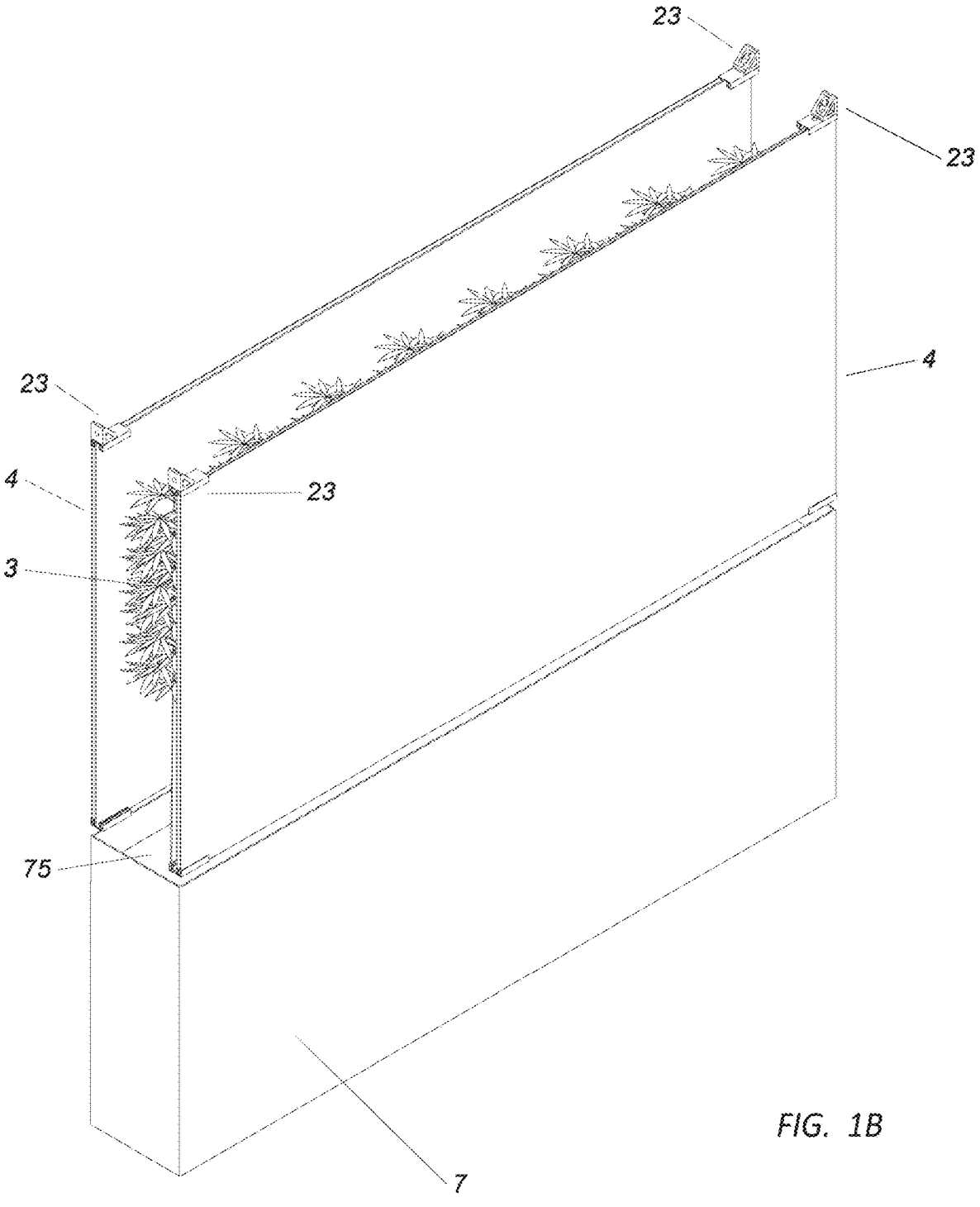
FIG. 1B shows a top perspective view of an example embodiment of plant growing apparatus.
Figures 1C, 1D:
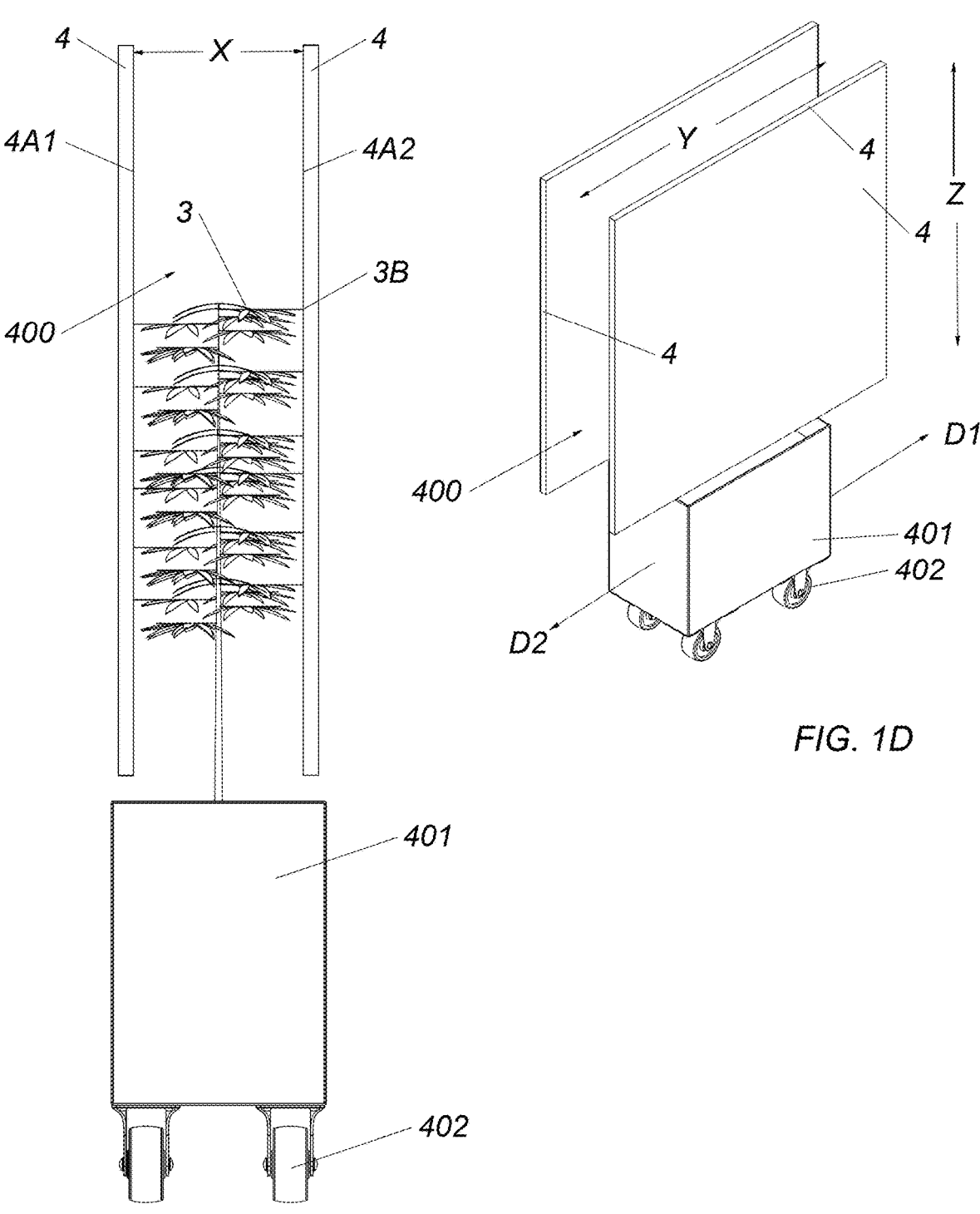
FIG. 1C shows a profile view of an example embodiment of plant growing apparatus.
FIG. 1D shows a perspective view of the example embodiment of plant growing apparatus shown in FIG. 1C.
Figures 1E, 1F:
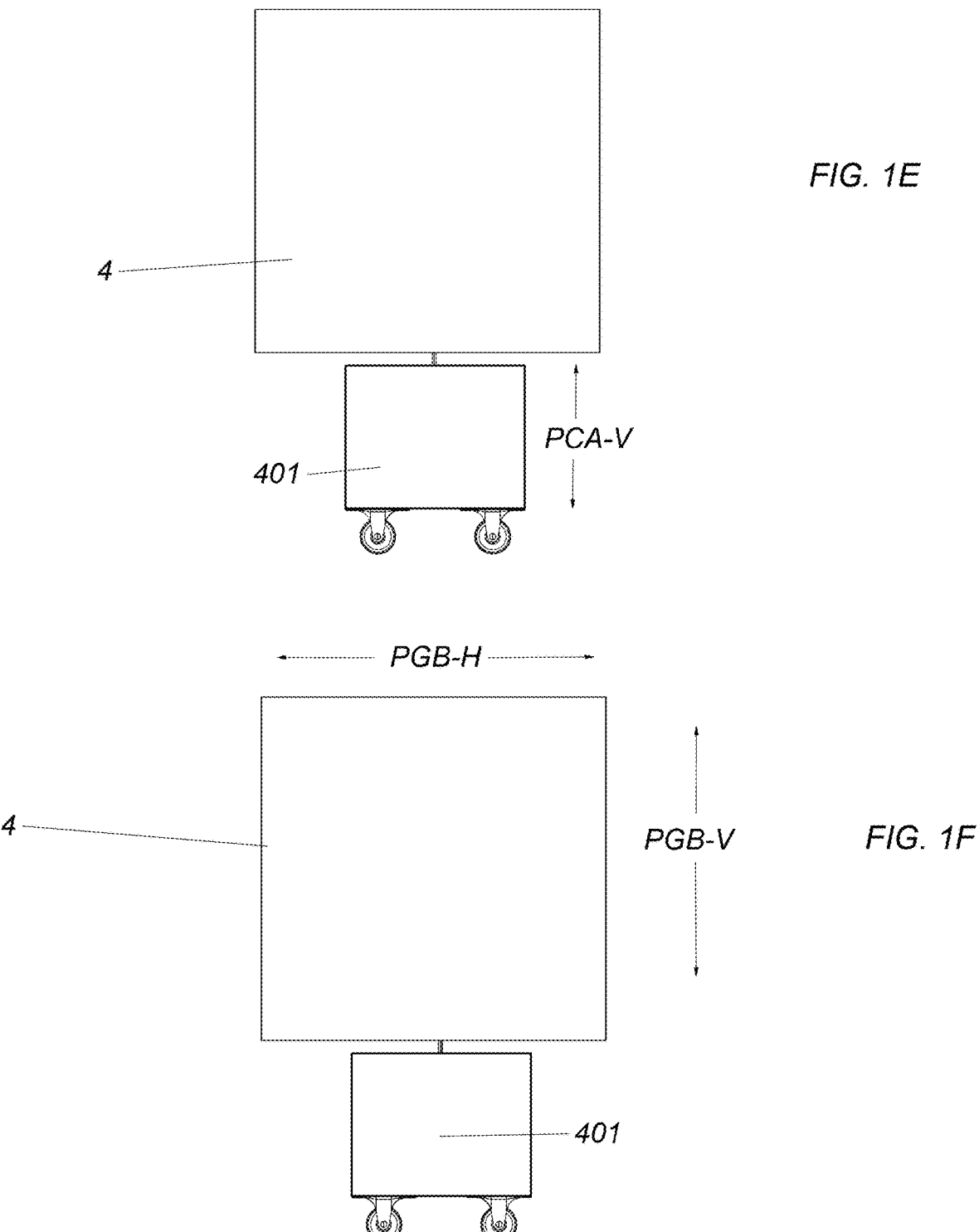

FIG. 1E shows a side view of an example embodiment of plant growing apparatus with a movable plant container assembly.

FIG. 1F shows a side view of an example embodiment of plant growing apparatus with movable plant growth barriers.

Figures 1G, 1H:
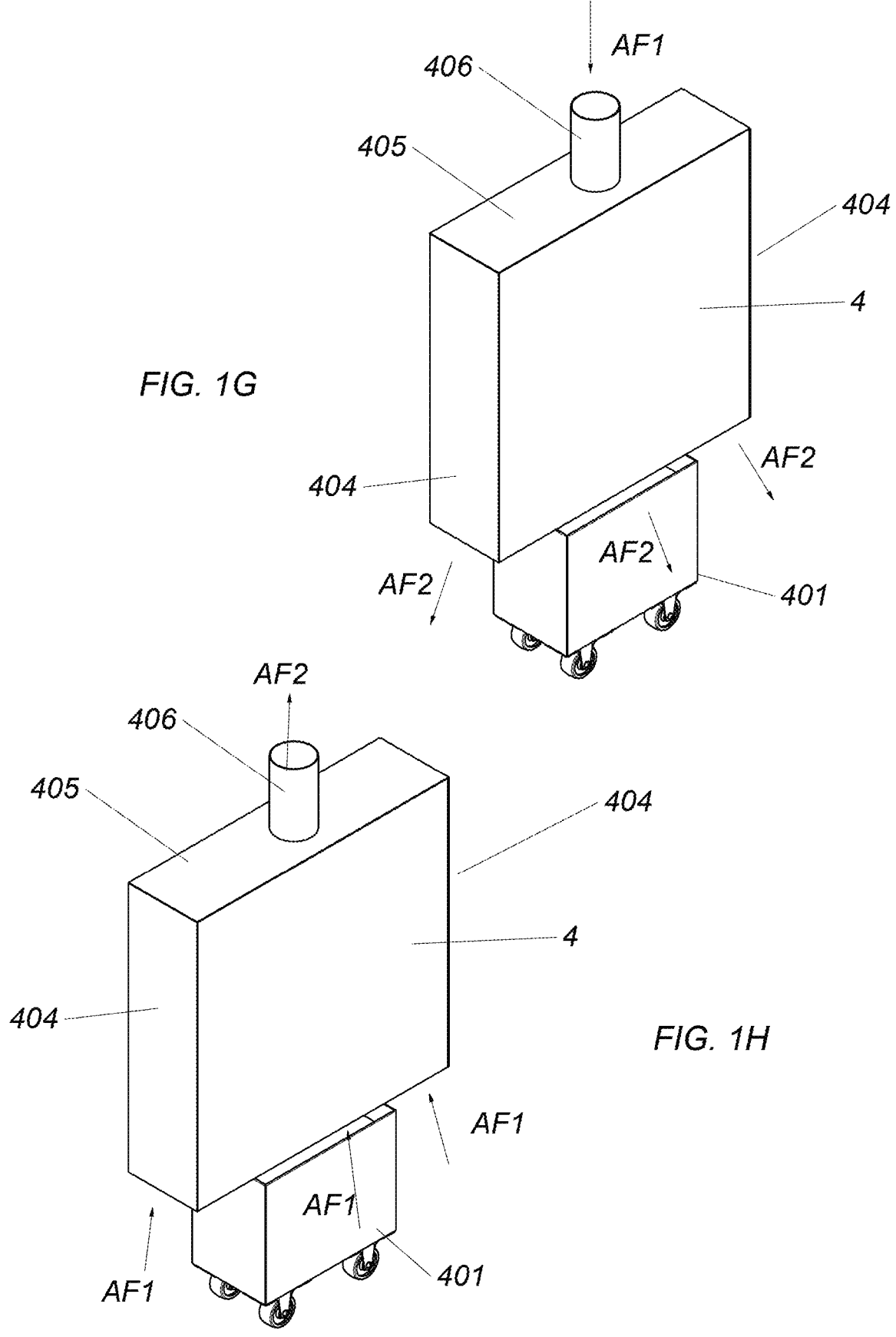

FIG. 1G shows a perspective view of an example embodiment of plant growing apparatus with enclosed ends and top and shows air flow direction.

FIG. 1H shows a perspective view of another example embodiment of plant growing apparatus with enclosed ends and top and shows air flow the opposite direction as shown in FIG. 1H.

FIG. 1I shows a front profile view of an example embodiment of light diffusion and recycling chamber for growing plants.

FIG. 1J shows a perspective view of the example embodiment of light diffusion and recycling chamber for growing plants shown in FIG. 1I.

FIG. 1K shows a profile view of the light engine of example embodiment of light diffusion and recycling chamber for growing plants shown in FIG. 1I.

FIG. 1L shows a profile view of the light engine with light diffuser of the example embodiment of light diffusion and recycling chamber for growing plants shown in FIG. 1I.

Figure 2:
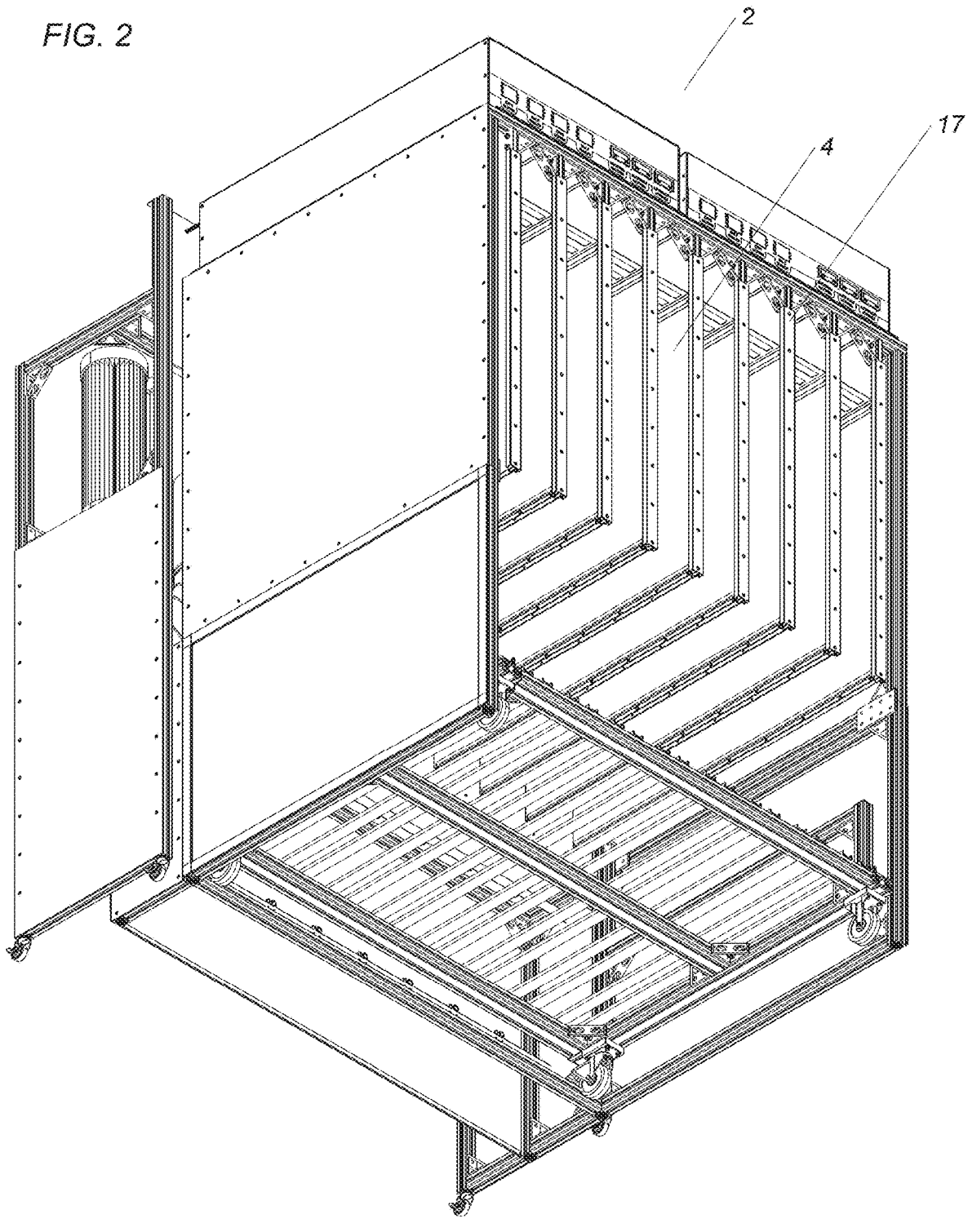

FIG. 2 shows a bottom perspective view of an example embodiment of plant growing chamber similar to that shown in FIG. 1A.

Figures 3A, 3B, 4:
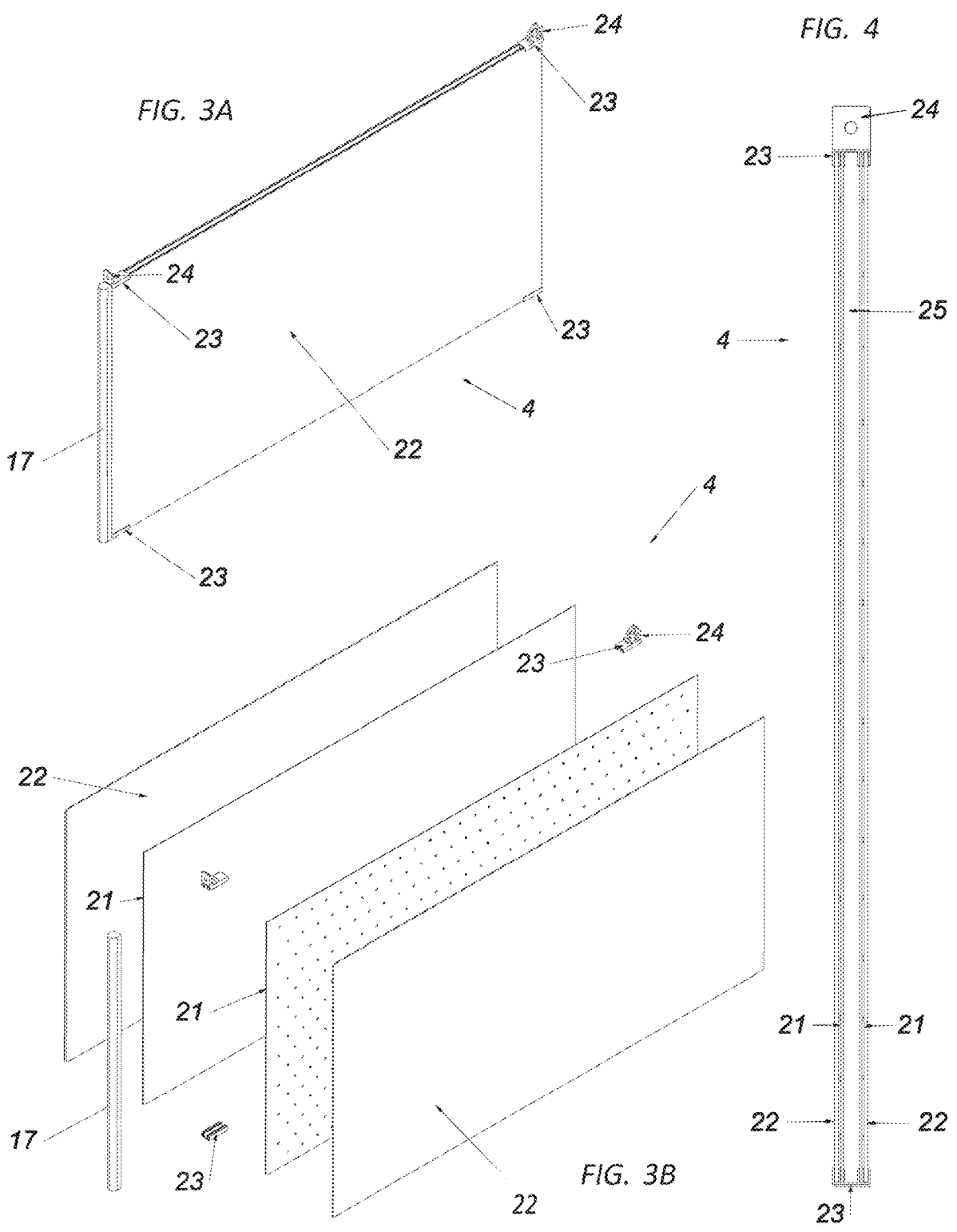

FIG. 3A shows a top perspective view of an example embodiment of light panel assembly.

FIG. 3B shows an exploded top perspective view of the example embodiment of the light panel assembly shown in FIG. 3A.

FIG. 4 shows a profile view of the example embodiment of the light panel assembly shown in FIG. 3A.

Figures 5A, 5B, 5C:
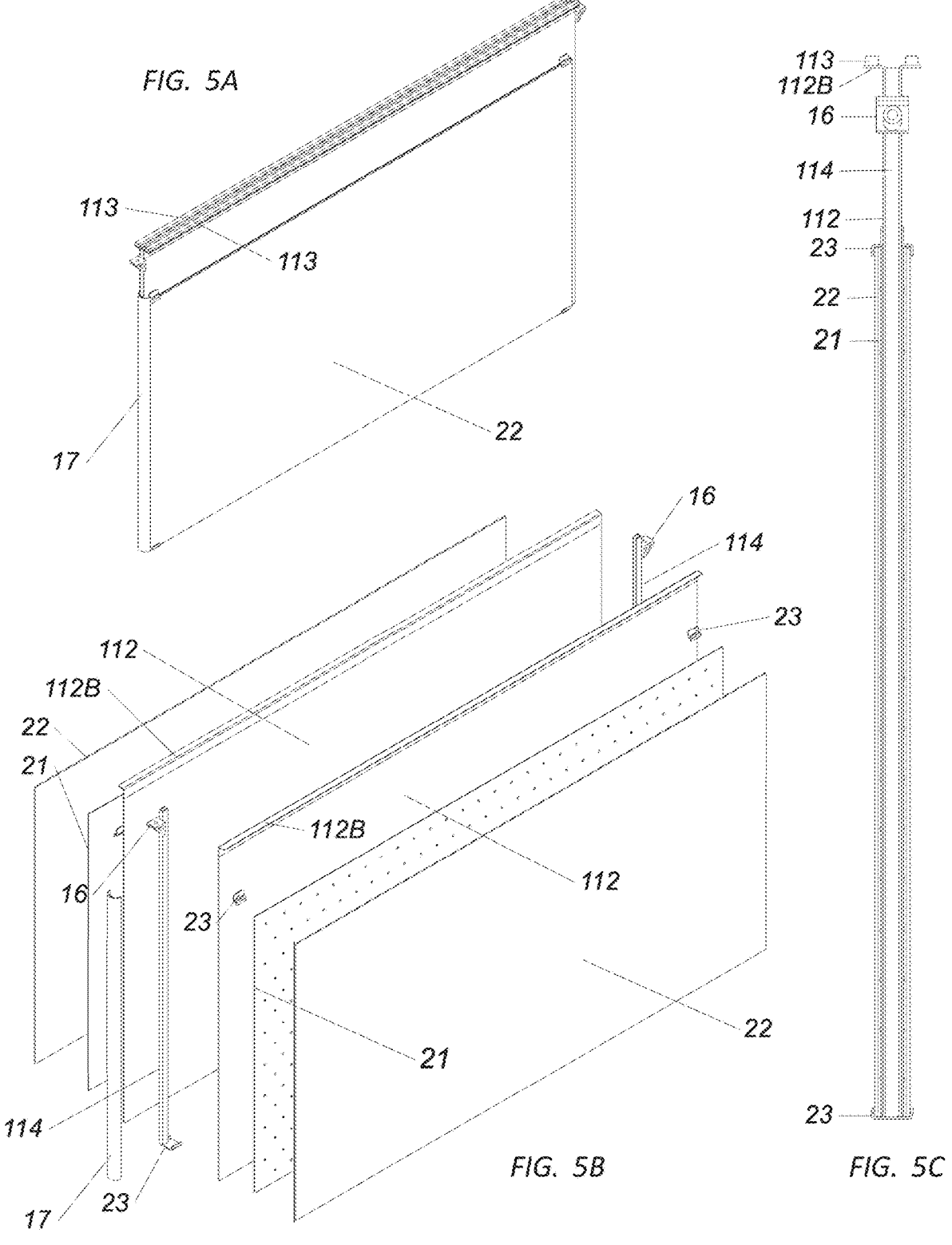

FIG. 5A shows a top perspective view of an example embodiment of light panel assembly.

FIG. 5B shows a top perspective exploded view of the example embodiment of light panel assembly shown in FIG. 5A.

FIG. 5C shows a profile view of the example embodiment of light panel assembly shown in FIG. 5A.

Figures 6A, 6B:
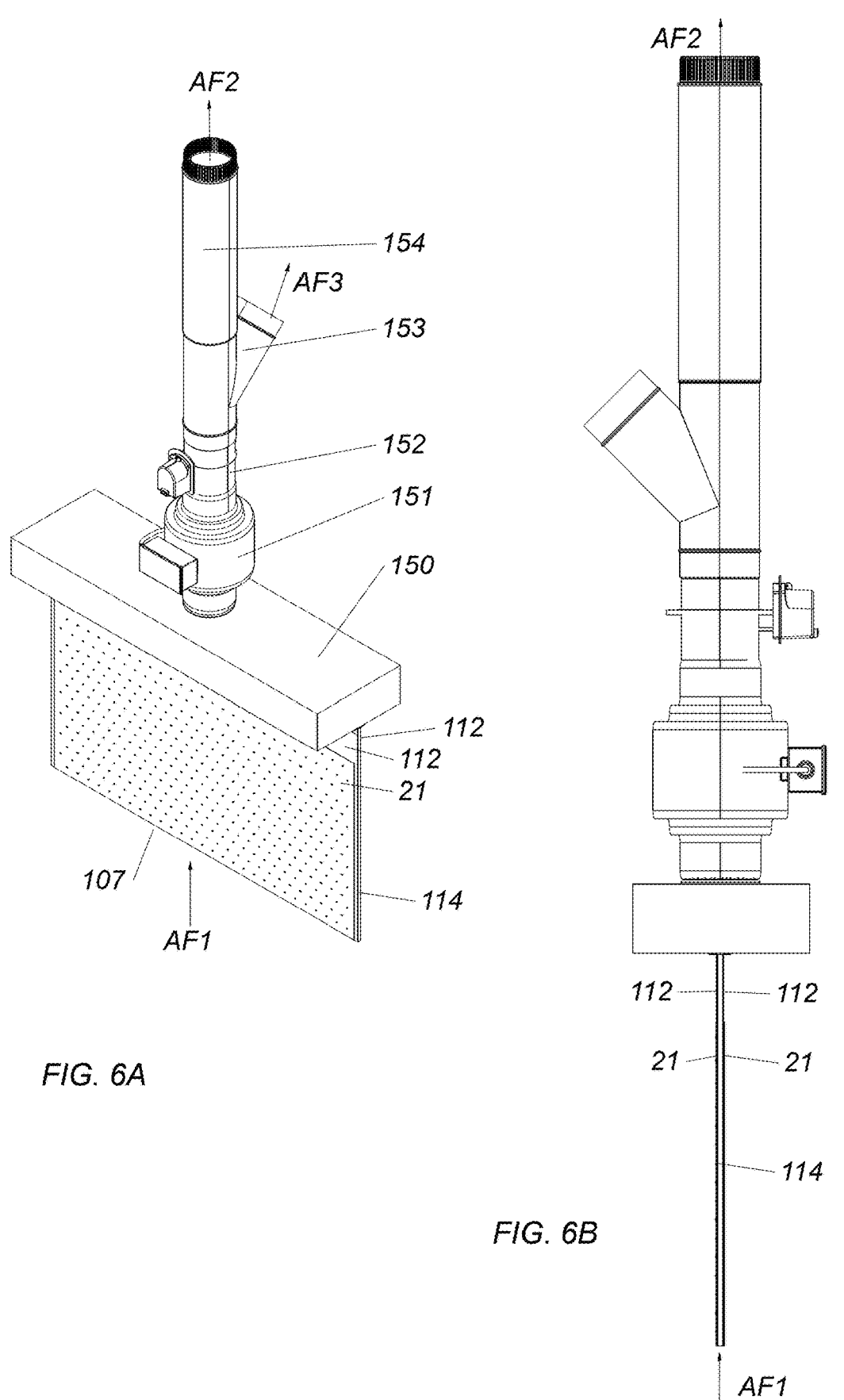

FIG. 6A shows a top perspective view of an example embodiment of a remotely vented light fixture.

FIG. 6B shows a profile view of the example embodiment of a remotely vented light fixture shown in FIG. 6A.

Figure 7:
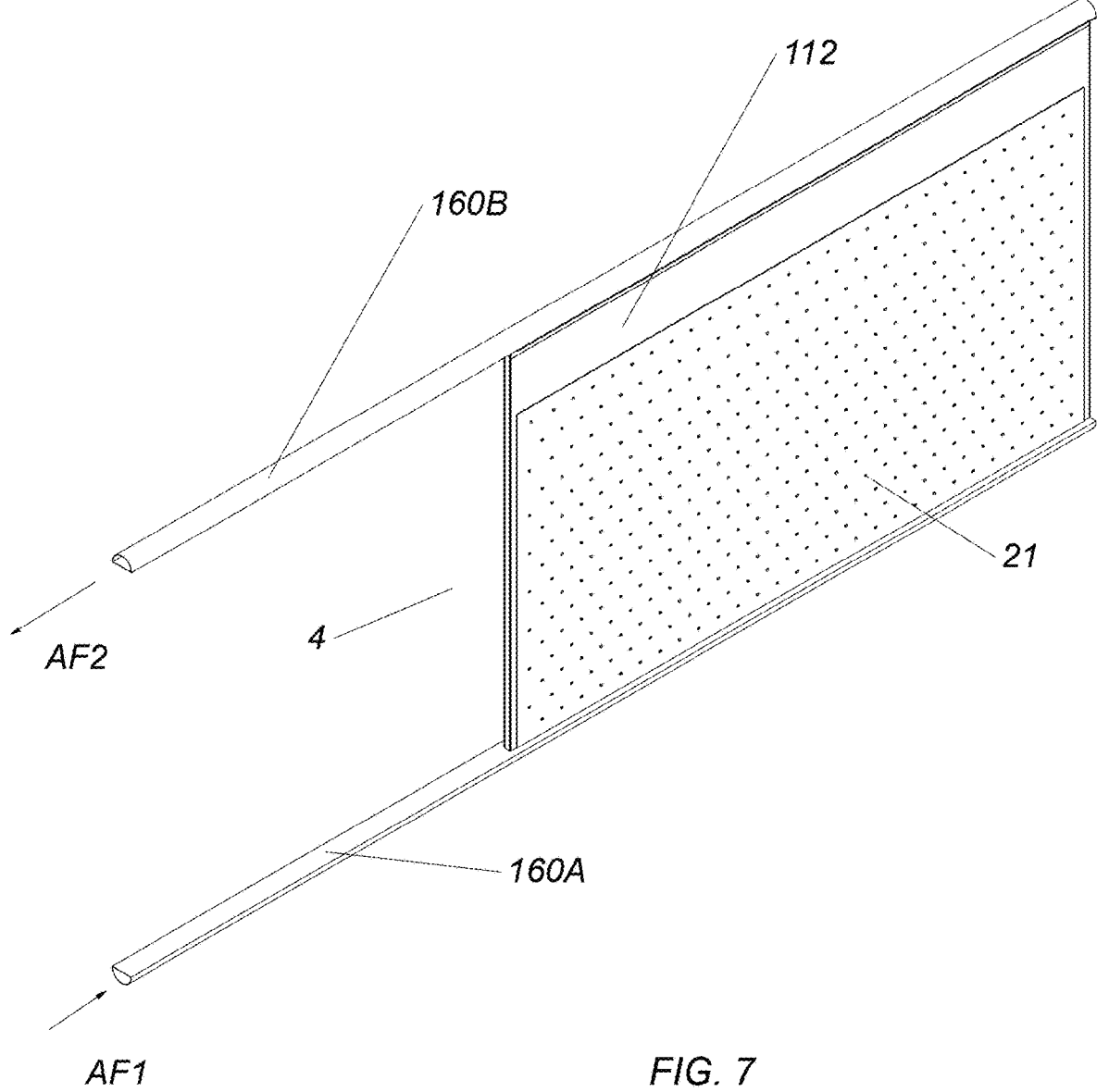

FIG. 7 shows a top perspective view of an example embodiment of a remotely vented light fixture.

Figure 8A:

FIG. 8A shows a front perspective view of an example embodiment of plant growing apparatus.

Figure 8B:
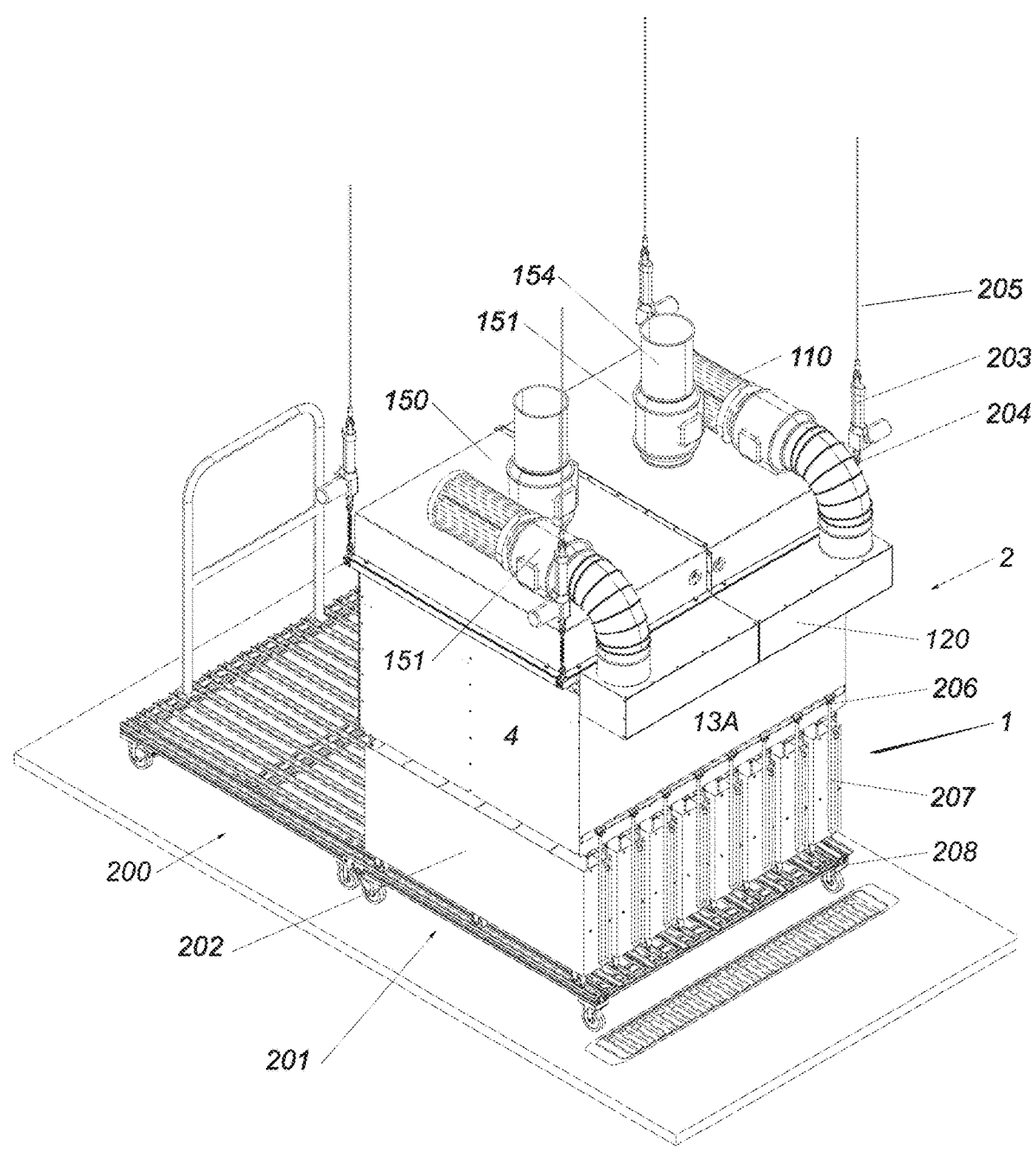

FIG. 8B shows a back perspective view of the example embodiment of plant growing apparatus shown in FIG. 8A.

Figure 9A:
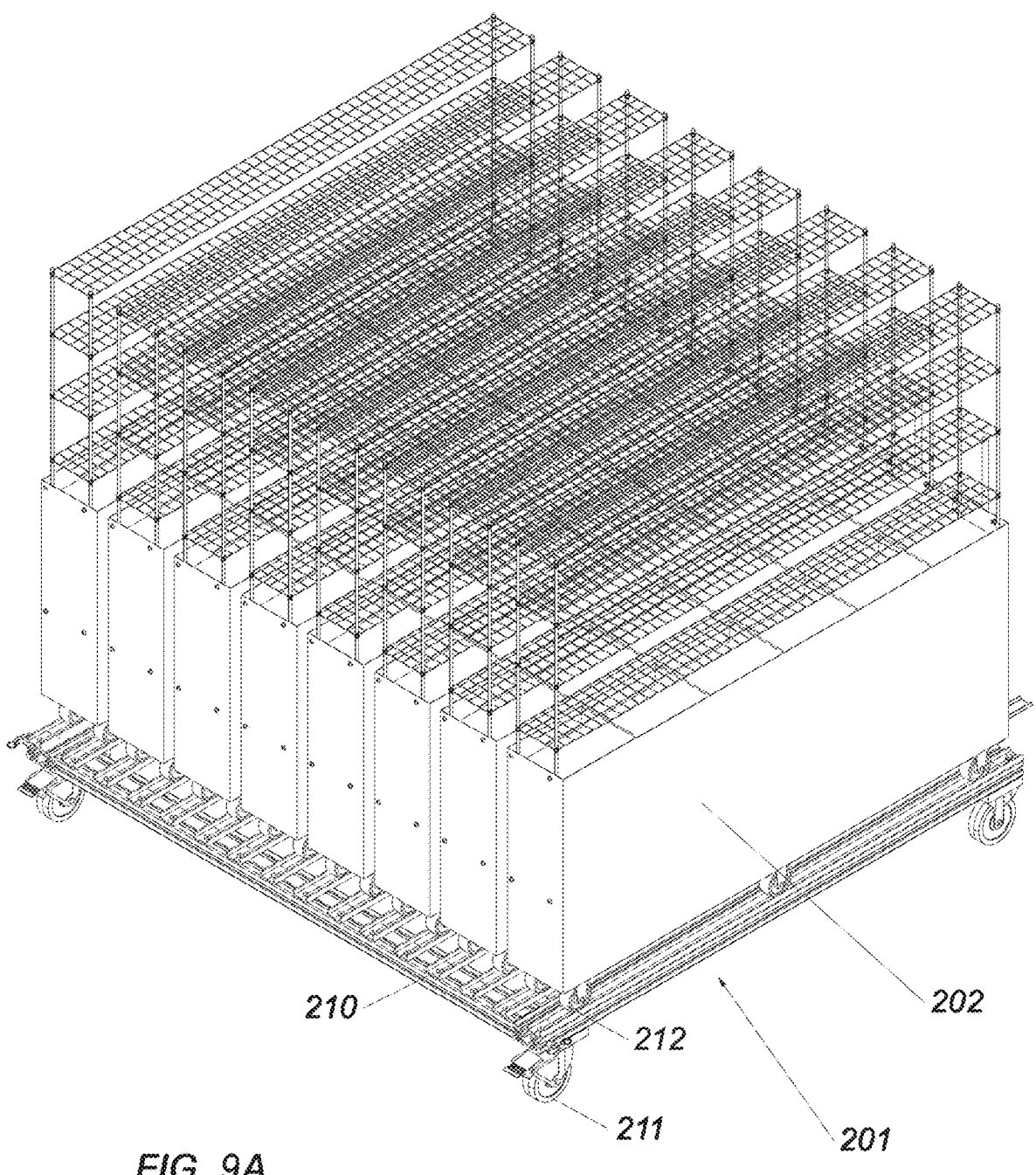

FIG. 9A shows a front perspective view of an example embodiment of mobile plant container comprising individual mobile plant drawers.

Figure 9B:
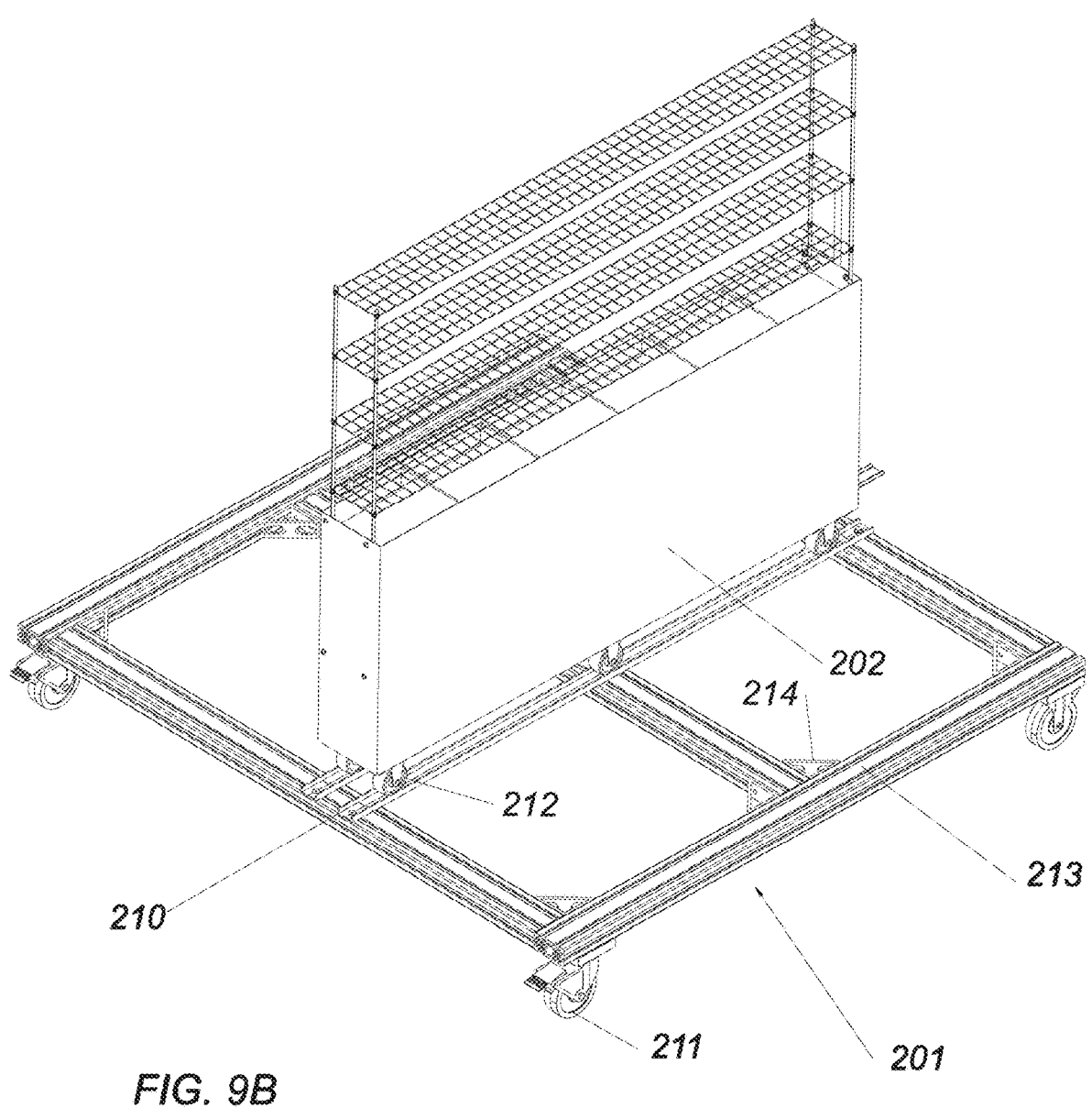

FIG. 9B shows a front perspective view of the mobile plant container comprising individual mobile plant drawers shown in FIG. 9A, except all the mobile plant drawers except one have been removed for illustrative purposes.

Figures 9C, 9D, 9E:
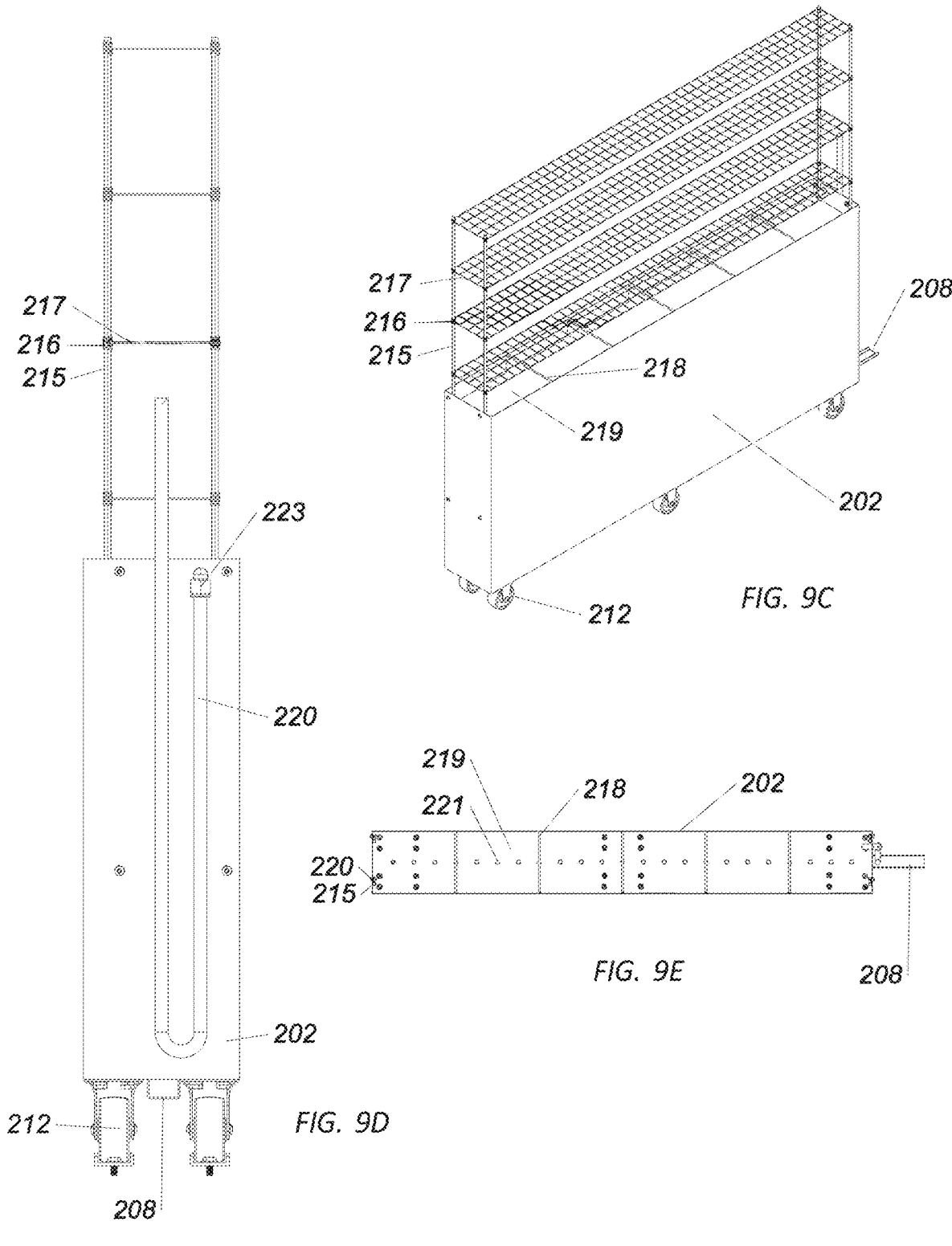

FIG. 9C shows a front perspective view of an example embodiment of plant drawer.

FIG. 9D shows a back profile view of the example embodiment of plant drawer shown in FIG. 9C.

FIG. 9E shows a plan view of the example embodiment of plant drawer shown in FIG. 9C.

Figure 10:
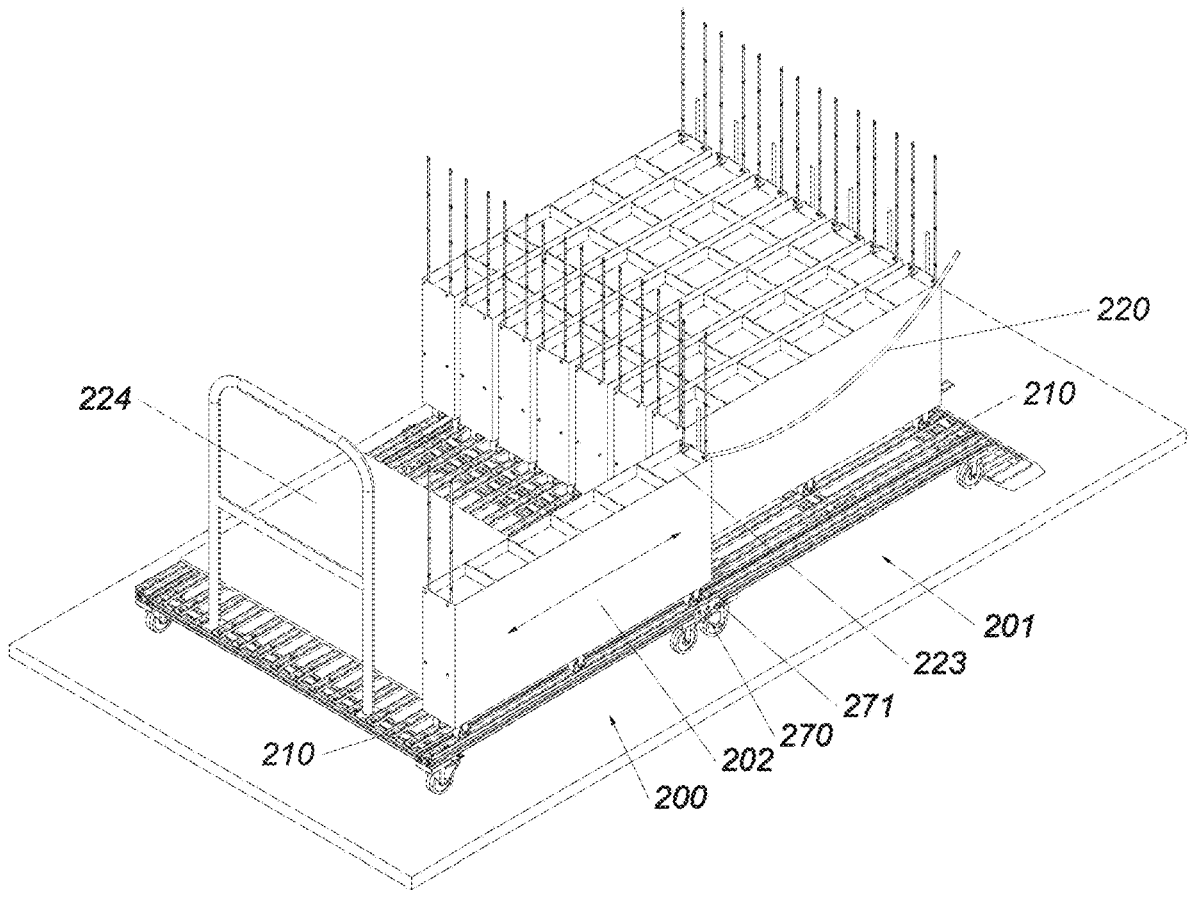

FIG. 10 shows a front perspective view of the mobile plant container comprising individual mobile plant drawers shown in FIG. 9, engaged with a maintenance dolly.

Figure 11:
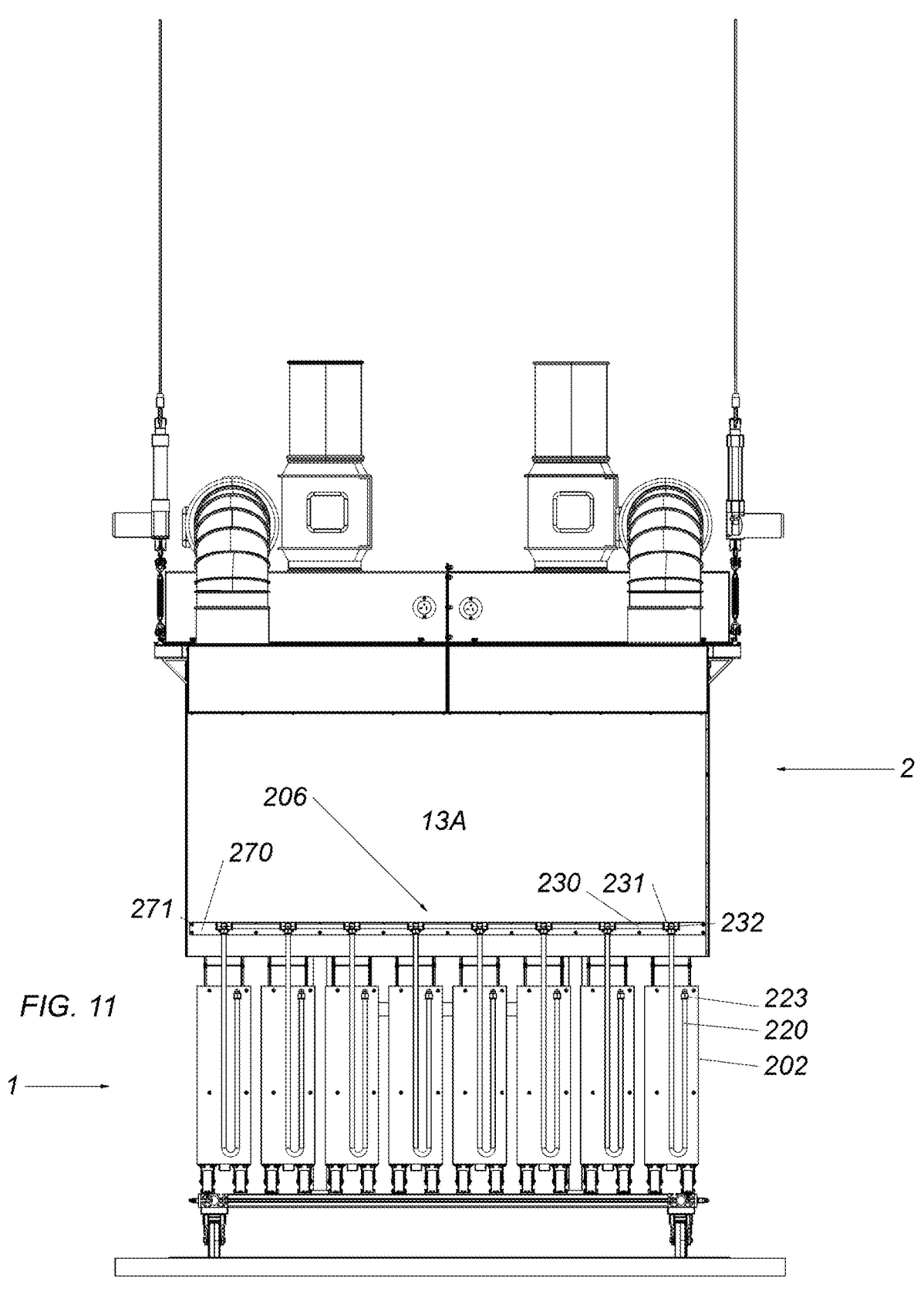

FIG. 11 shows a back profile view of the example embodiment of plant growing apparatus shown in FIG. 8A.

Figure 12:
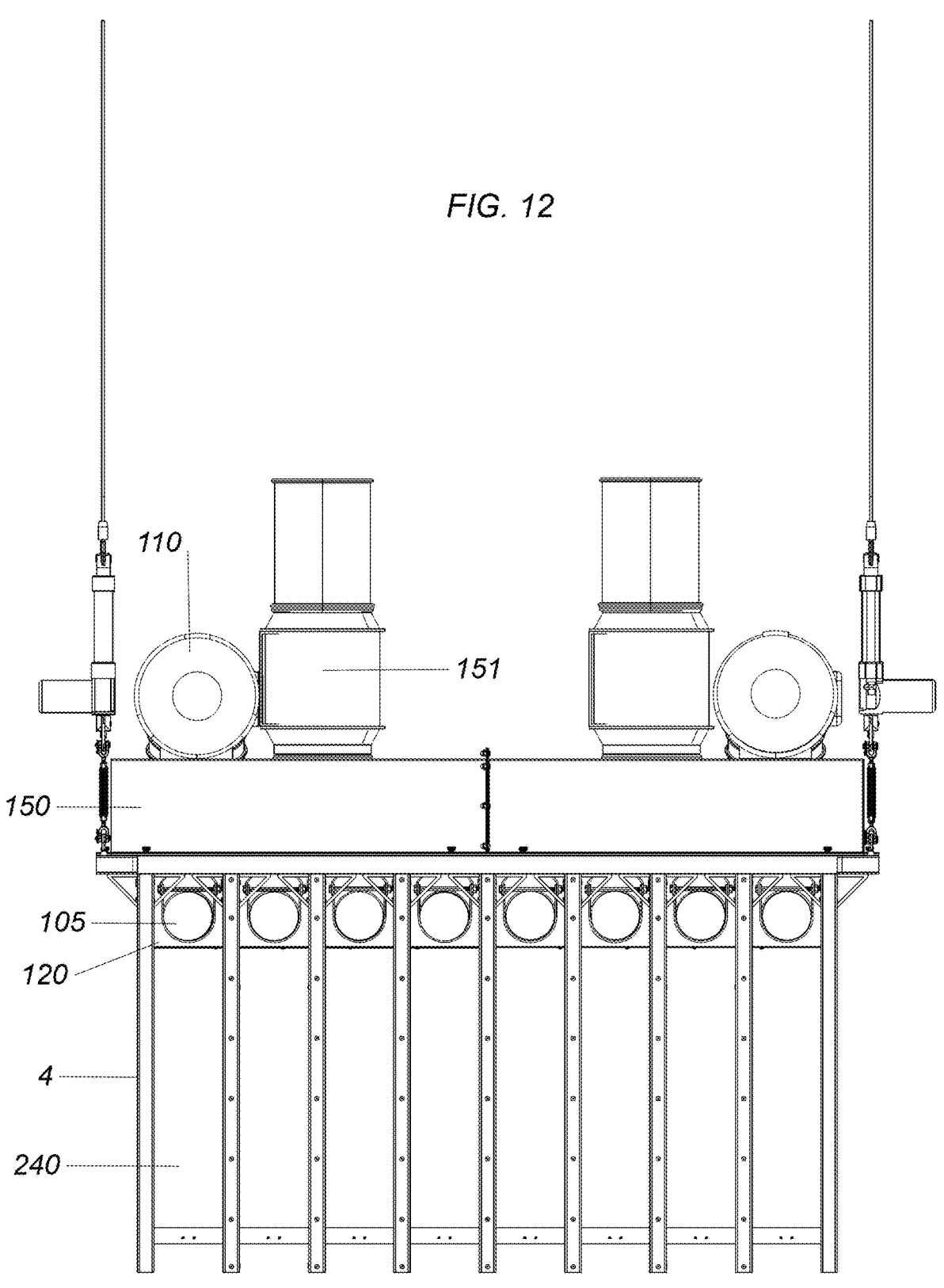

FIG. 12 shows a front profile view of an upper portion of the example embodiment of plant growing chamber shown in FIG. 8A.

Figures 13A, 13B:
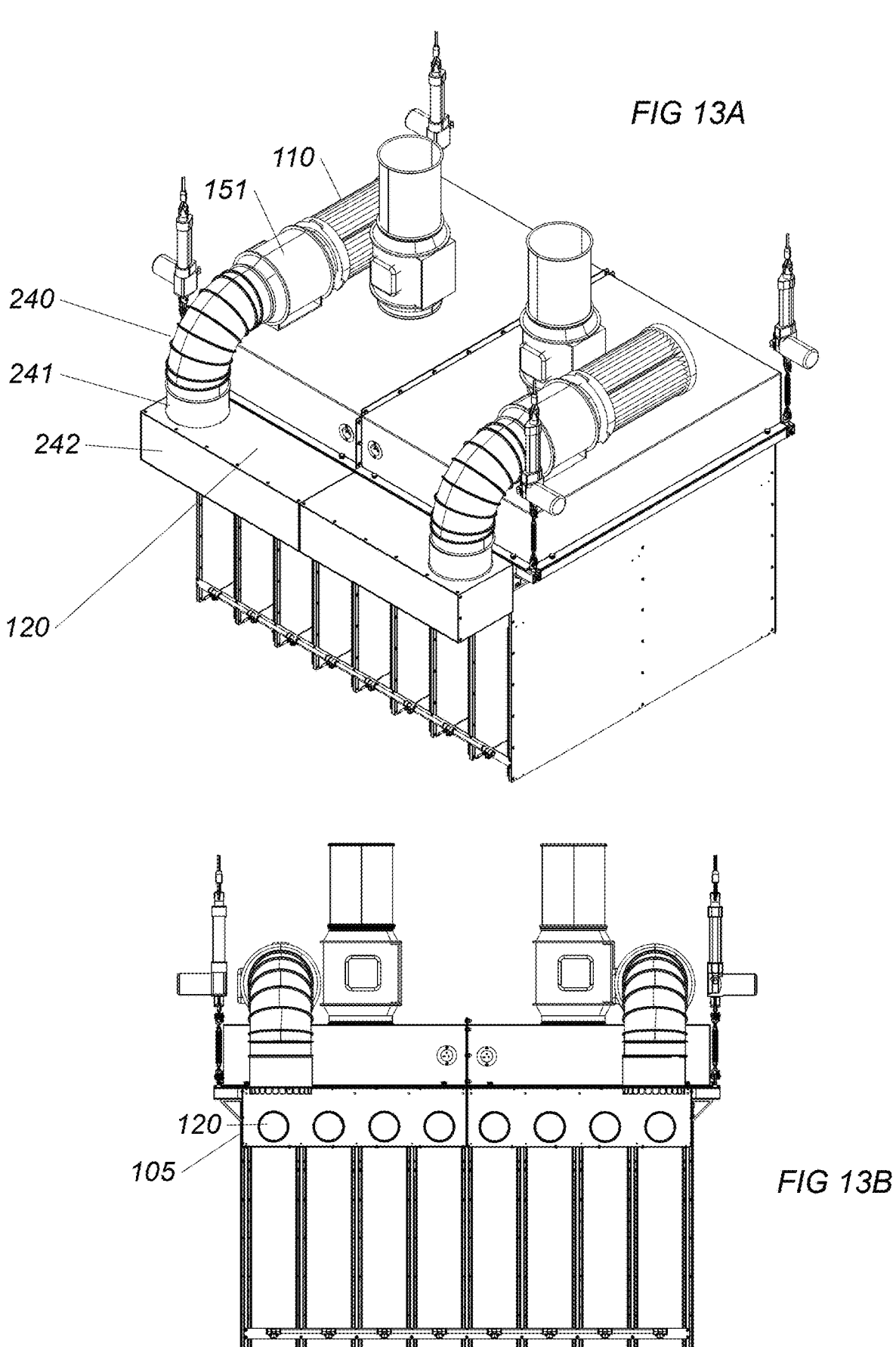

FIG. 13A shows a back perspective view of an upper portion of the example embodiment of plant growing chamber shown in FIG. 8A.

FIG. 13B shows a back profile view of an upper portion of the example embodiment of plant growing chamber shown in FIG. 8A.

Figures 14A, 14B:
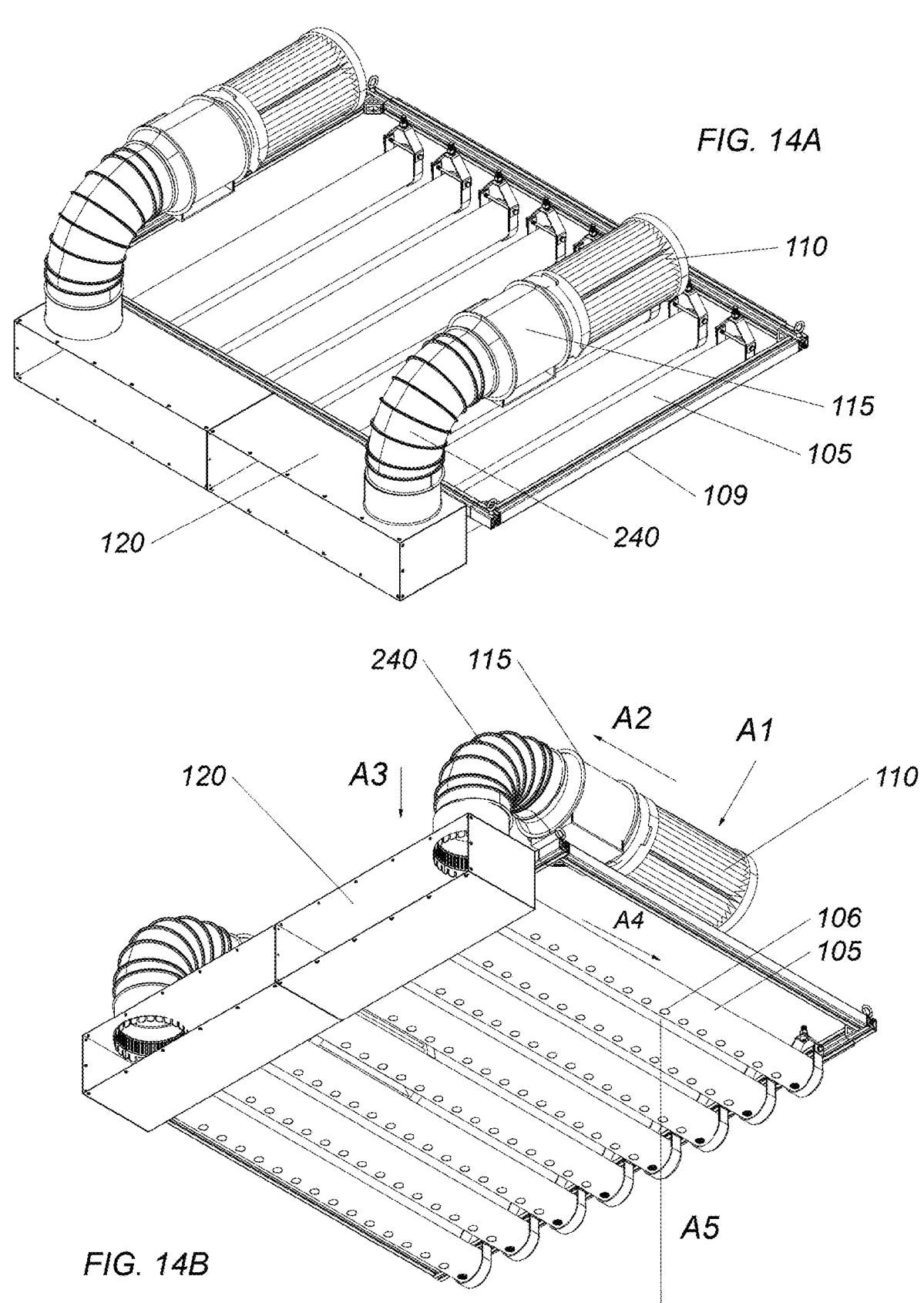

FIG. 14A shows a top back perspective view of certain elements of the air supply ventilation system of the plant growing chamber shown in FIG. 8A.

FIG. 14B shows a bottom back perspective view of certain elements of the air supply ventilation system of the plant growing chamber shown in FIG. 8A.

Figures 15A, 15B, 15C:
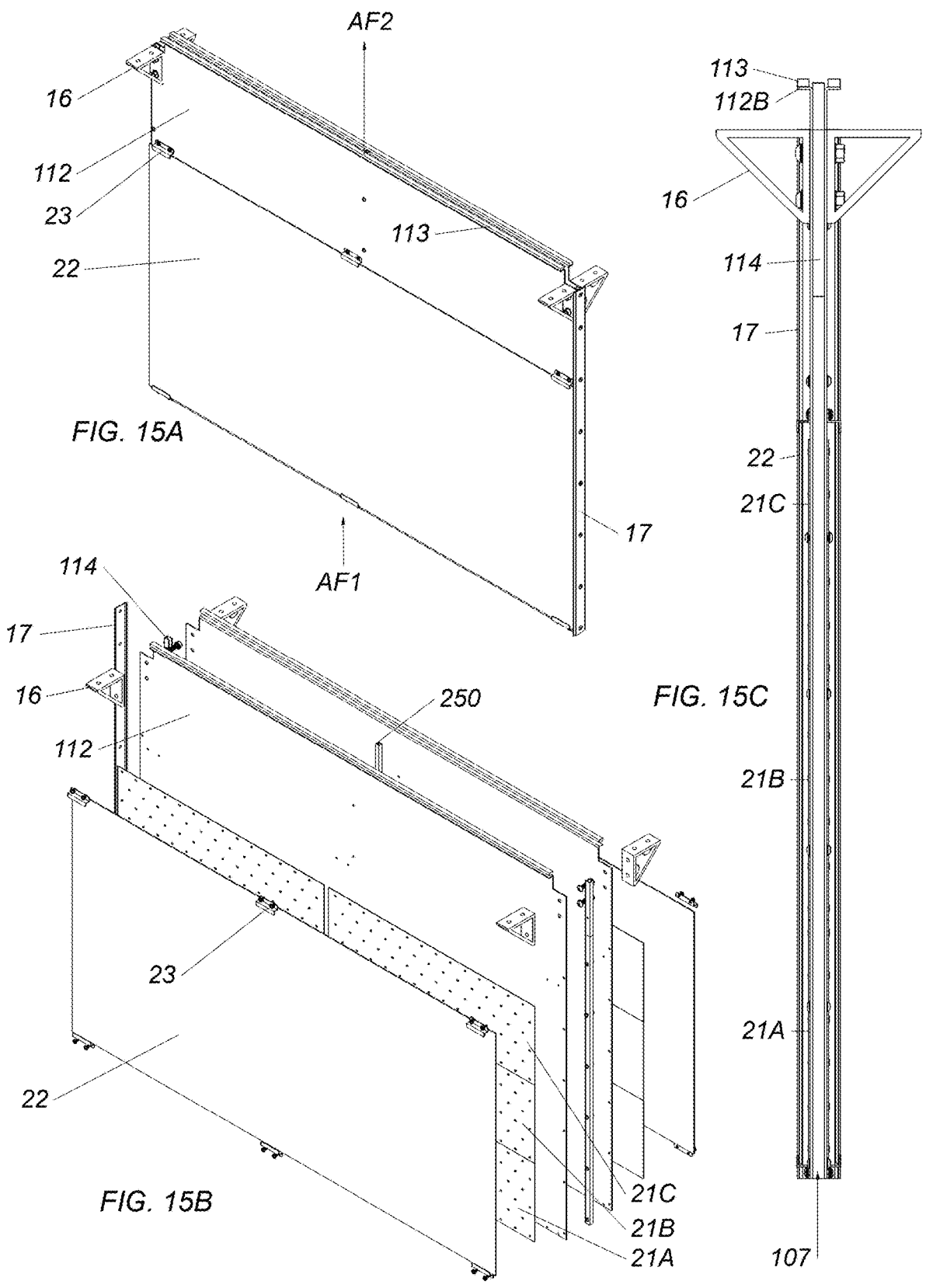

FIG. 15A shows a perspective view of a light panel assembly from the example embodiment of plant growing apparatus shown in FIG. 8A.

FIG. 15B shows an exploded perspective view of a light panel assembly from the example embodiment of plant growing apparatus shown in FIG. 8A.

FIG. 15C shows a profile view of a light panel assembly from the example embodiment of plant growing apparatus shown in FIG. 8A.

Figure 16:
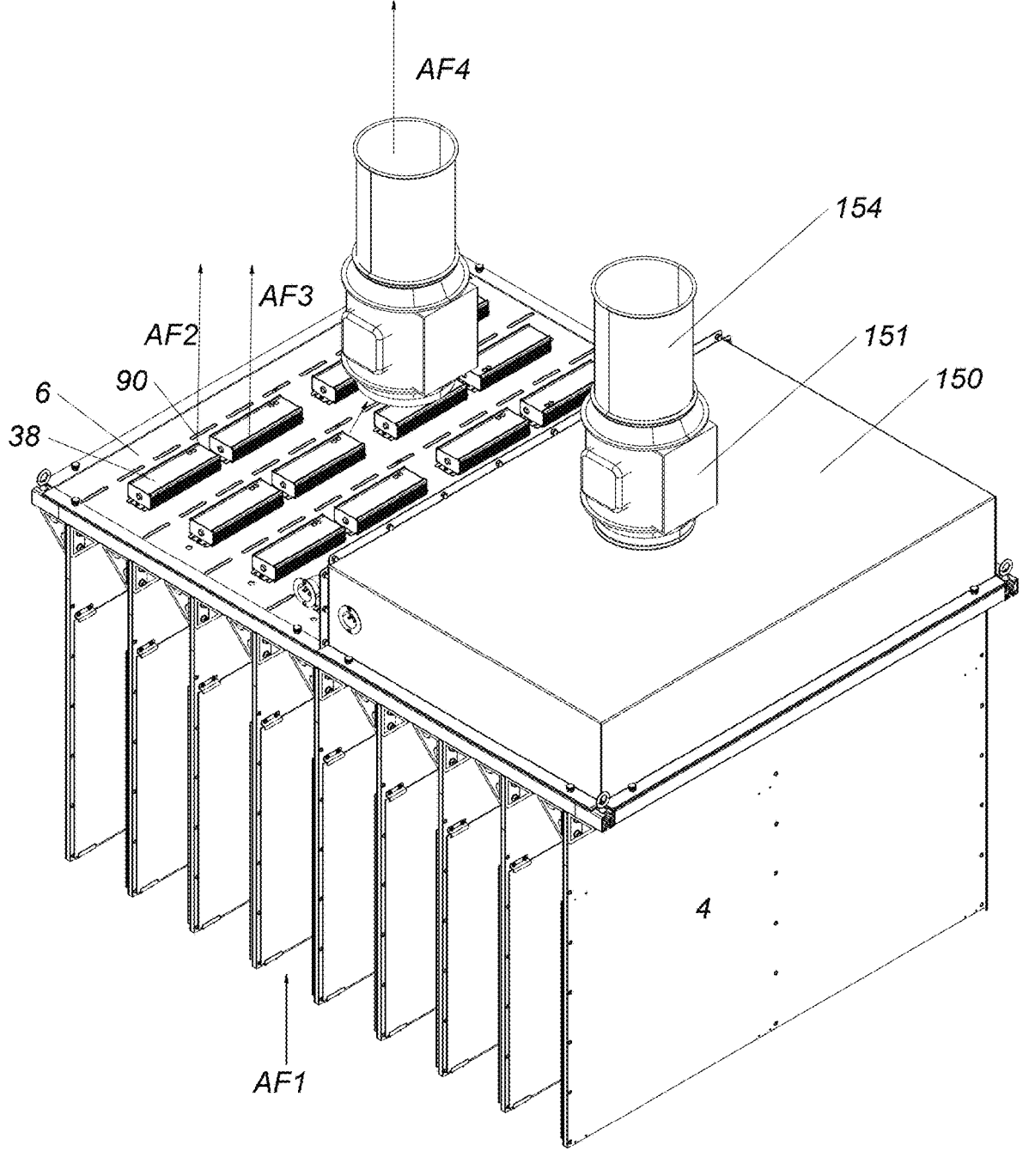

FIG. 16 shows a perspective view of a portion of the plant growing chamber shown in FIG. 8A, with a top air plenum box removed for illustrative purposes and includes air flow direction indicators.

Figure 17:
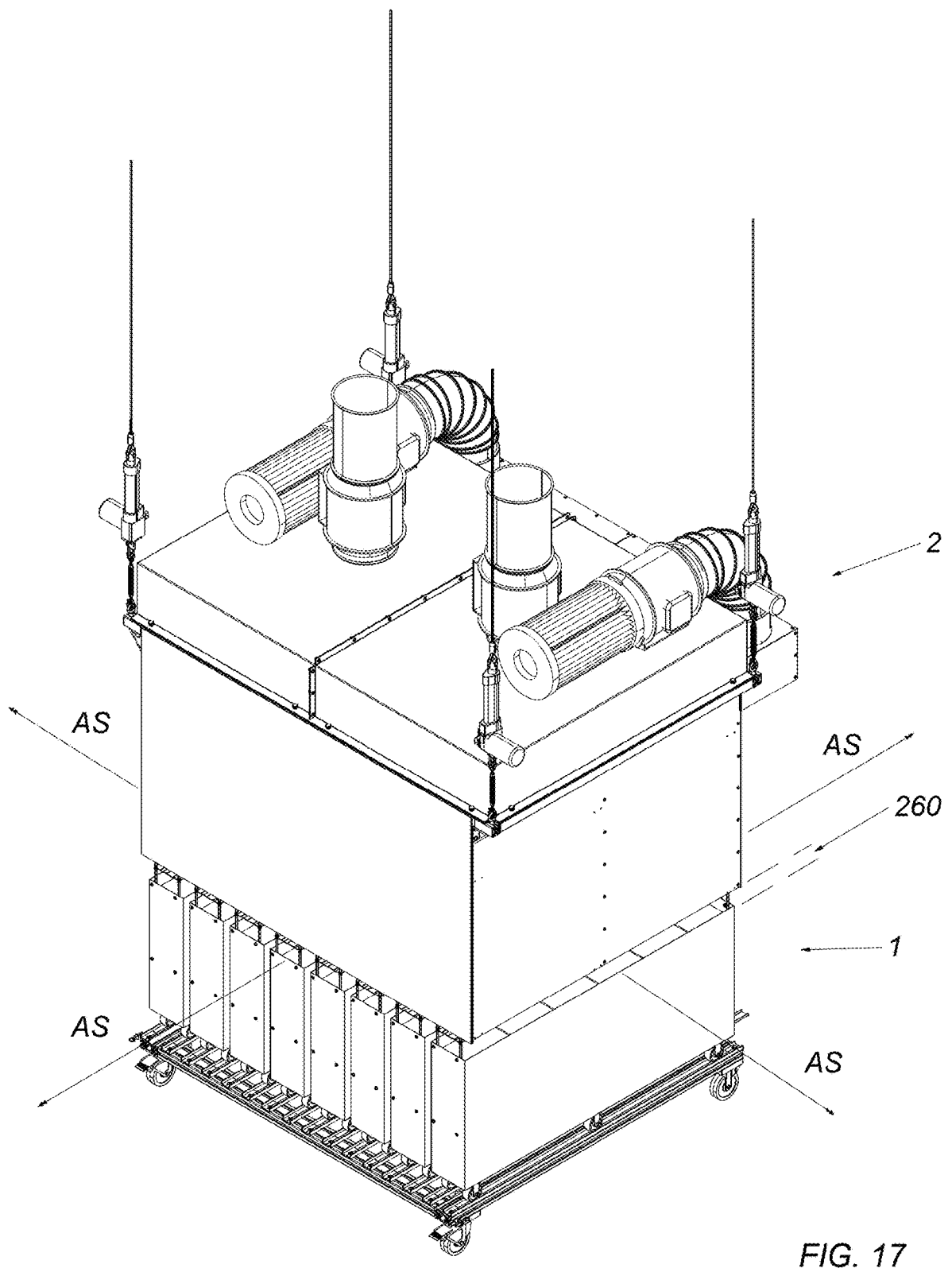

FIG. 17 shows a perspective view of the plant growing chamber shown in FIG. 8A showing a diagrammatic representation of an air seal around the outer perimeter.

Figures 18A, 18B:
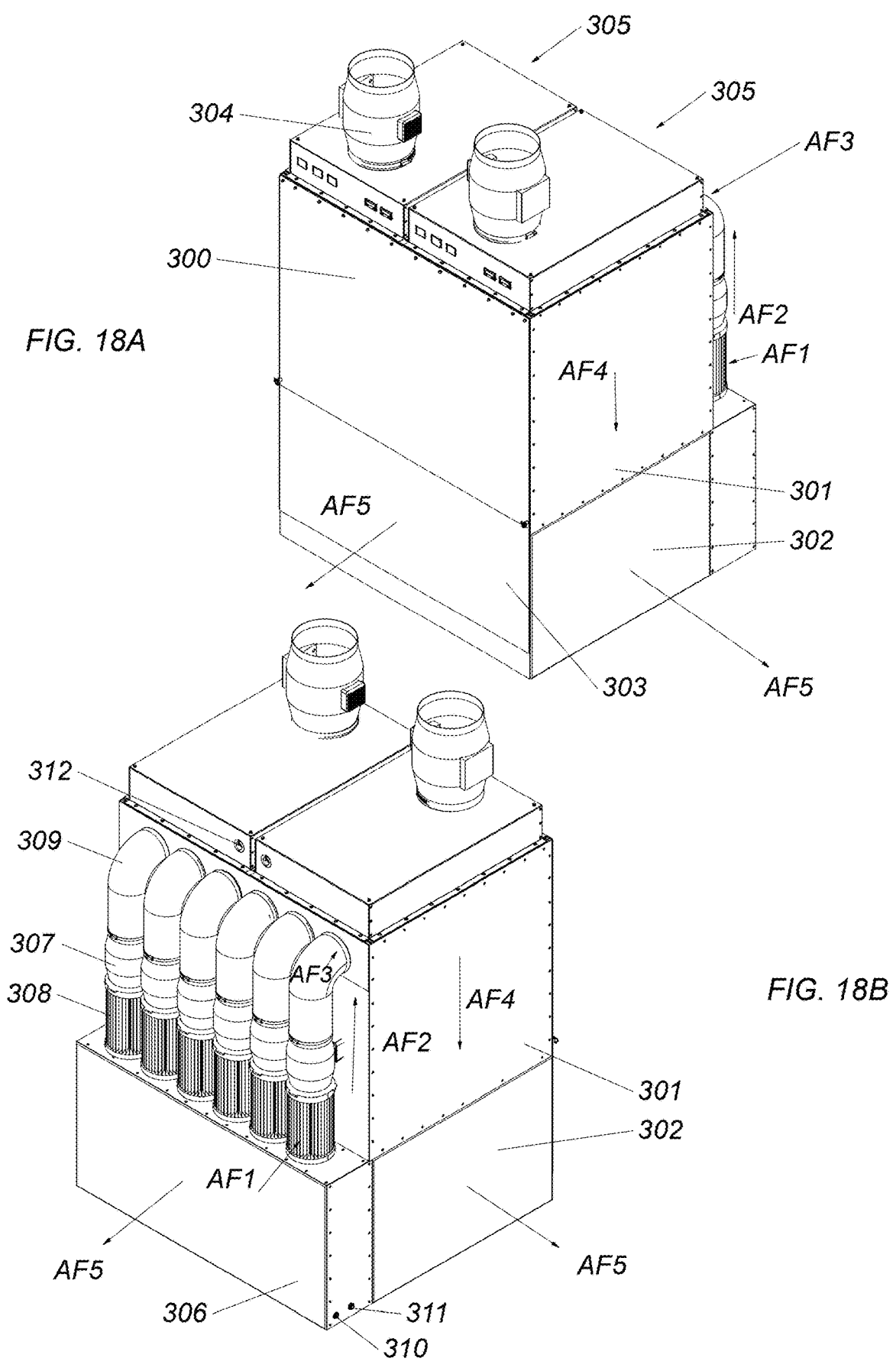

FIG. 18A shows a front perspective view of a plant growing apparatus that mounts on a floor.

FIG. 18B shows a back perspective view of the same plant growing apparatus that mounts on a floor as shown in FIG. 18A.

Figures 18C, 18D:
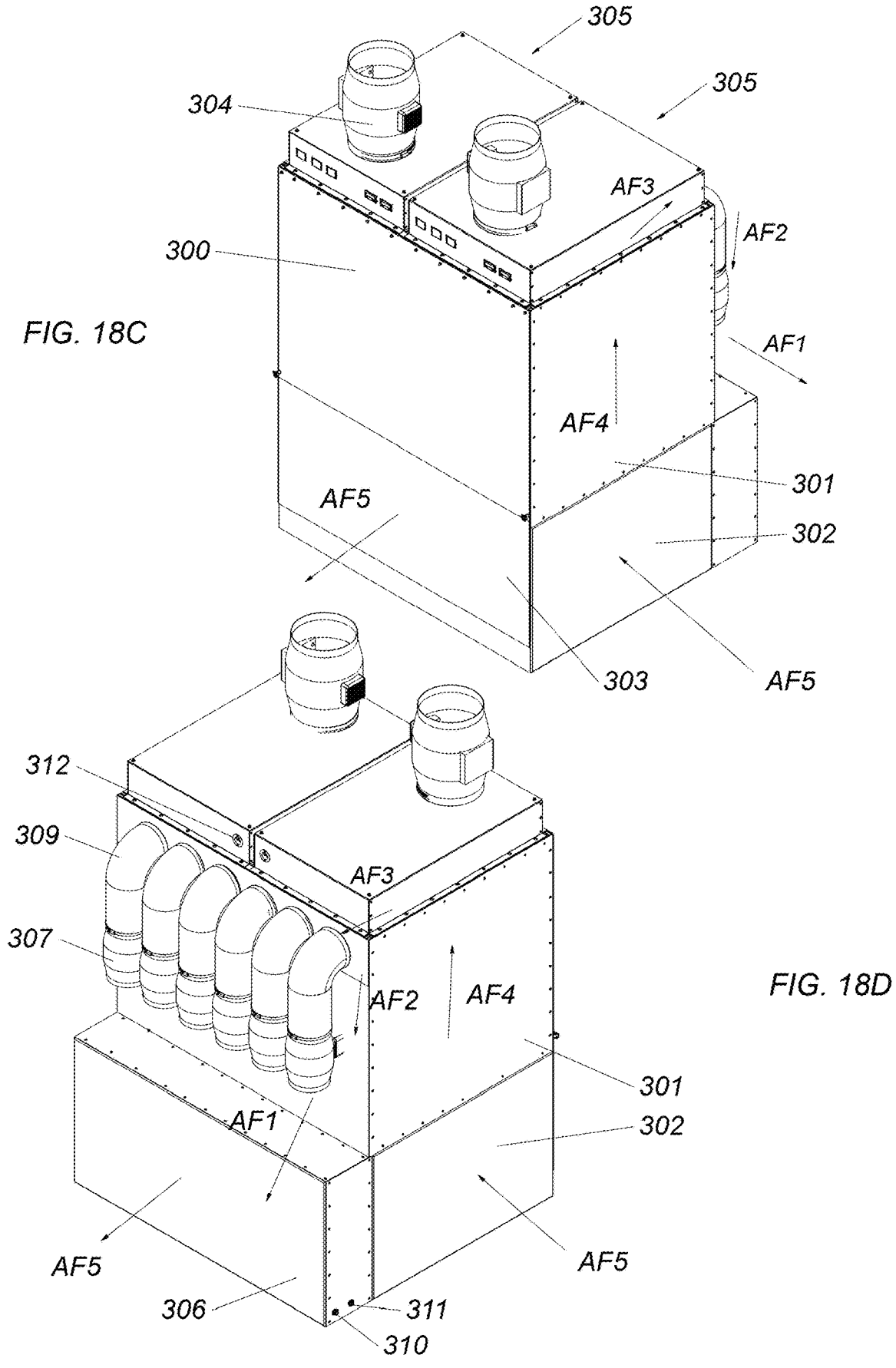

FIG. 18C shows a front perspective view of the same plant growing apparatus that mounts on a floor as shown in FIG. 18A and includes air flow diagrams.

FIG. 18D shows a back perspective view of the same plant growing apparatus that mounts on a floor as shown in FIG. 18C and includes air flow diagrams.

Figure 19:
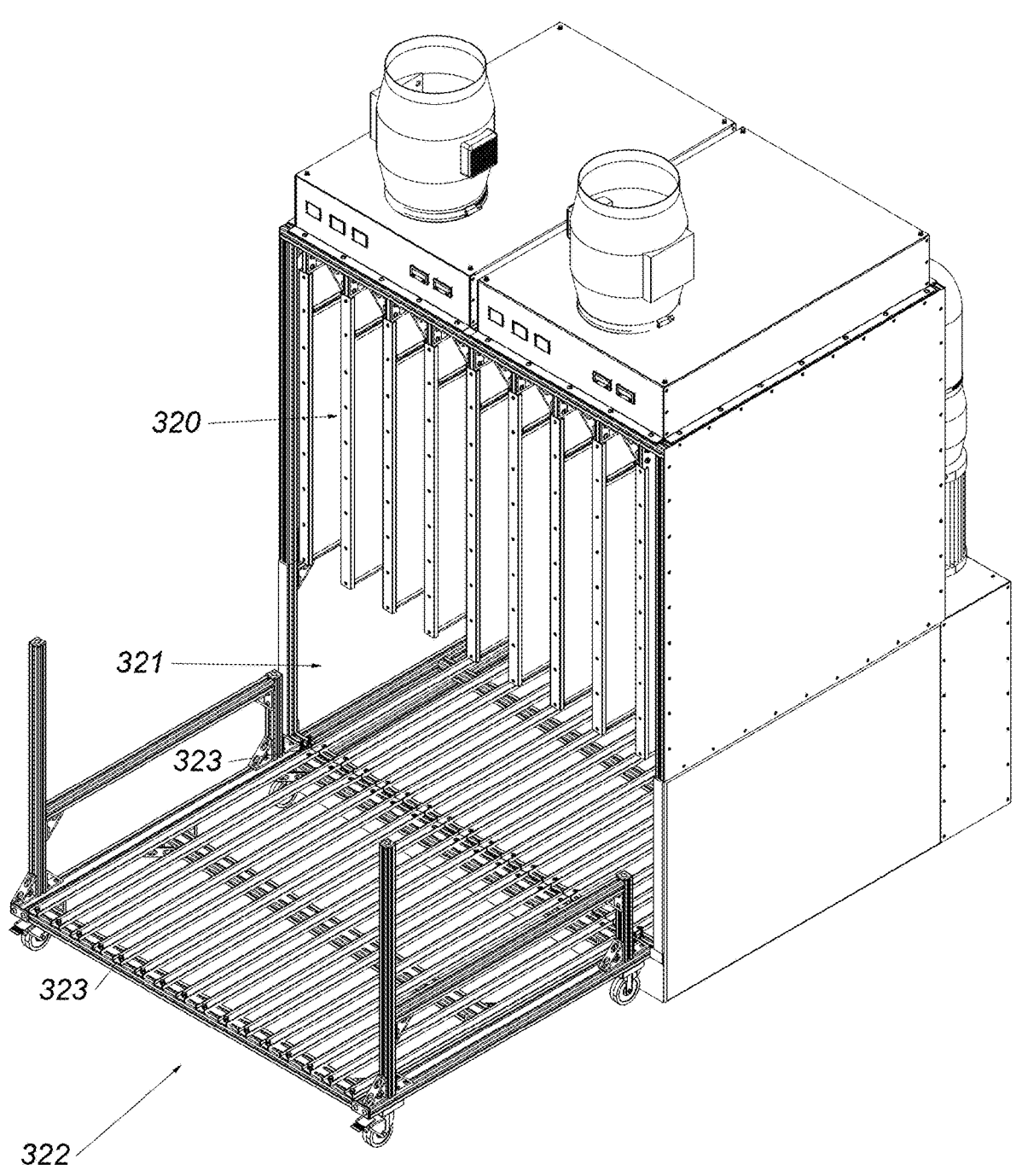

FIG. 19 shows a perspective view of the same plant growing apparatus that mounts on a floor as shown in FIG. 18A, and has a front panel removed for illustrative purposes, and is docked with a maintenance dolly.

Figures 20A, 20B:
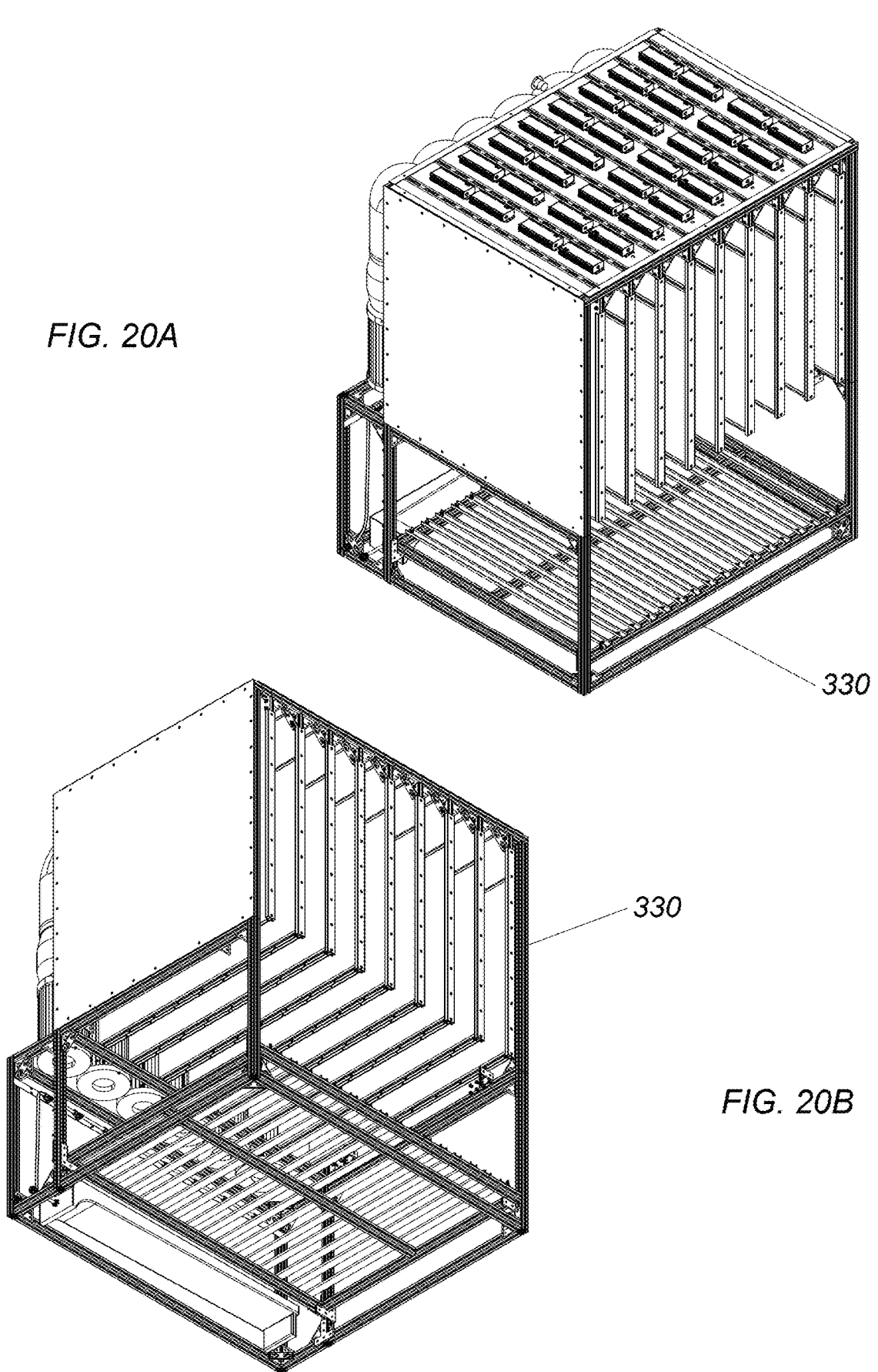

FIG. 20A shows a top-front perspective view of the same plant growing apparatus that mounts on a floor as shown in FIG. 18A and has all of its outer panels removed for illustrative purposes.

FIG. 20B shows a bottom-front perspective view of the same plant growing apparatus that mounts on a floor as shown in FIG. 18A and has all of its outer panels removed for illustrative purposes.

Figures 20C, 20D:
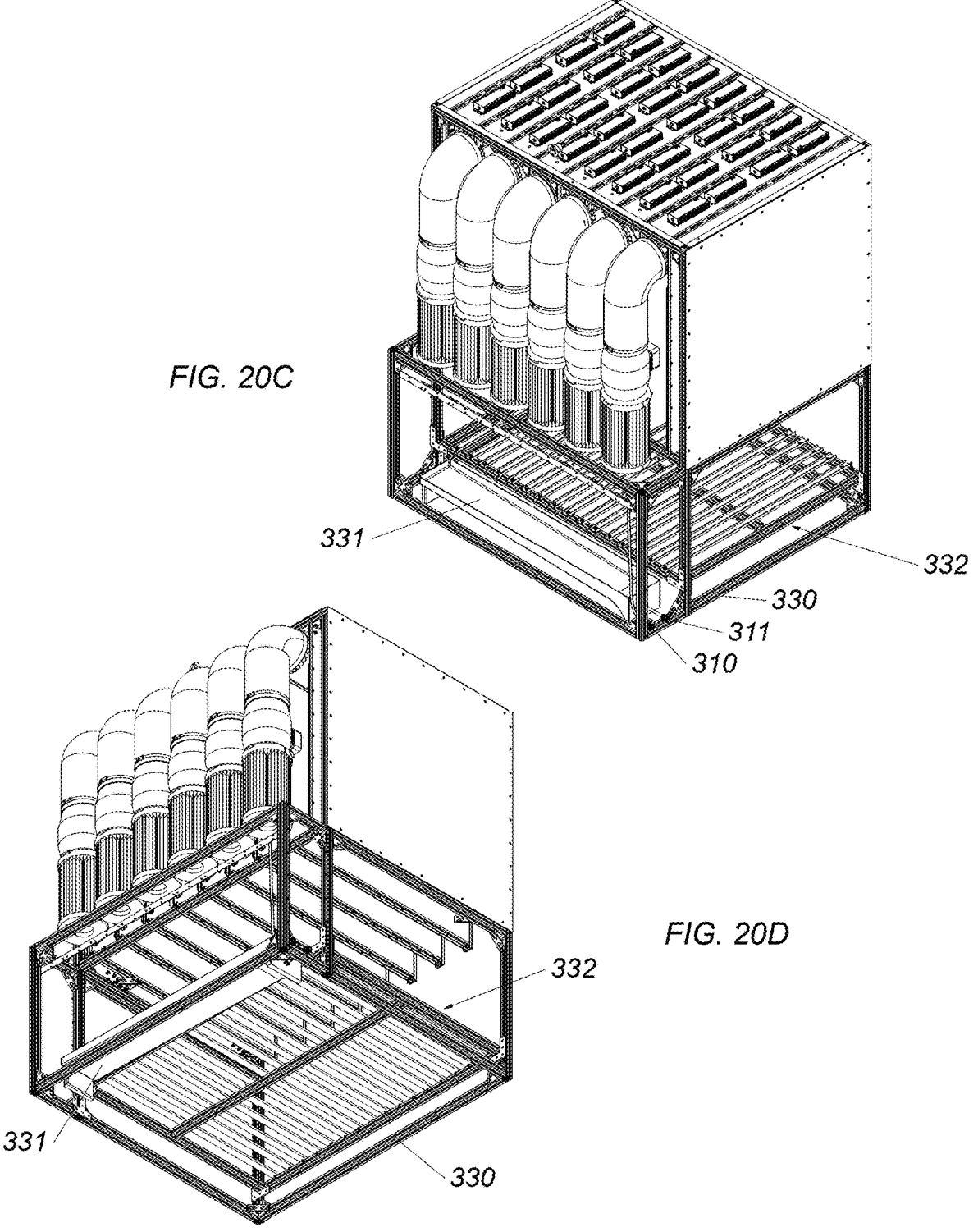

FIG. 20C shows a top-back perspective view of the same plant growing apparatus that mounts on a floor as shown in FIG. 18A and has all of its outer panels removed for illustrative purposes.

FIG. 20D shows a bottom-back perspective view of the same plant growing apparatus that mounts on a floor as shown in FIG. 18A and has all of its outer panels removed for illustrative purposes.

Figures 21A, 21B:
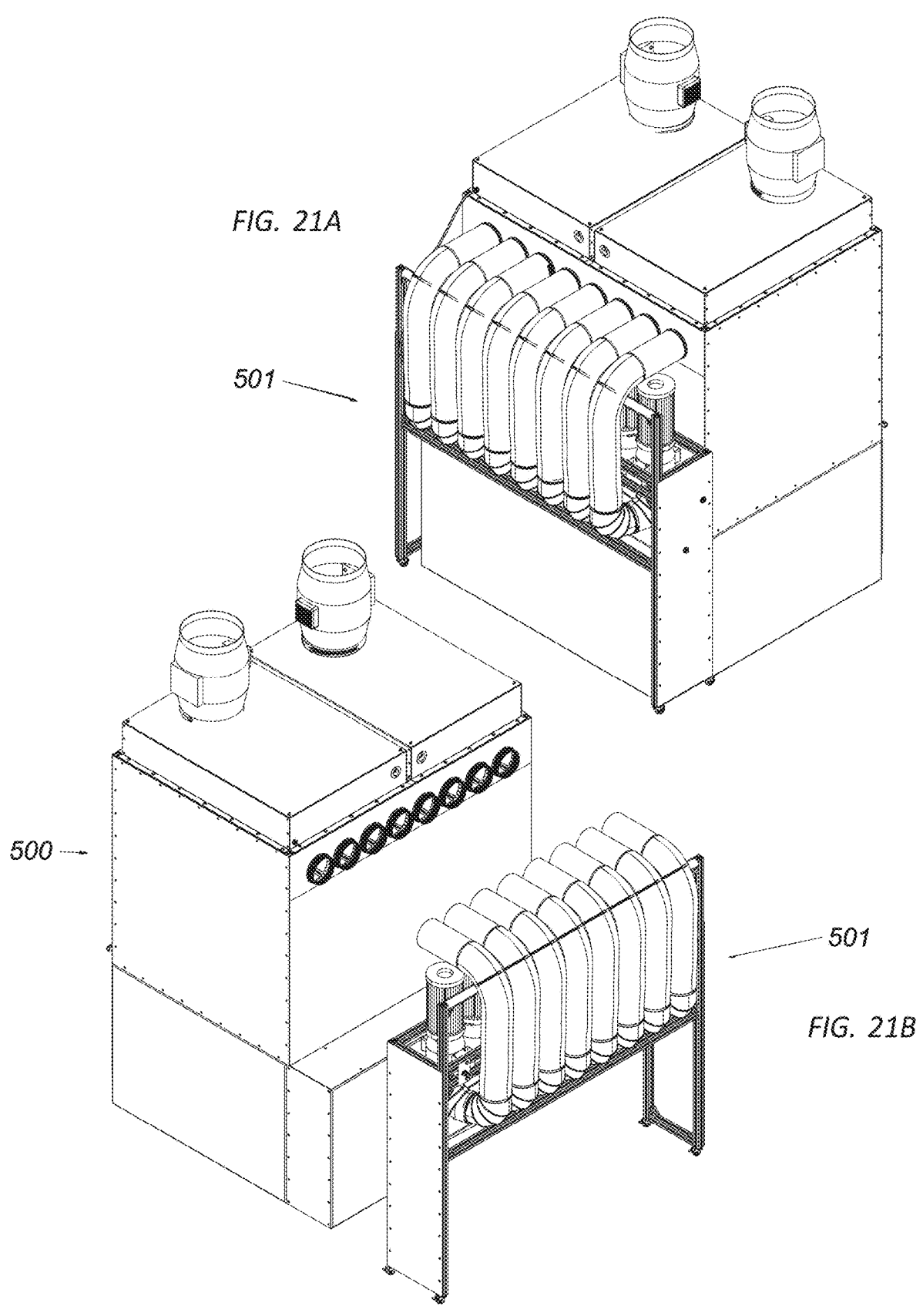

FIG. 21A shows a back perspective view of an example embodiment of plant growing apparatus with a separate air modification system.

FIG. 21B shows a back perspective view of the example embodiment of plant growing apparatus with a separate air modification system shown in FIG. 21A, with the air modification system separated from the plant growing apparatus.

Figure 22:
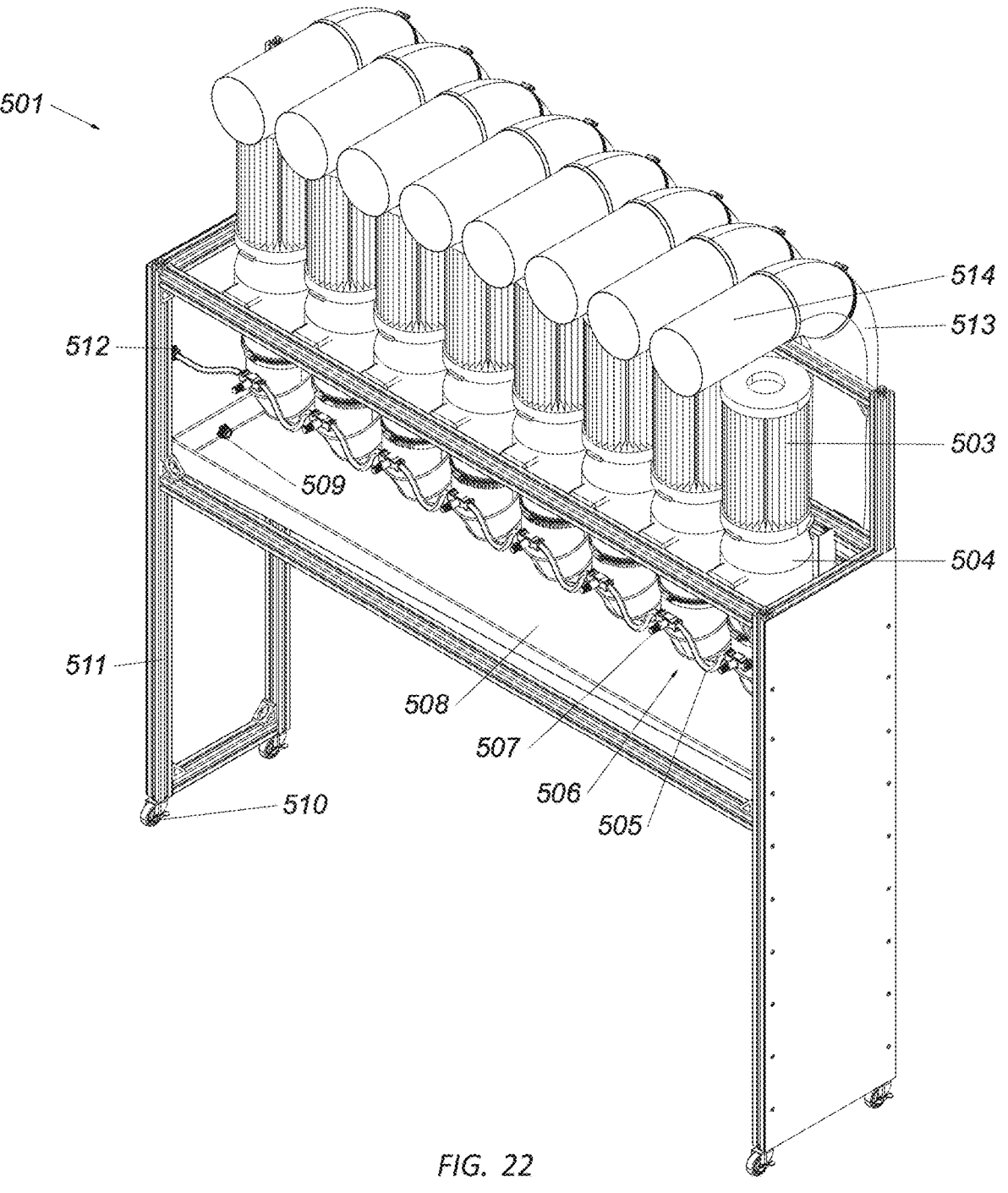

FIG. 22 shows a front perspective view of the example embodiment of air modification system shown in FIG. 21A.

Figure 23:
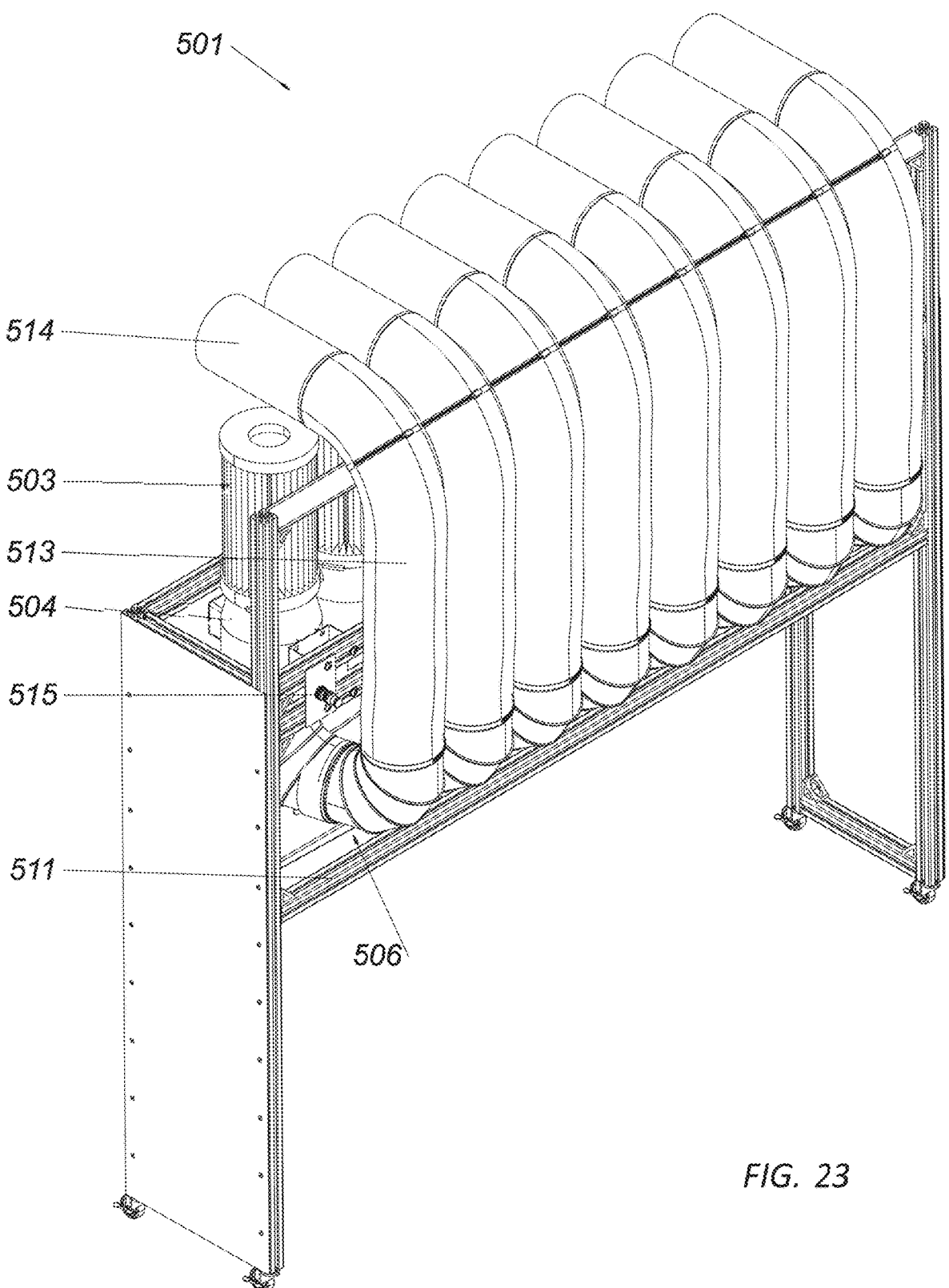

FIG. 23 shows a back perspective view of the example embodiment of air modification system shown in FIG. 22.

Figures 24A, 24B:
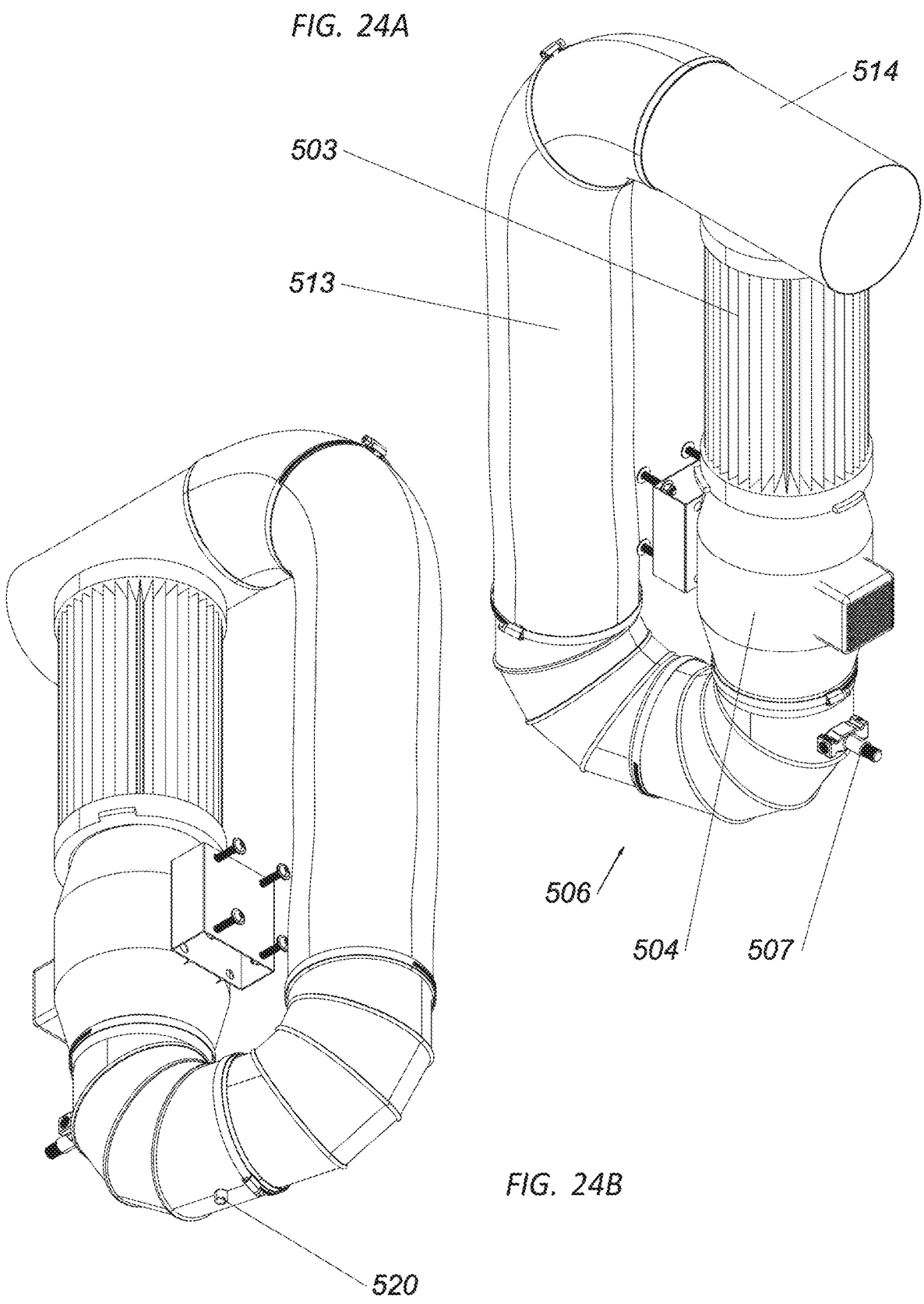

FIG. 24A shows a top perspective view of elements of the example embodiment of air modification system shown in FIG. 21A.

FIG. 24B shows a bottom perspective view of elements of the example embodiment of air modification system shown in FIG. 21A.

Figure 25:
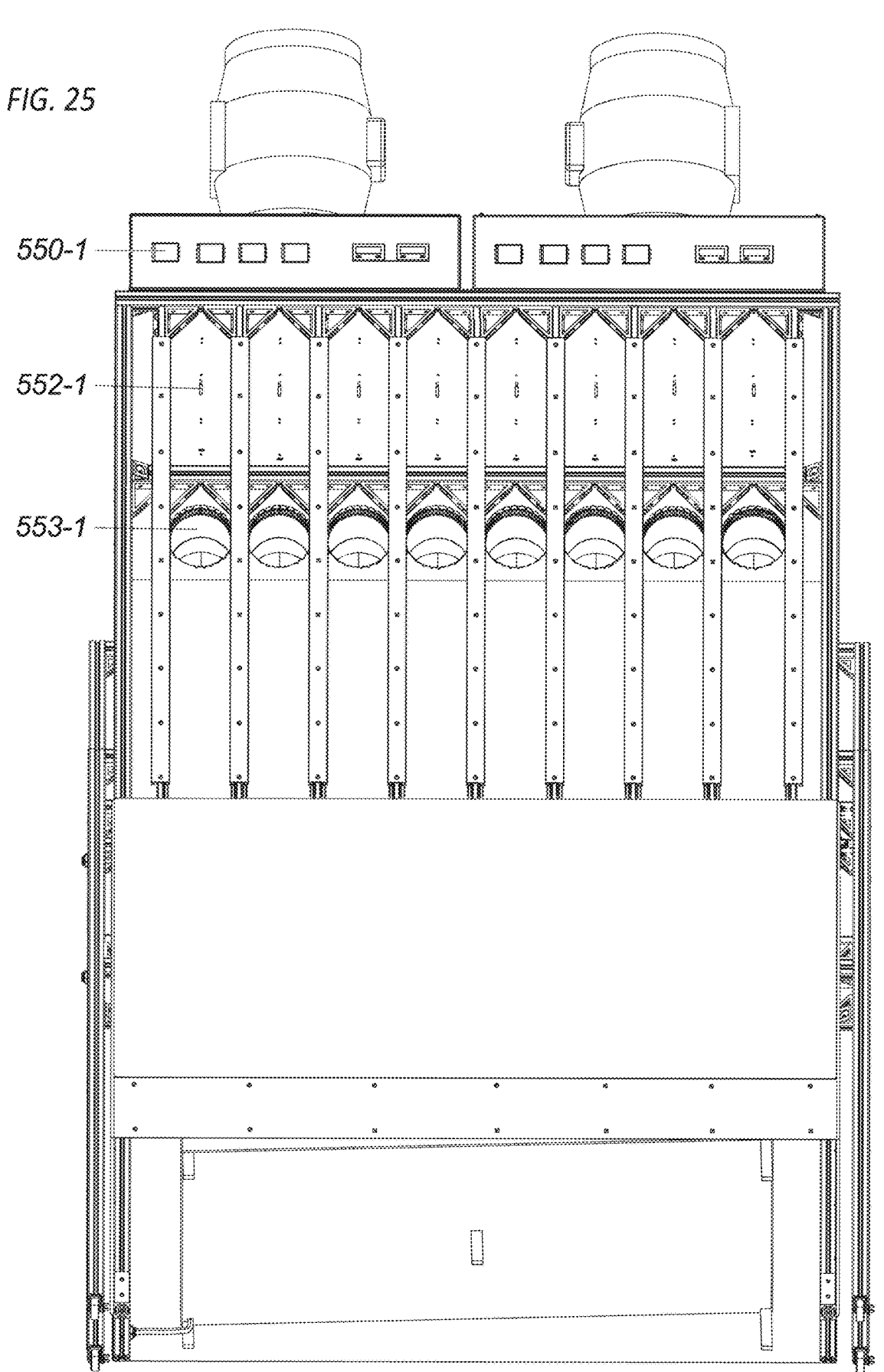

FIG. 25 shows a front upwards tilted view of an example embodiment of plant growing apparatus with individual adjacent plant growing areas that have individually controllable air modification settings.

Figures 26, 27:
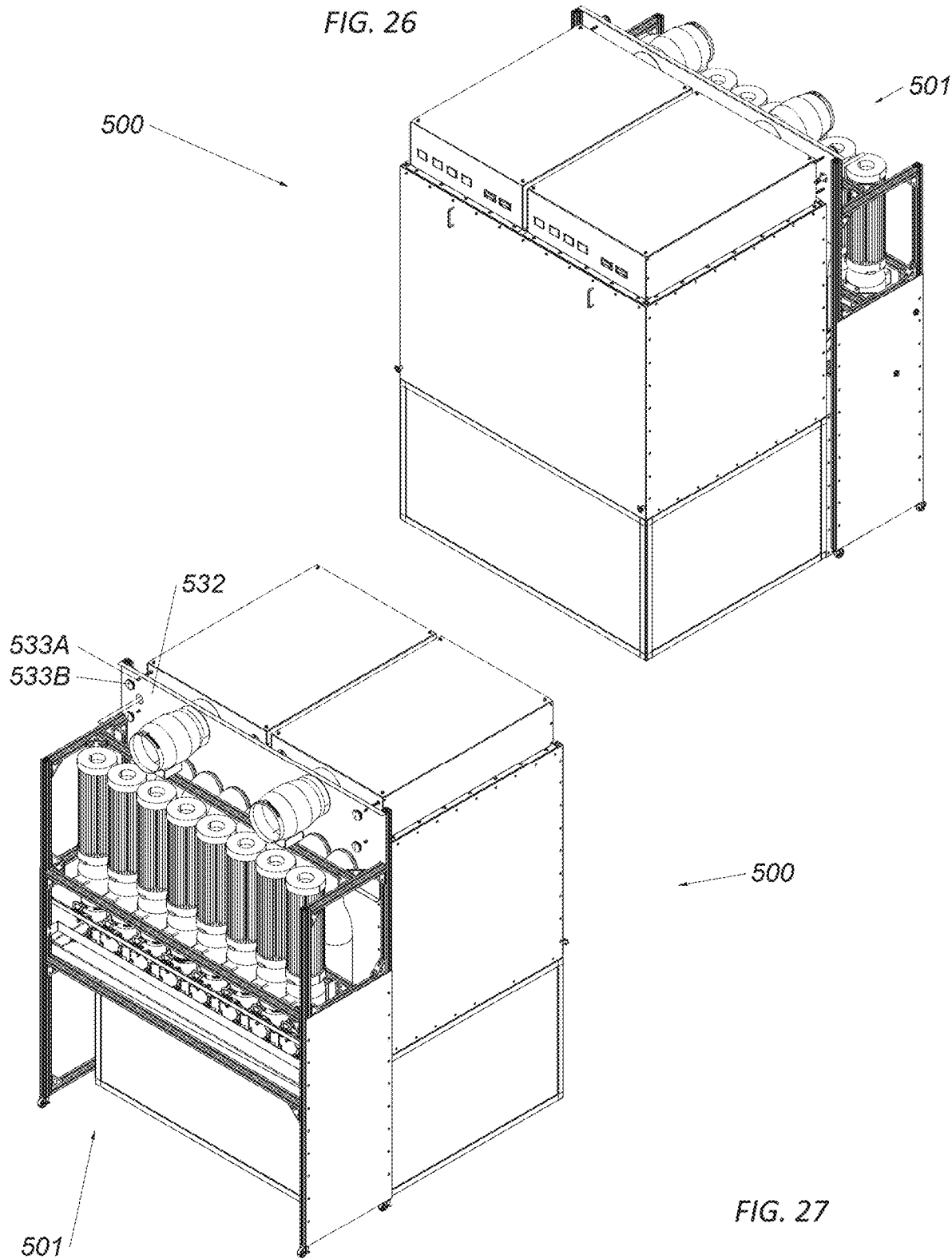

FIG. 26 shows a front perspective view an example embodiment of plant growing apparatus and separate climate control system.

FIG. 27 shows a back perspective view of the example embodiment of plant growing apparatus and separate climate control system shown in FIG. 26.

Figure 28:
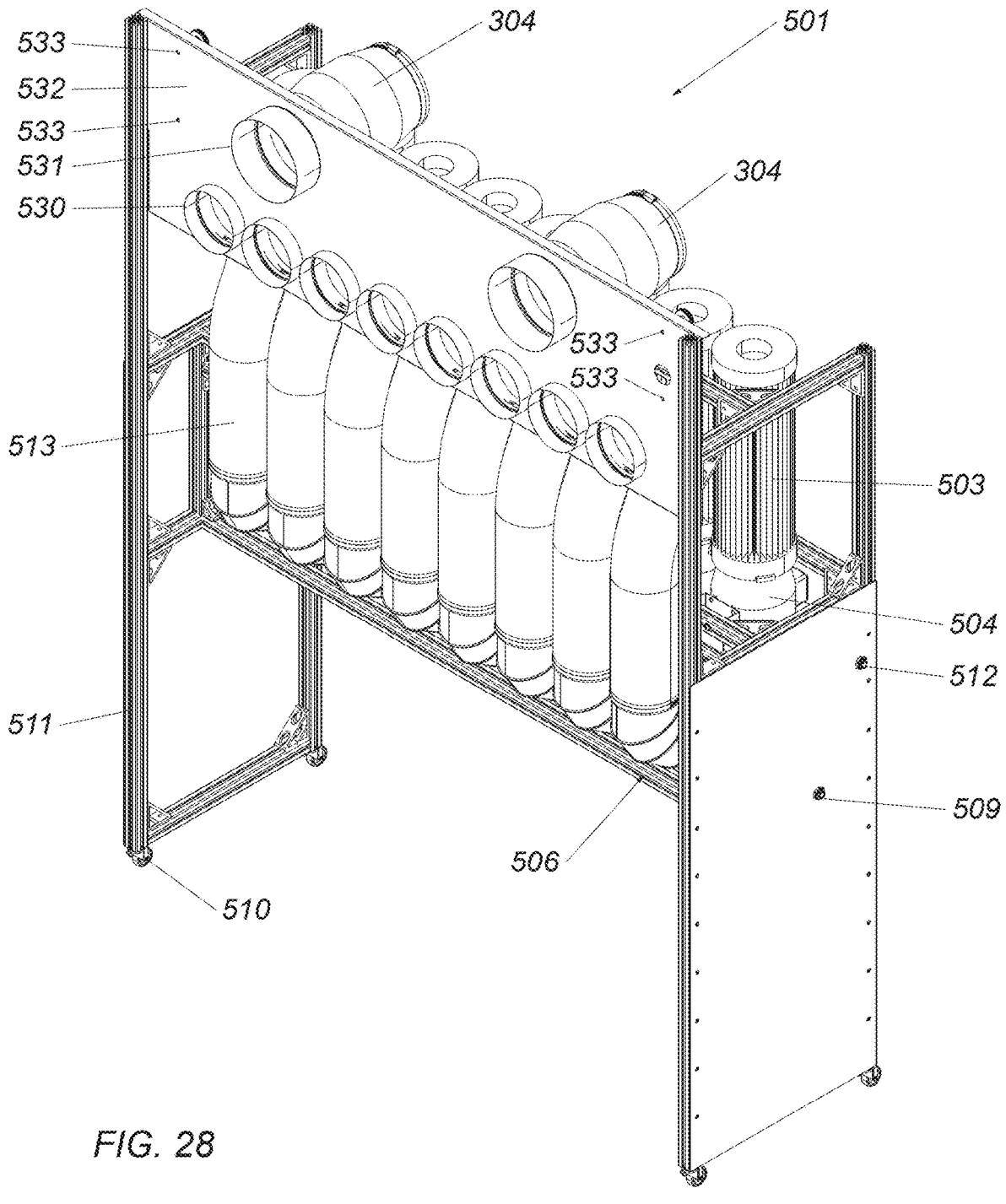

FIG. 28 shows a front perspective view of the example embodiment of separate climate control system shown in FIG. 26.

Figure 29:
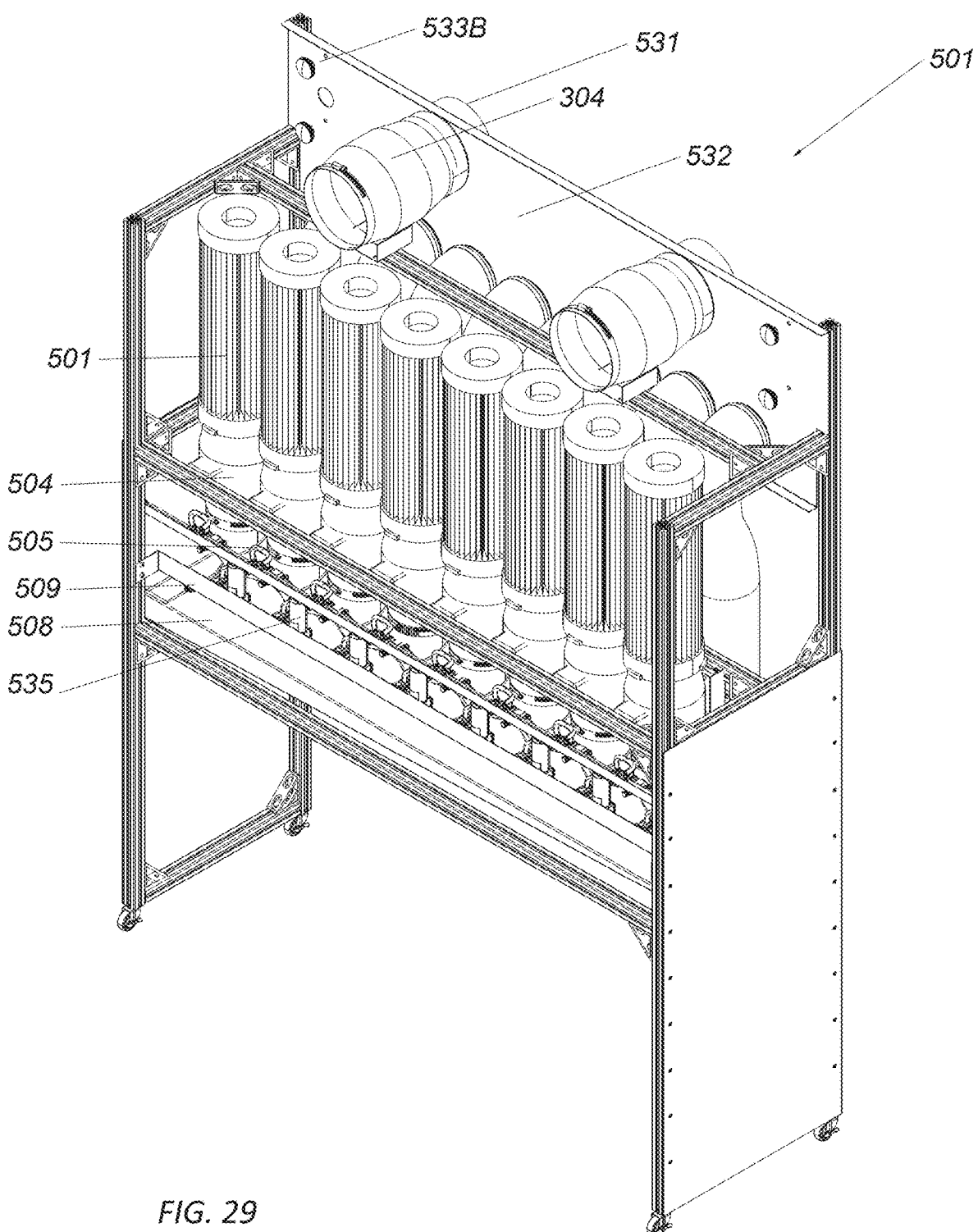

FIG. 29 shows a back perspective view of the example embodiment of separate climate control system shown in FIG. 26.

Figure 30:
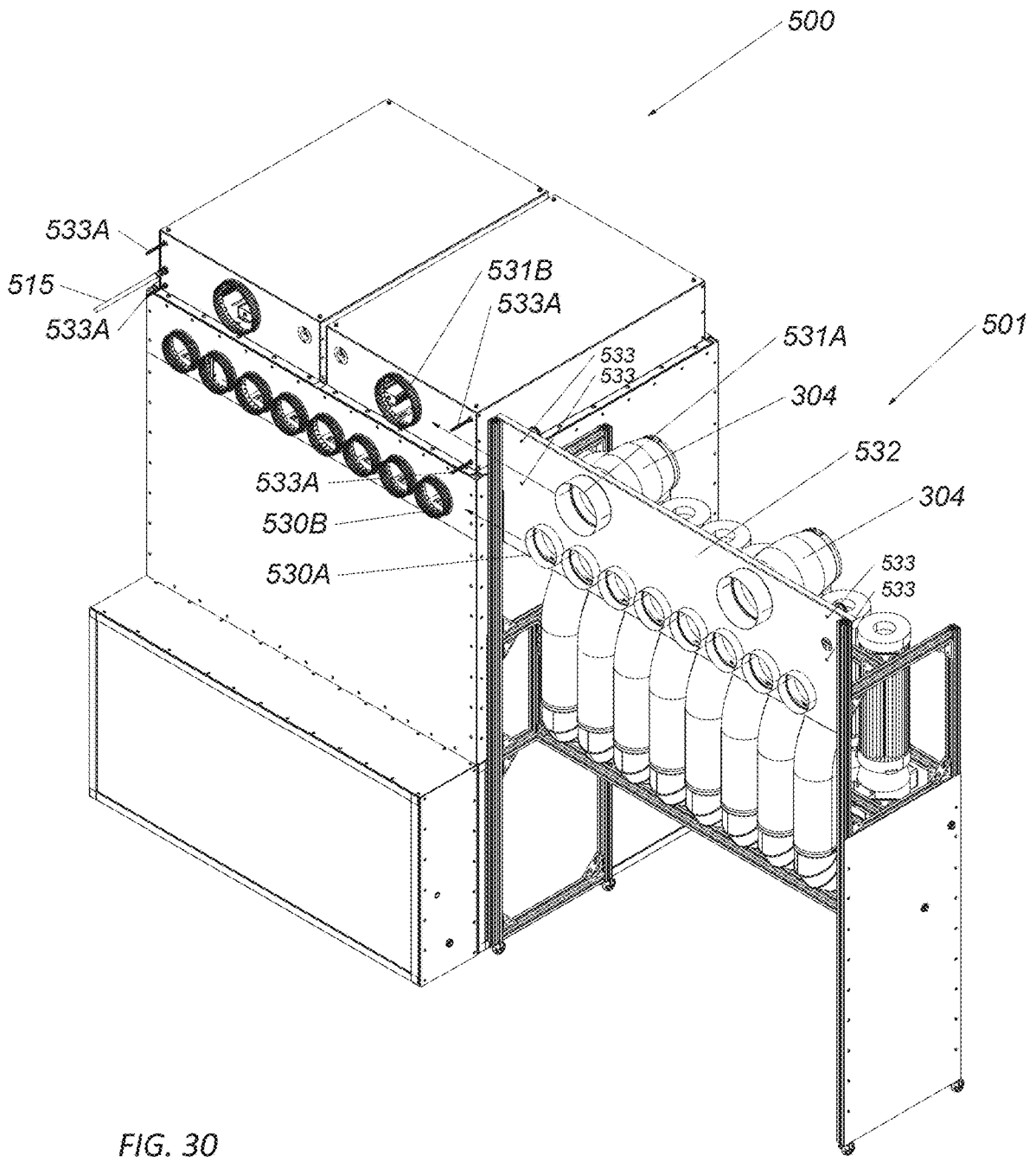

FIG. 30 shows a back perspective view of the example embodiment of plant growing apparatus and separate climate control system shown in FIG. 26. The separate climate control system has been rotated 180 degrees for illustrative purposes.

Figure 31:
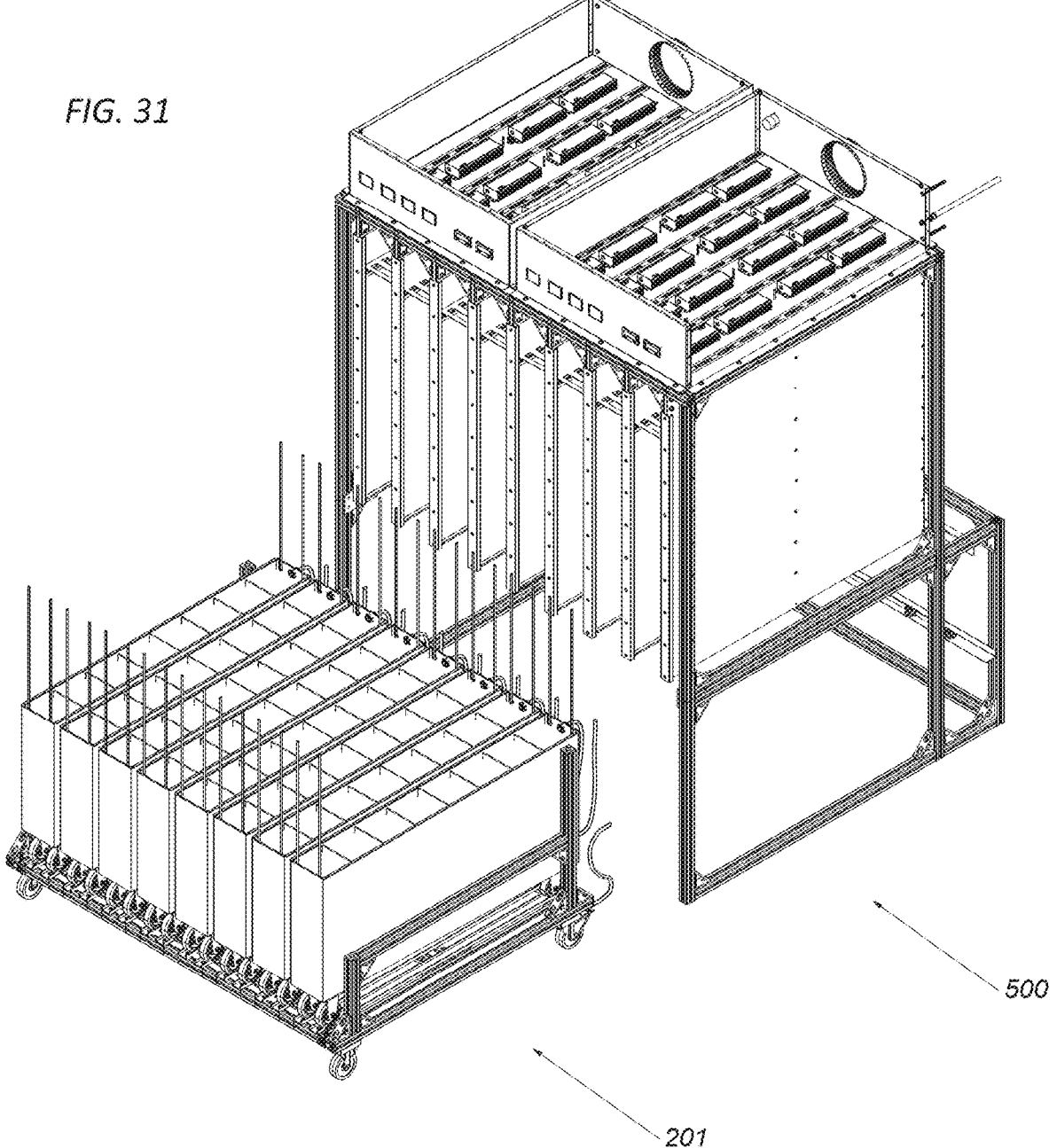

FIG. 31 shows a front perspective view of the example embodiment of plant growing apparatus shown in FIG. 26. Certain parts have been removed for illustrative purposes, and the mobile plant dolly is disposed outside of the plant growing apparatus.

Figure 32:
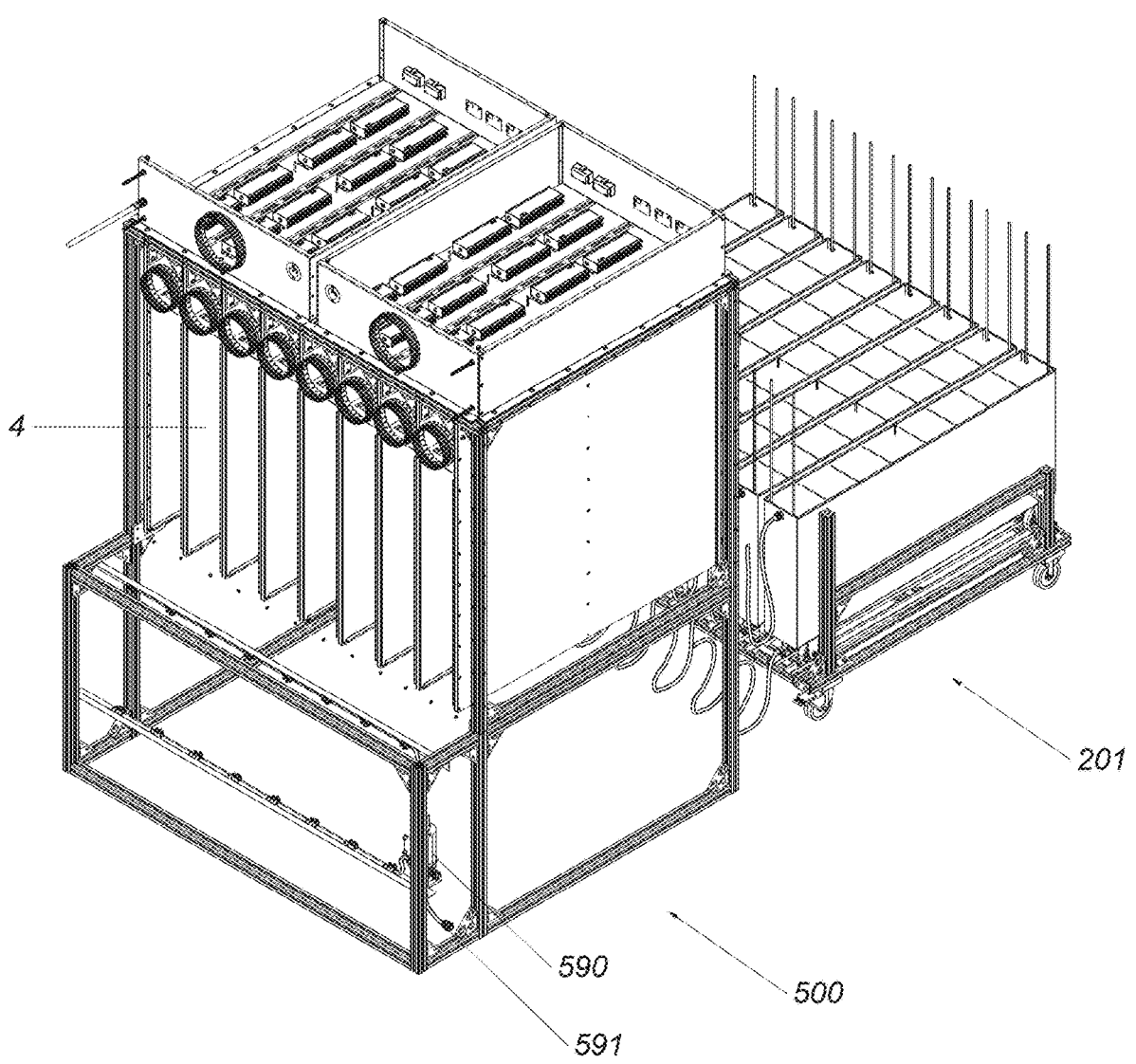

FIG. 32 shows a back perspective view of the example embodiment of plant growing apparatus shown in FIG. 26. Certain parts have been removed for illustrative purposes, and the mobile plant dolly is disposed outside of the plant growing apparatus.

DETAILED DESCRIPTION

Although various embodiments of the invention may be described with respect to indoor cultivating of *cannabis*, this may be for illustrative purposes only, and should not be construed to limit the scope of possible applications for the various embodiments of the invention. For example, implementations of the disclosed technologies may apply to other plant types.

The written descriptions may use examples to disclose certain implementations of the disclosed technology, including the best mode, and may also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

FIG. 1A shows an example embodiment of plant growing apparatus 2, along with a climate control system 501. Further details will be discussed at a later point in this disclosure.

Referring to FIG. 1I through 1L, one or more plants 603 may be disposed in a plant container 602. Two opposing light engines 600 may be disposed in a substantially vertical orientations with their inner surfaces 601 facing each other and facing the one or more plants 603. The one or more plants 603 may or may not be restricted on their lateral growth by the inner surfaces 601 and may or may not subsequently touch and grow against them.

As shown in FIG. 1K, one or more LED panel arrays 603 may be attached to thermally conductive panels 606. The thermally conductive panels 606 may draw convection heat aways from the side of the one or more LED panel arrays facing the one or more plants 603, and thus present a cooler surface and reduced convection heat to the plant foliage. The light engines 600 may also be ducted and cooled with forced air, which may be discussed at a later stage in this application. The individual diodes 605 may be disposed on a printed circuit board (PCB) 607 in an evenly spaced configuration as shown to create a partially diffused light source. The PCB's 607 front surface may also be coated with high reflectivity white paint. FIG. 1L shows the light engine 600 comprising a diffusion panel 604 which may comprise any suitable diffusion material or substrate. For example, the diffusion panels 604 may comprise prismatic acrylic or polycarbonate sheets, diffusion film, diffusion lenses on individual diodes, etc. The diffusion panels 604 may create added diffusion wherein higher light quantities may be emitted by the light engines with a relatively lower intensity.

A typical distance between the inner surfaces 601 of light engines 600 may be in the order of six inches in example embodiments, however this should not be construed to limit the scope of the distances between the inner surfaces 601. Example distances in example embodiments may comprise any practical distance that is less than the maximum width that a plant would grow inside example embodiments of diffusion chambers or PGA's without human intervention. Due to the opposing orientation of the inner surfaces 601 of the light engines 600, light from one of the light engine's LED panel arrays 605 may be refracted and diffused through the diffuser 604, and subsequently relatively and evenly dispersed towards the opposing light engine, refracting or reflecting through or from its diffuser, reflecting off its white reflective PCB and back through the diffuser, and then back towards the original light engine, and so on in a continuous light scattering, and/or light recycling loop.

This light recycling may create an extraordinary degree of light diffusion. When considering the reflection and refraction of the light with the multitude of biomass surfaces from the one or more plants, the opposing light engines may approximate a true omni-directional lighting environment relative to the plants. The light diffusers 604 may also function to insulate the plant surfaces from heat and light from individual diodes 605. The light diffusion chamber may thus allow the one or more plants to overall receive higher light quantities and intensities than would otherwise be possible with direct lighting, in addition to the plants being able to be in close proximity to the light sources without light or heat damage.

Another novel aspect of example embodiments of lighting systems as discussed may allow for plants to thrive under higher light intensities (greater than 1800 μmol/m2/sec) due to the light source being predominantly emitted horizontally towards the plants. In traditional overhead lighting, light incident on the canopy may have its highest intensity approximately perpendicular to the foliage, and wherein the foliage may naturally grow with its leaves disposed in a predominately horizontal orientation. Accordingly, the leaf surface areas of the leaves at the top canopy may receive relatively direct, full intensity light rays. When horizontally emitted light as discussed is incident on the same foliage, the light rays may strike the leaves at relatively shallow angles, therein reducing the light intensity on the leaves, yet the net quantity of light directed to the plant may not be reduced The law of physics and the inverse square law of light it is widely accepted throughout indoor growing cultivation practices utilizing overheard artificial lighting. In an example, if a light source is mounted six feet above the floor and configured to supply 1200 μmol/m2/sec of light intensity at a height of four feet, the expected light level at the floor may be 192 umol/m2/sec, or an 84% light intensity reduction. As tested in example embodiments of light diffusion and recycling chambers for growing plants, the maximum light intensity variance anywhere inside the chamber may be only 10-30% depending on the light sensor's configuration of the light meter being used. Accordingly, light may be applied relatively evenly to all parts of the plants disposed inside the chamber which may result in much higher yields.

While prior art may show plant lighting apparatuses utilizing side lighting, none are designed or configured to provide homogenous light levels from the bottom to the top of a *cannabis* plant. A *cannabis* plant grown commercially indoors may reach a height above three feet and may have a unique morphology. Comparatively, other indoor crops like lettuce, strawberries etc. may have very short plant structures, wherein any light applied may be relatively omnidirectional. Applying high intensity light throughout the entire height of a *cannabis* plant may allow inflorescence sites and yields on the bottom portion of the plant to be nearly as commercially valuable as the top portion. Typically, the bottom halves of *cannabis* plants grown commercially are sacrificed wherein they are defoliated to a large degree in order to redirect plant resources to the top half of the plant, and also to allow increased air circulation to reduce pathogen and insect issues.

Direct light may waste photons by concentrating the light resource to only a fraction of all leaves and flowering sites, leading to a less efficient photosynthetic use of light. Diffuse light directed to all parts of the plants, however, may effectively avoid the light saturation constraint by more evenly distributing light among all parts of the plants and may lead to a more efficient use of light. Leaves may have a maximum light absorption rate, and once this saturation point is exceeded, photosynthesis may not increase, and damage to the leaves may occur.

Accordingly, if a maximum overhead direct light dosage is administered to a plant wherein the top canopy is at, or near its saturation point, the rest of the plant foliage may be far below their saturation points due to the inverse square law of light, but perhaps more so caused by deep shading cast on the rest of the plant's foliage. With dense foliage, some parts of the plant foliage may undergo little if any photosynthesis. Diffuse omnidirectional light may be created and applied to plants grown in example embodiments of light diffusion chambers, and thus minimize or eliminate the negative results of direct lighting.

Considering the above discussion, a simplified example may be used to illustrate one of the advantages of example embodiments of light diffusion and recycling chambers for growing plants. In an example scenario with overhead lighting, a dense top canopy of leaves from a plant may fully cover an area of one square foot, and the plant may have a height (with foliage) of three feet. If the saturation point of the top canopy was 50 DLI (over that one square foot), if the same quantity of light was applied to both sides of the plant (over a six-square foot area), the plant's overall foliage may be at one-sixth of its light saturation point. Accordingly, the overall quantity of light to the entire plant may be increased by a factor of six which may dramatically increase overall plant photosynthesis. Additionally, all light emitted by the light panel assemblies may be used more efficiently by the plant. The instant invention therefore allows for diffused light to reach all parts of the plant, use the available light more efficiently and increase yield.

It should be noted that the diffusers 604 may increase the diffusion level within example embodiments of light diffusion chambers for plants, and thus may increase the utility and functionality thereof. However, example embodiments without diffusers may still have sufficient partial diffusion of spaced apart diodes to yield exemplary results compared to direct overhead lighting and should not be construed to limit the scope and generality of example embodiments of light diffusion and recycling chambers for growing plants.

Although the described example embodiment is shown in FIG. 1K as comprising LED panel arrays, a plurality of LED strips may also be utilized. The homogeneity of the light distribution may be inferior, nonetheless it may be satisfactory for certain applications.

Reflective inner surfaces 601 may facilitate light diffusion and recycling in example embodiments and may substantially decrease light loss through absorption. Although the described example embodiment is shown in FIG. 1K may be shown with the reflective material covering a substantial side of inner surfaces 601 as being white paint disposed on the PCB surfaces of the LED panel arrays, this should not be construed to limit the scope or generality of reflective material covering a substantial portion of each interior surface 601.

Other configurations may be utilized. For example, a plurality of LED strips may be mounted on or between reflective surfaces such as reflective films, reflective metal or reflective paint. Total internal reflection (TIR) light panels may also be utilized. Although they may not have a defined reflective surface per se, typical TIR light panels may have diffuser plates disposed on an outer layer that may cause incident light to either be reflected, or refracted into the TIR light panel wherein the incident light may either be refracted through the light guide and/or reflect off of the reflection layer that may typically cover the back of the light guide.

An example embodiment of a basic plant growing apparatus is shown in FIG. 1C and FIG. 1D. Two plant growth barriers 4 with inner surfaces 4A1 and 4A2 may be disposed adjacent to one another, wherein the distance between the inner surfaces 4A1 and 4A2 may be a distance X as indicated in FIG. 1C. Each plant growth barrier may comprise a length Y and a height Z as shown, and the area between the two plant growth barriers 4 may define a plant growing area 400. Plant growth barriers 4 may also be referred to as "walls".

The plant growth barriers 4 may comprise a light source such as a light panel assembly for example, wherein light may be emitted from portions of the surfaces 4A1 and 4A2, and into the plant growing area 400. Light panel assemblies may comprise any suitable light source such as LED panel arrays or TIR panels for example. Utilizing opposing verti-cal light panel assemblies that illuminate the one or more plants 3 may allow them to receive higher daily light integrals (DLI) than they might otherwise receive with traditional overhead lighting as previously discussed.

The growth of the one or more plants 3 may be laterally confined by the surfaces 4A1 and 4A2, whereby the maximum width of said plants may be a distance X. When various elements such as leaves 3B, branches, shoots, stems, flowers (may or may not be shown) etc. of the one or more plants 3 encounter the surfaces 4A1 and 4A2, they may alter their growth pattern to accommodate these barriers. When the one or more plants 3 undergo their multiple growth phases confined by the plant growth barriers 4, this may result in the one or more plants each having a relatively flat vertical canopy that mirrors the flat configuration of surfaces 4A1 and 4A2 thereby maximizing light absorption.

It should be noted that although the lateral growth of the one or more plants 3 in the plant growing area 300 has been described or implied to physically contact the surfaces 4A1 and 4A2 and thereby have their lateral growth contained. This should not be construed to limit the scope of the meaning or function of plant growth barriers. For example, the one or more plants 3 may be mechanically restrained from actually touching the surfaces 4A1 and 4A2 using trellis nets, plant ties or similar devices. A transparent or translucent membrane or substrate may be inserted between the outer-most lateral plant foliage and the surfaces 4A1 and 4A2 for example, achieving the same result of introducing a limit to the one or more plant's 3 lateral growth. Additionally, the one or more plants may also be constrained by selective pruning wherein the distance from various plant parts to the plant growth barriers can be configured. Regardless of which scenario discussed above is utilized or occurs, the result may be the same, wherein the lateral growth of the one or more plants may not exceed the distance X.

In example embodiments, the light panel assemblies may comprise a light diffusion layer disposed on its light emitting surfaces whereby the light intensity in the plant growing area 300 may be more homogenous with fewer and less intense light "hot spots". This increased light diffusion may allow higher average quantities of light to be dispersed to the one or more plants 3 growing in the plant growing space 400 before light saturation or light stress may occur compared to illumination without any light diffusion layers. Light diffusion layers may also protect the LED array panel assemblies and may be able to be cleaned and disinfected between harvests.

Experimental results have shown that example embodiments of plant growing apparatuses described herein may indeed be novel and highly advantageous. For example, experimental grow trial results have shown a yield up to 1200 grams of dried flower per square foot of plant grow area 400 (FIG. 1C, FIG. 1D) when the illuminated height is approximately 22". Additionally, grow trial results may show the THC content of the dried flower being increased by up to 40% greater than average expected THC concentrations for the particular cultivar of *cannabis* being used. As discussed previously, *cannabis* cultivations techniques may be similar throughout the world, with a multitude of scientific research and experimentation being conducted over a long period of time. If grow trial results from example embodiments of the disclosed technology were obvious to those skilled in the art, this technology would be in use today.

Referring to FIG. 1C and FIG. 1D, to physically access the one or more plants 3 contained in the plant growing area

400, either the plant growth barriers 4 or the one or more plants 3 may need to be mobile relative to one another.

An example embodiment of the light diffusion system for growing plants 1 and the various elements is disclosed in FIG. 1B to 1L. The light diffusion system may include at least one chamber 4 having opposing walls 4A1 and 4A2 defining a grow space for the plants wherein the grow space 400 may have a width between the opposing walls less than the maximum width of plants grown therein. The light diffusion system may include at least one light source assembly 600 which may be adapted to engage the opposing walls of the chamber and may provide diffused light throughout the grow space for promoting lateral growth of the plants up to the opposing walls of the chamber 4. The light diffusion system may also include at least one climate-controlled venting assembly adapted to maintain a preferred temperature within the chamber 4. One of the climate-controlled venting assemblies may be adapted to engage the light source assembly 600 for removing heat generated from the light source assembly and may provide climate-controlled environment.

The light source assembly 600 may include a plurality of air-cooled LED means positioned to generate a maximum average light level in excess of 1800 µmol/m2/sec in the plant growing space as discussed above to ensure that the growing space receives consistent and homogenous light and by extension to all parts of the plants. The air-cooled LED means may be further defined to include a wider variety of LED configurations that can provided the required light for growing plants.

As noted above the chamber may have a variety of configurations for ease of use. Specifically, the chamber may be an accessible enclosed space or a resealable space allowing for access to the plants at any time. Furthermore, the system may be mobile for easy manipulation within a growing environment as discussed below.

The climate-controlled venting assembly may be a combination of a heat removal duct system and an air supply and control system. The system may have an inlet means or inlet duct that forces air into the growing space wherein the air pressure may be higher inside the chamber relative to outside the chamber. It may also include an outlet means or outlet duct that vents air out of the growing space. The action of the outgoing air stream through the outlet means may create an air pressure barrier which may facilitate in the decrease pathogen and insect ingress in the light diffusion system. Furthermore, the air control system may be adapted to control humidity, temperature and air flow so as to ensure the preferred environment for the plants. Specific requirements for temperature and humidity are discussed below.

The heat duct removal system may have a variety of configurations as discussed below and in the figures. In particular, it may include an air plenum containing LED drivers that may be positioned to remove the heat generated by the air-cooled LED means whereby heat is pulled or pushed through the and into or out of the air plenum by a fan.

A plant container assembly 401 (the assembly of the one or more plants, grow media and container) with wheels 402 may be provided which may allow the plant container assembly 401 to move in the direction of the arrows indicated by D1 and D2 in FIG. 1D. Again, this method of plant access may not be intuitive to those skilled in the art. A first grow trial with an example embodiment of PGA was conducted by the applicant of this instant disclosure wherein the plant growth barriers 4 were raised and lowered. Once the plants 3 in the grow trial reached a certain level of growth, lowering the plant growth barriers down into their resting position snagged branches from the plants 3 and in several cases broke said branches and caused damage to the foliage. Additionally, even when siding the plant container assembly 401 in and out of the plant growing area 400 as shown in FIG. 1D, when the lateral growth of the plants may contact the plant growth barriers 4, damage to the plants could occur due to the imprecise orientation of the plant container assembly 401 when pushing it by hand. Later example embodiments may comprise tracks for the wheels 402 to travel along such as feature 210 in FIG. 9A.

An example embodiment of PGA is shown in FIG. 1E and FIG. 1F and may be substantially similar to the PGA shown in FIG. 1C and FIG. 1D, except that the PGA may be configured to move relative to the plant growth barriers in different ways. Referring to FIG. 1E, the plant container assembly 401 may be configured to move vertically relative to the plant growth barriers 4 as shown by the arrows. Referring to FIG. 1F, the plant growth barriers may be configured to move in a horizontal direction (PGB-H) or in a vertical direction (PGB-V).

An example assembled embodiment of PGA is shown in FIG. 1G and FIG. 1H which comprises a forced air ventilation pressurized system that surrounds the one or more plants (not shown) that enables air to flow from the top of the one or more plants (not shown) to the bottom or vice versa. Again, this may be a novel feature that would not be obvious to those skilled in the art. It may be evident from current cultivation techniques used universally that fans circulate or 'push' the ambient air around in the grow area, or HVAC ducts blow low velocity/pressure air onto the plants from above or below (such as air socks along the ground between plant rows). Great precautions are taken by cultivators to ensure that the plant foliage is sufficiently pruned and or trimmed to allow said air to circulate through the plants to avoid plant diseases such as mold, but also as a critical means to regulate temperature and humidity, and to provide sufficient air and $CO2$ for proper plant respiration and photosynthesis. Accordingly, someone skilled in the art may utilize said air blowing and circulating methods for plant ventilation. However, as the one or more plants 3 reach a sufficient stage of growth, the grow area 400 may become too densely packed with plant biomass to allow proper airflow through the plants. This was discovered by the applicant who is skilled in the art. The unexpected result was that the biomass density became extreme and completely blocked the airflow from a large box fan set to high speed and configured to blow through the grow space 400 (FIG. 1C). Airflow was tested in the flowering stage with an anemometer which registered zero CFM at the opposing end of the grow space 400.

In the example embodiment of PGA shown in FIG. 1G, the ends of the grow area may be enclosed by end panels 404, and the top of the grow area may be enclosed by a top panel 405. The top panel 405 may contain an opening or passage means 406. A round duct 406 is shown, however multiple different configurations of openings at the top of the grow area may be utilized depending upon the application. For example, the top of the grow area may be enclosed with a single or partial air plenum that supplies air to one or more plant growing areas. Air may be forced into the opening 406 as shown by the directional arrow AF1. As indicated through grow trials, it may be preferable to utilize a forced air system capable of high static pressures to enable sufficient air flow. The air may subsequently create a zone of higher air pressure within the grow area and be vented to the lower ambient air pressure outside the PGA as shown by the directional arrows AF2.

A substantially similar example embodiment of PGA is shown in FIG. 1H except that the air flow direction is reversed by changing the air flow direction of the forced air system.

Example embodiments of mobile plant containers "MPC" and plant growing apparatus may be described as comprising wheels. However, example embodiments of PGAs may comprise any other device that enables sufficient mobility, such as rollers and ball castors for example. Accordingly, the term "wheels" may herein be deemed to include any such device that enables the required mobility.

An example embodiment of plant growing apparatus is shown in FIG. 1B. Opposing plant growth barriers 4 may provide a plant growing area comprising one or more plant containers 7. Although only a shown as a single container, example embodiments may contain a plurality of containers 7. Due to the dense plant spacing, commercially available plant containers may not have enough volume to contain the required amount of grow medium required to maximize plant growth and yields. In example embodiments, a novel linear plant container or "plant drawer" (the terms "plant drawer" and "plant container may be used interchangeably) is provided, wherein said container may allow a plurality of plants disposed in a single row, and the height of the plant container 7 may be greater than twice the depth to contain the necessary grow medium volume. By combining multiple plants into a narrow linear plant drawer, the plant drawer may be able to accommodate the required volume of grow media and still stand upright without mechanical support. For example, a typical *cannabis* plant may be grown in a three-gallon container with a 10" or 12" diameter. In an example embodiment of plant container comprising a single plant rooting area of 6"×6", three gallons of grow media would require a container height of 19.25". This novel plant container may be described in greater detail at a later point in this disclosure and may be referred to as a "plant drawer".

Referring to FIG. 3B, the individual LEDs on LED array 21 may be evenly spaced such that light intensity variation from the LED array may be minimized. Light diffuser 22 may also further minimize light intensity variations and allow for an overall increase in the quantity of light applied to plants without causing plant or leave damage or stress. Given that LEDs typically may have a 120-degree beam angle and that spacing between LEDs on LED array 21 may cause significant light emission overlap between adjacent LEDs, for practical purposes the light engine assembles in example embodiments may be practically considered fully diffused single light source panels.

In an example embodiment of PGA as shown in FIG. 1A, light panel assemblies 4 may be configured wherein rows of plants 3 may nest between adjacent light panels assemblies 4, and the plants 3 may be removed and inserted into the PGC 2 with minimal disturbance to the plants 3. Referring to FIG. 2, a view from underneath an example embodiment of PGC 2, shows the configuration of light panel assemblies 4. Each light panel assembly 4 may comprise a bumper 17 on the edge of the light panel assemblies 4 that may be disposed at the opening of the PGC 2, wherein the light panel assemblies 4 may be less likely to snag or otherwise disturb the plant rows (not shown) when they are moved in and out of the PGC 2. Bumper 17 may comprise any suitable material that may adequately freely slide against plant surfaces without damaging the plants. In example embodiments bumper 17 may have a flat, curved or V-shaped profile for example.

Referring to FIGS. 3A, 3B and 3C in an example embodiment, light panel assemblies 4 may comprise an LED panel array 21. Although the LED panel array is shown as a PCB with light emitting diodes, configurations of example embodiments may also include total internal reflection "TIR" panels with LED arrays disposed on the top, bottom or both edges of each TIR panel. As shown, each LED array may comprise a PCB material that can adequately dissipate heat for the LEDs, such as an aluminum sheet for example. In an example embodiment, a light diffuser may be disposed on the light emitting side of each LED array 21 which may function to diffuse light incident on plants thereby minimizing any light intensity hot spots, protect the LED array 21 from water moisture, and heat (from individual light emitting diodes, and also form a smooth surface that will be less likely to harbor pathogens and may be able to be cleaned and disinfected between harvests.

Referring to FIG. 4 in an example embodiment, light panel assemblies may be configured in pairs with an air space between adjacent LED arrays 21. A panel guide 23 may be configured from aluminum or plastic extrusions for example, wherein the panel guide 23 may comprise tracks wherein opposing LED arrays 21 and diffusers 22 may slide in and out of the PGC 2 (FIG. 1A) after the removal of bumper 17 (FIG. 3B). This may be advantageous for the easy removal and cleaning of diffuser panels 22. Each light panel assembly 4 may comprise four panel guides which may function to retain the LED arrays 21 and diffusers 22 in their proper orientation. Structural brackets 24 may attach to panel guides 23. Light panel guides 23 may also be configured as continuous pieces that span the entire length of the LED arrays 21 and diffusers 22.

In an example embodiment, a remotely vented light fixture is disclosed wherein heat generated by a light source may be directed to a remote location. Referring to FIG. 6A and FIG. 6B, an air duct 107 may comprise two opposing air duct plates 112, wherein the air duct plates 112 may be fabricated utilizing a thermally conductive material such as aluminum for example. The air duct 107 may further comprise two opposing end plates 114 that may be attached to the air duct plates 112, therein forming an enclosure comprising an opening for air to enter and an opening for air to exit. One or more LED light sources such as an LED panel array 21 may attach to the air duct plates 112, and therein transfer heat generated by the LEDs from the LED panel array 21 to the air duct plates 112.

As shown, the opening AF1 may allow air to enter the air duct 107. The arrow shows the direction of the air flow. Openings AF2 and AF3 may allow air to exit the light fixture assembly remotely. The air duct 107 may attach to an air plenum 150, and a fan 151 may create an area of low pressure inside the air plenum 150 therein pulling the air through the opening 107. An optional air damper/diverter 152 may function to direct the exhaust air to either openings 154 AF2, 153 AF3, or a combination of both. Although the airflow direction is shown moving from AF1 to AF2 and/or AF3, the airflow direction may be reversed depending upon the requirements of the intended application.

Example embodiments of remotely vented light fixture have been described, however, these descriptions should not be construed to limit the scope of possible alternative embodiments of the disclosed technology. In a broad sense, any light source that may attach to a thermally conductive air duct whereby air within the duct transfers heat from the light source to a remote location may be construed as an embodiment of a remotely vented light fixture. For example, an example embodiment of remotely vented light fixture may comprise a thermally conductive round or rectangular air duct with one or more light emitting diodes attached on one or more surfaces of the thermally conductive round or rectangular air ducts, wherein air passing through the duct may transfer heat energy generated by the one or more light emitting diodes to a remote location.

In an example embodiment, the air passing through the duct may comprise passive air movement or forced air movement. In an example embodiment, the air entering the duct may comprise the same air that surrounds the light source, or the air entering the duct may come from a remote location whereby the light fixture ventilation system is separate from the air surrounding the light fixture.

An example embodiment of remotely vented light fixture is shown in FIG. 7. The LED panel assembly 4 (similar to that shown in FIG. 5A through FIG. 5C) may comprise air ducts 160A and 160B wherein air duct 160A may connect with the bottom opening (FIG. 15C feature AF4) of the LED panel assembly 4 and air duct 160B may attach to the top opening of the LED panel array assembly 4 (FIG. 15C feature AF5). Air from a remote location may enter air duct 160A as shown by the air flow directional arrow AF1 and may exit through air duct 160B as shown by the air flow directional arrow AF2. The air within the ventilation system may be forced air or passive air transfer and may flow in either direction depending upon the application requirements.

An example embodiment of PGA is shown in FIG. 8A through FIG. 17. For brevity, any design, element, functionality, principle, novelty, etc. that may be similar or substantially the same as other example embodiments previously discussed, may or may not be reiterated herein.

As shown in example embodiments of PGA, a high number of plants may be contained with a PGA, creating a very high plant density, and subsequently there may be a very restricted amount of space between plants. Plants within the same row may have no space between them since each plant's foliage may intermingle. This may not allow adequate access space to the plants that may be required for routine maintenance etc., such as pruning and examination for example.

A novel solution to this issue will now be discussed. FIG. 9A shows an example embodiment of MPC that may comprise one or more movable individual plant containers "plant drawers" 202, wherein each plant drawer 202 comprises wheels 212 that engage tracks 210, allowing the one or more plant drawers to slide on the tracks 210. In subsequent descriptions, the term "plant drawer" may be applied interchangeably to the entire plant drawer assembly or the actual plant drawer container. The tracks 210 and the one or more plant drawers may be mounted on a dolly "MPC dolly" 201. FIG. 9B shows the same example embodiment of MPC as shown in FIG. 9A except that all the plant drawers except one have been removed for illustrative purposes. The MPC dolly may comprise frame members 213, frame connectors 214 and wheels 211, with the plant drawer 202 and tracks 210 mounted thereon. Although any suitable design of dolly may be utilized, t-slot aluminum extrusions and fasteners may be an economical and sturdy choice.

FIG. 10 may partially illustrate the functionality of the example embodiment of MPC shown in FIG. 9. A second dolly "maintenance dolly" 200 may comprise a substantially similar dolly as the MPC dolly 201, wherein the tracks 210 on both dollies align, thereby allowing the one or more plant drawers 202 to slide from one dolly to another in the direction of the arrow. Bolts or other devices (not identified in FIG. 10) may be attached to the ends of each track to prevent the plant drawers from travelling beyond the desired distance. A plank 224 fabricated from any suitable material may be utilized when required for a person to physically access the inner sides of the one or more plant drawers. A flexible irrigation hose 220 is shown in its extended orientation. Further details of an irrigation system will be later be discussed. An additional feature of the example embodiment of MPC as shown may be that the one or more plant drawers may be positioned on the maintenance dolly and transported to a different location and vice versa. Additionally, individual plant drawers may enable each drawer to be extended outside the PGA one at a time, thus limiting the exposure time of each plant drawer to ambient air outside of the PGA (non-pathogen filtered air).

FIG. 9C through 9E shows further details of an example embodiment of the one or more plant drawers as previously discussed. FIG. 9C shows a perspective view. The plant drawer 202 may comprise a narrow linear container utilizing any suitable material such as aluminum, stainless steel, or plastics. One of the novel features of the plant container 202 may be that the dimensional design, namely the height of the container exceeds the width by a factor of 2 or more. Adequate media volume for optimal *cannabis* growth in applications utilizing example embodiments of PGA may be approximately 3 US gallons or more. Assuming a grow area for each plant of 6" width and a depth of 6", a height of 19.25" inches would be required. Higher density plant spacing would require even taller containers. All plant containers on the market for sale may not have the required height/width ratio because the containers could not be self-supporting and would tip over.

Example embodiments of plant drawers may be configured to contain a row of plants with high density spacing with sufficient grow media for each plant as discussed. Any commercially available plant containers may not be able to be self-supporting. Furthermore, the dimensionally restricted width and depth compared to typical plant containers may allow the plant's root development to be increased when the plant is small. It is widely accepted and practiced that seedling or clones are usually transplanted at least once into an intermediate sized container before being planted in its final larger sized container. Accordingly, this novel feature may save on labor and material costs by eliminating one or more transplants.

One or more layers of trellis nets 217 may collectively create a trellis assembly that may allow the plants grown in example embodiments of MPC to be positioned as they grow to maximize branch/stem spacing and to maintain a preferred distance away from adjacent light panels. The trellis nets 217 may be attached to rods 215 that may comprise grommets 216, wherein the trellis net 217 edges may be engaged between adjacent grommets (FIG. 9D). As shown in FIG. 9E, the rods 215 may attach to a loop type fastener 220 that may slidingly engage the rods 215, and wherein the loop type fastener 220 may attach to the plant drawer 202, thus enabling the rods 215 to be removed as necessary for cleaning and maintenance. Plant drawer wheels 212 are shown. The example embodiment of trellis net assembly as shown should not be construed to limit the scope of possible embodiments. For example, grow trial have shown that one or more horizontal loops at different heights, fabricated of cord, string etc. and wrapped horizontally around the outside of the four rods 215 may function to position the plant foliage at a preferred distance from adjacent light panels.

As shown in FIG. 9E, individual plant cavities are defined by dividers 218. Drainage holes 221 on the bottom of the plant drawer 202 may allow proper water drainage. Since standing water is an issue in horticulture due to the potential for pathogen and insect procreation, a novel feature is incorporated into example embodiments of plant drawer assemblies. A drain channel 208 may be fabricated from any suitable non-corrosive material, and may be attached directly underneath the drainage holes 221. The drain channel 208 may slope downwards (towards the right side of FIG. 9E) and extend past the plant drawer, thus channeling the drain water away from the PGA as shown in FIG. 8A.

Automatic irrigation of plants may be necessary for obvious reasons. Due to the mobility of example embodiments of plant drawers, flexible water tubing 220 (FIG. 9D) may connect to a water supply fitting 223 and the other end of the flexible water tubing may connect to a water manifold 206 (FIG. 20B). Referring to FIG. 11, the water manifold system 206 may compromise a water supply inlet 232, three-way connectors 231, and joiner tubing 230. Said irrigation fittings may mount on a mounting plate 270 which may attach to the back edge of each light engine (visible in FIG. 25B) with screws 271. The mounting plate 270 may also add structural stability to the light engines. In an example embodiment, the MPC 1, PGC 2, and back outer covering 13A are also shown.

Referring to FIGS. 5A, 5B and 5C in an example embodiment, light panel assemblies 4 may comprise an LED panel array 21. Although LED panel array is shown as a PCB with light emitting diodes, configurations of example embodiments may also include total internal reflection "TIR" panels with LED arrays disposed on the top, bottom or both edges of each TIR panel. As shown, each LED array may comprise a PCB material that can adequately dissipate heat for the LEDs, such as an aluminum sheet for example.

In the example embodiment, the air ducts 107 may comprise opposing air duct plates 112 with top flanges 112B, and may further comprise opposing filler plates 114, thereby forming an air duct. The air duct 107 may function both as an air exhaust duct for the PGA ventilation system and also as a heat sink for the LED panel arrays 21. These functions will be described in greater detail later in this application. The air duct plates may be preferably fabricated from a thermally conductive material such as aluminum or thermally conductive plastics for example.

Referring to FIG. 5C in an example embodiment, the light panel assemblies may be configured in opposing pairs of LED panel arrays 21 and light diffusers 22. LED panel arrays 21 may be attached to air duct plates 112 comprising top flanges 112B. Filler plates 114 (also shown in FIG. 14B) may attach to opposing ends of the air duct plates 112 and together may function to define an air duct 107 (FIG. 15C). Diffuser clips 23 may attach to the air duct plates 112 or the filler plates 114 and may function to slidingly engage the diffuser panels 22. Gaskets 113 may attach to the duct plate upper flanges 112B and mate with the under side of top panel 6 (FIG. 12A) and align with air exhaust vents 90 in top panel 6. Mounting brackets 16 on both ends of the LED panel arrays 4 may attach to the filler plates 114 to secure and position the LED panel arrays in the PGC. Bumpers 17 may attach to the front filler plate 114 and/or the air duct plates and function to create a streamlined front edge of example embodiments of LED panel assemblies in order to minimize any disturbance or damage to any plants during insertion or removal of example embodiments of MPCs into example embodiments of PGCs.

Referring to FIG. 15B in an example embodiment, the light panel assemblies may be configured in opposing pairs of LED panel arrays 21A, 21B and 21C and light diffusers 22. LED panel arrays 21A, 21B and 21C may be attached to air duct plates 112 comprising top flanges 112B. Filler plates 114 (also shown in FIG. 15C) may attach to opposing ends of the air duct plates 112 and together may function to define an air duct 107 (FIG. 15C) whereby heated air from the LED panel arrays 21A, 21B and 21C may be vented from the PGC. Diffuser clips 23 may attach to the air duct plates 112 and may function to slidingly engage the diffuser panels 22. Gaskets 113 may attach to the duct plate upper flanges 112B and mate with the underside of top panel 6 (FIG. 16) and align with air exhaust vents or outlet means 90 in top panel 6. Mounting brackets 16 on both ends of the LED panel arrays 4 may attach to a frame 109 (FIG. 14A), therein securing and positioning the LED panel arrays in the PGC.

Bumpers 17 may attach to the front filler plate 114 and/or the air duct plates and function to create a streamlined front edge of example embodiments of LED panel assemblies in order to minimize any disturbance or damage to any plants during insertion or removal of plant drawers. The air duct 107 is indicated in FIG. 15C, and the air entry point AF1 or inlet means and air exhaust point AF2 (FIG. 15A) are indicated. Both air duct plates 112 may further attach to a central frame member 250 for additional structural rigidity.

In the example embodiment of light panel assembly as shown in FIG. 15B, a novel feature may be the LED light source may be divided into three separate LED panel arrays 21A, 21B and 21C, with each being designed on a separate controllable circuit. Since electricity costs may one of the single greatest production expenses in indoor growing of *cannabis*, having the light source divided into three separate zones may enable the top or middle zones (21C and 21B respectively) to be switched off and then on as the plants grows from seedling to maturity.

Referring to FIG. 16, LED drivers 38 may attach to the top plate 6. Vent slots or passage means 90 in the top plate 6 may align with the corresponding exhaust air ducts from the light panel assemblies (feature 107 in FIG. 15C). The thermal energy transferred to the duct plates 112 (FIG. 15A) from the LED panel arrays 21A, 21B and 21C may heat the air in the air duct 107 and the heated air may rise through the duct and out the vent slots 90 due to the stack effect. Additionally, air heated by the significant thermal load caused by the LED drivers 38 may also rise. In an example embodiment of a novel vented lighting system as shown, heated air generated by the LED panel arrays 21A, 21B and 21C and the LED drivers 38, may be collected inside the top air plenum 150 and pulled out through the fan 151 and the exhaust duct 154. The exhaust duct 154 may be directed to a desired location as required, such as into the surrounding ambient air, outside the building, or directly into an HVAC system for example. The fan speed may be electronically controlled and automated and can be linked to either thermal or humidity sensors. Advantageously, the majority of heat generated by the light system may be separated from the plants and the interior of example embodiments of PGA.

In a novel example embodiment of PGA as shown in FIG. 17, an air seal system may be utilized to prevent or reduce pathogen and insect ingress into the PGA. Forced air emanating from fans comprising HEPA filters may function to create a positive pressure system inside the PGA wherein the air forced air (shown by the arrows notated as AS) is exhausted through the openings 260 between the example embodiment of MPC 1 and the PGC 2. This novel system will now be discussed in further detail.

Referring to FIG. 14A and FIG. 14B, air A1 may be pulled through the HEPA filters 110 by fans 115 and through ducts 240 (A3) and collected in air plenum box 120. The air plenum box may therein become pressurized and evenly distribute the air into the air supply ducts 105 (AF4) and out the air dispersion holes 106. This air may subsequently move through any plants disposed below the air supply ducts and between the corresponding adjacent light engines, and subsequently exit the PGA through the openings 260 as shown in FIG. 17 or through the light source ventilation system. FIG. 12, FIG. 13A and FIG. 13B shows various views of the air plenum box 120, air supply ducts 105, air plenum box cover plates 242, duct collars 241, air ducts 240, fans 151, heap filters 110, light panels assemblies 4, and grow space 240 wherein rows of plants may be disposed.

A front and back perspective view of the entire example embodiment of PGA discussed in FIG. 8A through FIG. 17 is shown in FIG. 8A and FIG. 8B. Indicated are the PGC 2, MPC 1, maintenance dolly 200, the MPC dolly 201, plant drawers 202, plant drawer drain channel 208, PGC front outer covering 13B, light panel assemblies 4, air plenum box 120, top air plenum 150, fans 151, HEPA filters 110, air exhaust ducts 154.

Referring to FIG. 8A, in an example embodiment, the PGA 2 may be suspended by cables 205 that may be connected to synchronized electronically controlled linear actuators 203 which may allow the PGA to be evenly and easily raised or lowered as required. Turnbuckles 204 may function to allow fine tuning of levelness of the PGA.

An example embodiment of PGA is shown in FIG. 18A. For brevity, any design, element, functionality, principle, novelty, etc. that may be similar or substantially the same as other example embodiments previously discussed, may or may not be reiterated herein.

Other example embodiments of PGA have been discussed and shown that may be configured to be suspended from a ceiling. FIG. 18A and FIG. 18B show an example embodiment of PGA that may be configured to be disposed on a surface, such as a concrete for example. Referring to FIG. 20A through FIG. 20D, frame members 330 are shown. Although there is a plethora of frame members shown, for brevity and illustrative purposes, only one frame member 330 is indicated in each figure. Additionally, all the outer panels, top air supply plenums and mobile plant containers are not shown for illustrative purposes. In example embodiments, an aluminum extrusion construction system such as the "T-Slot" system is used, wherein a complete apparatus as shown may be fabricated using off the shelf parts. Example embodiments of floor mounted PGA's may be advantageous in applications where ceiling suspension is impractical or not feasible. Additionally, multiple tiers may be utilized therein maximizing available space within a building.

FIG. 20C and FIG. 20D shows a drip pan 331 disposed within the back region of the example embodiment of PGA, and FIG. 20C shows a drain hose assembly 311 that may attach to the drip pan 331 and an irrigation feed assembly 310 that may feed the irrigation system as shown and described in other example embodiments.

Referring to FIG. 20C and FIG. 20D, the MPC dolly (feature 201 FIG. 8A) may have been configured into an MPC platform 332. The MPC platform may have substantially similar, or the same configuration as said MPC dolly, except the castors (feature 211 FIG. 9A) have been removed and the MPC platform has been configured to mount inside the PGA as shown in FIG. 20C and FIG. 20D. It may be preferable that the MPC platform is configured to be removable so that access to the interior of the PGA is made easier for maintenance and cleaning. Referring to FIG. 19, the height and orientation of the MPC platform may be configured such that the maintenance dolly 322 can mate with the MPC platform 321 as shown and discussed in previous embodiments of PGA, wherein corresponding tracks 323 align with each other such that each plant drawers (not shown) may roll freely between the MPC platform and the maintenance dolly. LED panel assemblies 320 are indicated.

Referring to FIG. 18A and FIG. 18B, lower side panels 302, lower front panel 303 and lower back panel 306 may comprise insect screens. The hole size of the insect screen may be chosen to prevent ingress into the PGA of the smallest insect species that may be anticipated, such as aphids and spider mites for example. Since insect screens may allow the transmission of air through the panels, the air pressure inside the PGA as previously described may be evenly dispersed around and out the bottom regions of the PGA. Since the example embodiment may be floor mounted and comprise a frame, this configuration may easily allow for the panels 302, 303 and 306 to be mounted to the PGA without gaps where insects may enter. It may be preferable to configure said panels to be easily removable for quick access to the inside of the PGA.

Referring FIG. 18A, the air supply system to the plants may be substantially similar to the example embodiment of PGA as shown and discussed in FIG. 17, except that the air may vent through said panels instead of being vented directly to ambient air outside the PGA as shown in FIG. 17. In FIG. 18A and FIG. 18B, the airflow is shown as entering the air filters 308 (AF1), through the ducts 309 by the fans 307 and into the upper portions of the plant growing areas inside the PGA (AF2 and AF3), through the plant growing area (AF4) and vented outside the PGA through panels 303, 302 and 306 (AF5).

Referring to FIG. 18C and FIG. 18D in another example embodiment of PGA that may be substantially similar to that shown in FIG. 18A and FIG. 18B, the airflow direction may be reversed as shown by the directional arrows AF1 through AF5. The air filters have been removed since they are not required since air enters the PGA through the panels 302, 303 and 306, and the insect screen may not filter out pathogens. Instead, air filters may be substituted for insect screens on said panels.

An example embodiment of multi-zone automated climate control system "CCS" will herein be described. Typically, any cultivation environment will have a ventilation/HVAC system that is configured and designed for that particular environment, directed to all the plants collectively. However, this type of system may have several disadvantages. Using a large cultivation room as an example, different parts of the room, especially larger rooms with high ceilings, may have significantly different temperatures and relative humidities (RH) due to HVAC system limitations, convection currents within the room etc.

Due to the large volume of air, it may take significant time to stabilize the RH and temperature in the transition period of lights-on to lights-off and vice versa. During this period, humidity can rise which can increase the chances of pathogen infestations such as powdery mildew. With respect to adding humidity to the growing environment, a typical HVAC system may have the humidity injected at the main central unit. When the humidified air is transported over long duct distances, the humidity may change relative to the distance traveled. This may result in an uneven humidity level throughout the room. A similar analogy may be applied to air conditioned or dehumidified air. As discussed, maintaining a constant and appropriate VPD for all plants is a foremost cultivation concern.

Example embodiments of PGA's that have been discussed may have plants in close proximity to or contacting light sources. Modern horticulture LED designs such as the ubiquitous Samsung 501H have a strong far red and infrared spectrum component which may generate a significant amount of radiant heat. Grow trial testing with a forward looking infrared "FLIR" camera has shown a leaf surface temperature "LST" that may be about six degrees Fahrenheit greater than the ambient air temperature. An example preferred LST of 85 degrees F. will be used as an illustrative example. Combined with supplemental CO2 levels over 1200 ppm, this may be a preferable temperature during various growth phases. Recalling the importance of VPD as previously discussed, an RH of about 70% may be required for a VPD of 1.25 kpa. Achieving this level of consistent humidity to all the plants in a typical commercial flowering room may not be feasible or possible. These facilities may typical be operated at a lower temperature with a corresponding lower humidity due in part to the lower degree of radiant heat on the plants due to the increased light fixture to plant distance and additionally to reduce possible mold infections that may increase with humidity levels.

An example embodiment of PGA with a multi-zone automated climate control system is shown in FIG. 21A and FIG. 21B. The PGA 500 may be substantially similar to the example embodiment described and shown in FIG. 18A through FIG. 20D with the exception of any differences that may herein be described. FIG. 21A shows the PGA 500 and CCS 501. As shown in FIG. 21B, the CCS 501 may be a separate portable unit that may attach to the PGA 500. The PGA 500 may be substantially similar to the example embodiment shown in FIG. 18B except that the air supply system including HEPA filters 308, fans 307 and ducts 309 have been omitted.

A novel aspect of the CCS 501 may be that it is configured as a single portable unit, which may have several advantages. Each PGA 500 as shown may be yield about 50 lbs. of dried *cannabis* flower per harvest. Accordingly, the potential lost revenue for a failed harvest could be enormous. Down-time due to any part of a ventilation system (from example embodiments of PGA or typical commercial facility HVAC systems) breaking and being repaired during an active crop could have serious financial consequences including crop damage or failure. If any part of the CCS 501 breaks and needs repair, a spare CCS unit 501 can be rolled in and hooked up in a very short period of time.

In example embodiments of PGA, each row "bay" may have its own micro-climate wherein RH and temperature may be individually controlled. FIG. 25 shows an upwardly tilted front view of an example embodiment of PGA with a temperature and humidity probe 552-1, wireless climate controller 550-1 and air supply duct 553-1. Each bay may have the same features. An example of a wireless controller may include an AC Infinity Controller 69. Pro that can adjust and control multiple devices that utilize IoT protocols such as fans and humidifiers etc. based on user set criteria such as VPD for example.

FIG. 22 and FIG. 23 show a front and back perspective view of the example embodiment of CCS 501 shown in FIG. 21A and FIG. 21B, and includes an air supply duct extension 514 that may attach to a corresponding duct collar on the PGA 500, air supply duct 513, drainage duct assembly 506, water misting injector 507, drip pan 508, water supply tubing 505, water input connection 512, drain valve 509, frame 511, and wheels 510. An inline high static pressure fan 504 may pull air in through a HEPA filter 503. FIG. 24A and FIG. 24B show the drainage duct assembly 506 that may comprise the water mist injector 507 attached down wind of the fan 504 as shown. The injector 507 may comprise any type of water mister such an ultrasonic mister. Due to the high humidity requirements of the PGA as discussed, and depending on air flow velocity, air RH, temperature etc., the atomized water mist may not fully be absorbed into the air stream and may condense and pool within the duct. Accordingly, as part of the example embodiment of novel CCS being described, a U-shaped drainage duct assembly 406 is provided which includes a drain valve 520, that may allow any accumulated water to drip into the drain pan 508 (FIG. 22). Referring FIG. 22, each mist injector 507 may be interconnected with water tubing 505 which may in turn be connected to a water supply via connector 512. Although not shown, each mist injector 507 may be electronically controlled, and be wired to a corresponding wireless climate controller 550-1 (FIG. 25) thereby allowing the humidity level in each separate duct to be adjusted according to the desired parameters.

Although not shown, an inline duct heater may also be inserted into each duct assembly downwind from the fans 504 and controlled in a similar manner as to the mist injectors 507. This may allow additional heat to be injected into each bay of the PGA if needed, and thereby giving even more control over the VPD in each bay.

An exemplary embodiment of PGA and CCS is shown in FIG. 27 through FIG. 32. For brevity, features that have been previously shown or discussed may or may not be identified or discussed. FIG. 26 and FIG. 27 shows a front and back perspective view of an example embodiment of PGA 500 and CCS 501. The PGA 500 may be substantially similar to the example embodiment shown in FIG. 18A with some exceptions that will now be discussed.

The MPC platform (FIG. 20C feature 332) has been replaced with an MPC dolly 201 in FIG. 32. The MPC dolly 201 may be the same or substantially similar to other MPC dollies previously discussed. This may have the advantage of creating an open space beneath the plant growth barriers 4 for improved access inside the PGA for cleaning and maintenance.

The air exhaust plenums (305 FIG. 18A) may have been modified wherein the associated exhaust fans 304 may have been relocated to the CCS 501 in FIG. 28, which will subsequently be discussed in more detail.

The drip pan 331 (FIG. 20C) that may collect drainage water from plant containers may have been removed and a sump pump 590 in FIG. 32 may be utilized to pull water through the drainage tubing (not shown) and out a drainage valve 591. This system may be more functional than a gravity fed system due to the utilization of the MPC dolly 201 wherein the flexible drainage tubing may not allow the proper downward slope for proper drainage.

FIG. 30 shows the same example embodiment of PGA and CCS, wherein the CCS has been rotated 180 degrees for illustrative purposes. Both apparatuses have been configured with docking assemblies so the CCS 501 can be rolled towards, and dock with the PGA 500 whereby the supply and exhaust ducting may be mated and retained. As previously discussed, if any mechanical problems occur with the CCS, a spare CCS apparatus may be replaced with a spare in a very short time period, thereby reducing or eliminating any risk or damage to any plants growing in the PGA. Air supply collars 530A on the CCS 501 may engage with a corresponding air supply collar 530B on the PGA 500 as shown by the arrow. Similarly, an air exhaust collar 531A on the CCS 501 may engage with a corresponding air exhaust collar 531B on the PGA 500 as indicated by the arrow. Exhaust fans 304 are indicated. Referring to FIG. 27, threaded docking screws 533A may engage and protrude through docking holes 533 in docking plate 532, and threaded knobs 533B may fasten onto the threaded docking screws 533A. The tightening of the threaded knobs 533B may function to fully mate and seat all the corresponding ducts the CCS 501 with the PGA 500.

The example embodiment of CCS 501 in FIG. 28 shows a front perspective view, and indicates the docking plate 532, air supply duct collars 530, exhaust fan duct collars 531, docking holes 533, frame members 511, drainage duct assembly 506, wheels 510, water inlet valve 512 for the humidifiers assembly, air supply duct 513, exhaust fans 304, threaded knobs 533B, docking plate 532, hepa filters 501, air supply fans 504, humidifiers water supply tubing 505, drip pan 508, and drain valve 509.

The example embodiment of CCS 501 in FIG. 29 shows a back perspective view, and indicates the docking plate 532, exhaust fans 304, threaded knobs 533B, docking plate 532, HEPA filters 501, air supply fans 504, humidifiers water supply tubing 505, drip pan 508, and drain valve 509. A water pump 535 is provided for each humidifier assembly and may be electronically controlled for each separate row in the PGA 500 as previously discussed in reference to FIG. 22 and FIG. 23.

FIG. 31 and FIG. 32 shows a front and rear perspective view of example embodiments of PGA 500 and MPC dolly 201 with various panels and parts removed for illustrative purposes.

I claim:

1. A plant growing apparatus configured to increase plant inflorescence yield per unit area, improve plant respiration, improve plant photosynthesis, and to reduce pathogen propagation, the plant growing apparatus comprising:

at least one mobile plant container configured to support a plant growth medium and one or more plants that have a maximum lateral width W;

a growing chamber, comprising:

an integrated duct configured to selectively engage or disengage with the at least one mobile plant container, and when engaged, to simultaneously limit lateral plant growth, provide plant side-lighting, and provide airflow to the one or more plants, the integrated duct comprising:

two opposing, rigid, inwardly facing vertically-oriented light-emitting diode (LED) panels arranged on opposite sides of the integrated duct, wherein the LED panels are spaced apart by a lateral distance X that is smaller than W, wherein X defines a width of a plant growing region therebetween, and limits the lateral plant growth of the one or more plants grown in the plant growing region to the lateral distance X; and a first fan fluidly coupled with the integrated duct and configured to pressurize the air in the integrated duct by forcing air through the growing chamber.

2. The plant growing apparatus of claim 1, further comprising a vertically oriented transparent, translucent, or light diffusing membrane disposed within the integrated duct and adjacent to the LED panels, wherein the membrane is configured to form a plant growth barrier.

3. The plant growing apparatus of claim 1, further comprising a trellis assembly integrated with the at least one mobile plant container, wherein the trellis assembly is configured to constrain lateral growth of the one or more plants within the growing chamber.

4. The plant growing apparatus of claim 1, further comprising one or more removable panels configured to engage with the growing chamber to at least partially define vertical confinement of the integrated duct around the one or more plants when installed, and wherein the one or more removable panels, when removed, provide access to the one or more plants.

5. The plant growing apparatus of claim 1, wherein the at least one mobile plant container further comprises a transport and positioning system, the transport and positioning system comprising:

a first set of wheels configured to allow selective movement of the at least one mobile plant container to engage with or disengage from the growing chamber; and a track assembly configured to guide movement of the at least one mobile plant container along a pathway from outside the growing chamber to inside the growing chamber.

6. The plant growing apparatus of claim 5, wherein the track assembly is configured to substantially center the at least one mobile plant container within the growing chamber.

7. The plant growing apparatus of claim 5, further comprising:

a first wheeled platform comprising a second set of wheels and a first portion of the track assembly;

a second wheeled platform configured to align with and engage with the first wheeled platform, the second wheeled platform comprising a third set of wheels and a second portion of the track assembly, the second portion of the track assembly configured to align with the first portion of the track assembly of the first wheeled platform; and wherein the at least one mobile plant container is movable from the first wheeled platform to the second wheeled platform along the first portion of the track assembly and the second portion of the track assembly.

8. The plant growing apparatus of claim 1, wherein the at least one mobile plant container comprises a plurality of rolling conveyance devices attached to a bottom surface thereof and configured to selectively engage or disengage with the integrated duct via rolling insertion or withdrawal.

9. The plant growing apparatus of claim 1, further comprising a structural frame configured to attach to and vertically orient the LED panels to form the plant growing chamber between the LED panels.

10. The plant growing apparatus of claim 1, further comprising a heat removal air duct system disposed between adjacent plant growing chambers, the heat removal air duct system comprising:

two thermally conductive air duct plates and two end plates configured to form a rectangular air duct, wherein at least one of the two thermally conductive air duct plates are in thermal communication with at least one of the LED panels;

an opening for air to enter, and an opening for air to exit; and a second fan fluidly coupled with the heat removal air duct system;

wherein heat from the at least one of the LED panels is transferred into the heat removal air duct system and conveyed to a location outside the plant growing apparatus.

11. The plant growing apparatus of claim 1, further comprising a heat removal air duct system disposed between adjacent growing chambers, the heat removal air duct system comprising:

a rectangular air duct formed between two adjacent LED panels and separated by two end plates;

an opening for air to enter, and an opening for air to exit; and a second fan fluidly coupled with the heat removal air duct system;

wherein heat from the two adjacent LED panels is transferred into the heat removal air duct system and conveyed to a location outside the plant growing apparatus.

12. A method of assembling a plant growing apparatus, the method comprising:

assembling at least one mobile plant container configured to support a plant growth medium and one or more plants; and assembling a growing chamber, comprising:

an integrated-duct configured to selectively engage or disengage with the at least one mobile plant container, and when engaged, to simultaneously limit lateral plant growth, provide plant side-lighting, and provide airflow to the one or more plants, the integrated duct comprising:

two opposing, rigid, inwardly facing vertically-oriented light-emitting diode (LED) panels arranged on opposite sides of the integrated duct, wherein the LED panels define a maximum lateral distance therebetween, forming a plant growth barrier configured to confine maximum lateral growth of the one or more plants during a mature phase of plant growth within the maximum lateral distance to promote development of a substantially flat vertical plant canopy.

13. The method of claim 12, wherein assembling the growing chamber comprises assembling a structural frame comprising one or more of:

a rectangular air duct formed between two adjacent LED panels and separated by two end plates, wherein heat from the two adjacent LED panels is transferred into a heat removal air duct system and conveyed to a location outside the plant growing apparatus;

one or more thermally conductive panels in thermal communication with the LED panels, wherein the one or more thermally conductive panels are configured to conduct heat away from the LED panels and to a remote location outside of the plant growing apparatus; and two adjacent thermally conductive panels configured to define two sides of an air duct having an air space between the two adjacent thermally conductive panels, wherein the air duct is fluidly coupled with a fan, and wherein the air duct is configured to conduct heat away from the LED panels and to a remote location outside of the plant growing apparatus.

14. The method of claim 12, further comprising installing a vertically oriented transparent, translucent, or light diffusing membrane within the integrated duct and adjacent to the LED panels, wherein the membrane is configured to form the plant growth barrier.

15. The method of claim 12, further comprising attaching one or more removable panels to the growing chamber to at least partially define vertical confinement of the integrated duct around the one or more plants.

16. The method of claim 12, further comprising:

configuring the at least one mobile plant container to allow selective movement of the at least one mobile plant container; and one or more of:

rolling the at least one mobile plant container towards the growing chamber to engage the at least one mobile plant container with the growing chamber; and rolling the at least one mobile plant container away from the growing chamber to disengage the at least one mobile plant container from the growing chamber.

17. A method of growing one or more plants to increase inflorescence yield per unit area, improve plant respiration, improve plant photosynthesis, and to reduce pathogen propagation, the method comprising:

receiving at least one mobile plant container configured to support a plant growth medium and one or more plants;

receiving a growing chamber, comprising:

an integrated duct configured to selectively engage or disengage with the at least one mobile plant container, and when engaged, to simultaneously limit lateral plant growth, provide plant side-lighting, and provide airflow to the one or more plants, the integrated duct comprising:

two opposing, rigid, inwardly facing vertically-oriented light-emitting diode (LED) panels arranged on opposite sides of the integrated duct, wherein the LED panels define a maximum lateral distance therebetween, forming a plant growth barrier configured to confine maximum lateral growth of the one or more plants during a mature phase of plant growth within the maximum lateral distance;

irradiating the one or more plants with LED panels; and forcing air through the growing chamber.

18. The method of claim 17, wherein the growing chamber comprises a structural frame comprising one or more of:

a rectangular air duct formed between two adjacent LED panels and separated by two end plates, wherein heat from the two adjacent LED panels is transferred into a heat removal air duct system and conveyed to a location outside the plant growing apparatus;

one or more thermally conductive panels in thermal communication with the LED panels, wherein the one or more thermally conductive panels are configured to conduct heat away from the LED panels and to a remote location; and two adjacent thermally conductive panels configured to define two sides of an air duct having an air space between the two adjacent thermally conductive panels, wherein the air duct is fluidly coupled with a fan, and wherein the air duct is configured to conduct heat away from the LED panels and to a remote location.

19. The method of claim 17, further comprising installing a vertically oriented transparent, translucent, or light diffusing membrane within the integrated duct and adjacent to the LED panels, wherein the membrane is configured to form the plant growth barrier.

20. The method of claim 17, further comprising:

configuring the at least one mobile plant container to allow selective movement of the at least one mobile plant container; and one or more of:

rolling the at least one mobile plant container towards the growing chamber to engage the at least one mobile plant container with the growing chamber; and rolling the at least one mobile plant container away from the growing chamber to disengage the at least one mobile plant container from the growing chamber.

21. A plant growing apparatus configured to increase plant inflorescence yield per unit area, comprising:

at least one mobile plant container configured to support plant growth medium and one or more plants, the at least one mobile plant container comprising one or more conveyance devices;

an integrated duct system comprising one or more elongated vertical growing chambers, each growing chamber comprising two opposing, rigid, inwardly facing, vertically-oriented light-emitting diode (LED) panels arranged on opposite sides and configured to provide light to the one or more plants from two opposing sides, wherein the mobile plant container selectively engages with or disengages with the one or more elongated vertical growing chambers of the integrated duct system.

22. The plant growing apparatus of claim 21, wherein the one or more conveyance devices are attached to a bottom surface of the at least one mobile plant container and are configured to selectively engage or disengage with the integrated duct system via rolling insertion or withdrawal.

23. The plant growing apparatus of claim 21, wherein the integrated duct system is configured to simultaneously limit lateral plant growth, provide plant side-lighting, and provide airflow to the one or more plants.

24. The plant growing apparatus of claim 21, further comprising a vertically oriented transparent, translucent, or light diffusing membrane disposed within the integrated duct system and adjacent to the LED panels, wherein the membrane is configured to form a plant growth barrier.

25. The plant growing apparatus of claim 21, wherein the one or more conveyance devices comprise one or more of:

a first set of wheels configured to allow selective movement of the at least one mobile plant container to engage with or disengage from the growing chamber; and a track assembly configured to guide movement of the at least one mobile plant container along a pathway from outside the growing chamber to inside the growing chamber.

26. The plant growing apparatus of claim 25, further comprising:

a first wheeled platform comprising a second set of wheels and a first portion of the track assembly;

a second wheeled platform configured to align with and engage with the first wheeled platform, the second wheeled platform comprising a third set of wheels and a second portion of the track assembly, the second portion of the track assembly configured to align with the first portion of the track assembly of the first wheeled platform; and wherein the at least one mobile plant container is movable from the first wheeled platform to the second wheeled platform along the first portion of the track assembly and the second portion of the track assembly.

* * * * *